US011949739B2

(12) United States Patent
Largman et al.

(10) Patent No.: US 11,949,739 B2
(45) Date of Patent: Apr. 2, 2024

(54) METHODS, APPARATUSES, AND COMPUTER PROGRAM PRODUCTS FOR MANAGEMENT OF DATA DELETION REQUESTS BASED ON GEOGRAPHICALLY DISTRIBUTED DATA

(71) Applicant: Slack Technologies, Inc., San Francisco, CA (US)

(72) Inventors: Raissa Largman, San Francisco, CA (US); Keith Adams, San Francisco, CA (US); James Scheinblum, San Francisco, CA (US); Richard Crowley, San Francisco, CA (US); Ratnadeep Bhattacharjee, San Francisco, CA (US); Milo Watanabe, San Francisco, CA (US); Leah Jones, San Francisco, CA (US); Henry Robinson, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 17 days.

(21) Appl. No.: 17/018,165

(22) Filed: Sep. 11, 2020

(65) Prior Publication Data

US 2020/0412806 A1 Dec. 31, 2020

Related U.S. Application Data

(63) Continuation-in-part of application No. 16/702,197, filed on Dec. 3, 2019.
(Continued)

(51) Int. Cl.
 *H04L 67/1097* (2022.01)
 *G06F 16/29* (2019.01)
(Continued)

(52) U.S. Cl.
 CPC .......... *H04L 67/1097* (2013.01); *G06F 16/29* (2019.01); *H04L 51/216* (2022.05); *H04L 51/222* (2022.05); *H04L 65/403* (2013.01)

(58) Field of Classification Search
 None
 See application file for complete search history.

(56) References Cited

U.S. PATENT DOCUMENTS 5,944,838 A * 8/1999 Jantz ................... G06F 11/1443
 714/6.22
6,718,361 B1 4/2004 Basani et al.
(Continued)

FOREIGN PATENT DOCUMENTS

CA 3093718 A1 12/2019
EP 3667514 A1 6/2020
(Continued)

OTHER PUBLICATIONS

Office Action for Australian Patent Application 2020104253, dated Oct. 6, 2021, 4 pages.
(Continued)

*Primary Examiner* — Kris E Mackes
*Assistant Examiner* — Soheila (Gina) Davanlou
(74) *Attorney, Agent, or Firm* — Lee & Hayes, P.C.

(57) ABSTRACT

Systems, apparatuses, methods, and computer program products are provided for managing geographically distributed data storage in a group-based communication system and for servicing deletion requests related thereto. In some embodiments, an apparatus physically located in a first geographic area defined by a first geographic boundary is provided. In embodiments, upon determining that an entity identifier associated with a message is associated with a geographic data storage policy, the apparatus is configured to transmit a geographic data residency message package
(Continued)

comprising message data of the message to a geographic data residency server physically located within a second geographic area defined by a second geographic boundary. The second geographic area is associated with the geographic data storage policy. In some embodiments, the apparatus is configured to update the message data of the message with residency token data received from the geographic data residency server.

20 Claims, 29 Drawing Sheets

Related U.S. Application Data

(60) Provisional application No. 62/900,297, filed on Sep. 13, 2019, provisional application No. 62/895,333, filed on Sep. 3, 2019, provisional application No. 62/780,067, filed on Dec. 14, 2018.

(51) Int. Cl.
*H04L 51/216* (2022.01)
*H04L 51/222* (2022.01)
*H04L 65/403* (2022.01)

(56) References Cited

U.S. PATENT DOCUMENTS

| | | | |
|---|---|---|---|
| 7,546,459 | B2 | 6/2009 | Robles et al. |
| 7,546,465 | B2 | 6/2009 | Kent, Jr. et al. |
| 8,416,954 | B1 | 4/2013 | Raizen |
| 8,738,905 | B2 | 5/2014 | Ferris et al. |
| 9,100,355 | B2 | 8/2015 | Tomkow |
| 9,380,523 | B1 | 6/2016 | Mijar |
| 9,514,324 | B1 | 12/2016 | Potlapally et al. |
| 9,846,540 | B1* | 12/2017 | Franklin ............... G06F 3/0616 |
| 9,940,394 | B1 | 4/2018 | Grant et al. |
| 10,223,543 | B1 | 3/2019 | Mohen et al. |
| 10,372,926 | B1 | 8/2019 | Leshinsky et al. |
| 10,721,166 | B2 | 7/2020 | Barnes et al. |
| 10,778,419 | B2 | 9/2020 | Crowley et al. |
| 10,885,009 | B1* | 1/2021 | Anghel ............... G06F 16/2315 |
| 11,150,934 | B2 | 10/2021 | Beaty et al. |
| 11,395,211 | B2 | 7/2022 | Szrom et al. |
| 2005/0198170 | A1 | 9/2005 | LeMay et al. |
| 2009/0234845 | A1 | 9/2009 | DeSantis et al. |
| 2010/0114949 | A1* | 5/2010 | Sakamoto ........... G06F 16/1834 709/204 |
| 2013/0036100 | A1 | 2/2013 | Nagpal et al. |
| 2014/0114972 | A1 | 4/2014 | Ducott, III et al. |
| 2014/0148162 | A1 | 5/2014 | Maharaj |
| 2014/0344571 | A1 | 11/2014 | Adam et al. |
| 2014/0351606 | A1 | 11/2014 | Demilo et al. |
| 2015/0169624 | A1 | 6/2015 | Gupta et al. |
| 2015/0365361 | A1* | 12/2015 | Tomlinson ............ H04L 9/3247 709/206 |
| 2016/0050177 | A1 | 2/2016 | Cue et al. |
| 2016/0142350 | A1 | 5/2016 | Mutha |
| 2016/0173623 | A1 | 6/2016 | Broussard |
| 2016/0275303 | A1 | 9/2016 | Narayanaswamy et al. |
| 2016/0277498 | A1 | 9/2016 | Kulkarni et al. |
| 2016/0359684 | A1 | 12/2016 | Rizqi et al. |
| 2017/0063797 | A1 | 3/2017 | Jain |
| 2017/0091055 | A1 | 3/2017 | Rangaswami et al. |
| 2017/0371789 | A1* | 12/2017 | Blaner ................ G06F 12/0831 |
| 2018/0048464 | A1 | 2/2018 | Lim et al. |
| 2018/0089258 | A1 | 3/2018 | Bhattacharjee et al. |
| 2018/0124597 | A1 | 5/2018 | Malthankar et al. |
| 2018/0197144 | A1 | 7/2018 | Frank et al. |
| 2018/0287982 | A1 | 10/2018 | Draeger et al. |
| 2019/0074967 | A1 | 3/2019 | Stuntebeck et al. |
| 2019/0213255 | A1 | 7/2019 | Benantar |
| 2019/0278661 | A1 | 9/2019 | Mehta et al. |
| 2019/0379534 | A1 | 12/2019 | Crowley |
| 2019/0386683 | A1* | 12/2019 | Danilov ............... G06F 11/1076 |
| 2019/0386945 | A1 | 12/2019 | Wills et al. |
| 2020/0007529 | A1 | 1/2020 | Bahrenburg et al. |
| 2020/0076811 | A1 | 3/2020 | Rudden et al. |
| 2020/0192881 | A1 | 6/2020 | Largman et al. |
| 2020/0314173 | A1 | 10/2020 | Pahwa et al. |
| 2020/0374111 | A1 | 11/2020 | Crowley et al. |
| 2020/0412806 | A1 | 12/2020 | Largman et al. |
| 2021/0091933 | A1 | 3/2021 | Crowley et al. |
| 2023/0053443 | A1 | 2/2023 | Drummond |

FOREIGN PATENT DOCUMENTS

| | | | |
|---|---|---|---|
| EP | 3777015 | A1 | 4/2022 |
| JP | 2007193168 | A | 8/2007 |
| JP | 2014515524 | A | 6/2014 |
| JP | 2015049542 | A | 3/2015 |
| JP | 2020126600 | A | 8/2020 |
| JP | 2021510995 | A | 4/2021 |
| WO | 2014204862 | A1 | 12/2014 |
| WO | 2017040334 | A1 | 3/2017 |
| WO | WO2019236905 | A1 | 12/2019 |

OTHER PUBLICATIONS

Canadian Office Action dated Oct. 7, 2021 for Canadian Patent Application No. 3092836, a foreign counterpart to U.S. Appl. No. 16/918,284, 3 pages.

Japanese Office Action dated Nov. 16, 2021 for Japanese Patent Application No. 2019-225306, a foreign counterpart to U.S. Appl. No. 16/702,197, 5 pages.

Office Action for U.S. Appl. No. 16/702,197, dated Oct. 7, 2021, Largman, "Methods, Apparatuses, and Computer Program Products for Management of and Search Index Generation Based on Geographically Distributed Data", 21 Pages.

Canadian Office Action dated Jul. 9, 2021 for Canadian Patent Application No. 3063660, a foreign counterpart to U.S. Appl. No. 16/702,197, 7 pages.

Extended European Search Report dated Jun. 24, 2021 for European Patent Application No. 21155087.6, 8 pages.

"Die, Email, Die! A Flickr Cofounder Aims to Cut Us All Some Slack", ReadWriteWeb, LexisNexis, https://advance.lexis.com/api/permalink/33dd79e2-90f5-409d-ae27-5a2c7e86bf31/?context=1000516>. (dated Aug. 14, 2013, 4:15 PM) 2 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LexisNexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, LexisNexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

(56) References Cited

OTHER PUBLICATIONS

Matthew Ingram, "Flickr co-founder launches Slack, an all-in-one messaging tool designed to kill email forever", Gigaom, LexisNexis, https://advance.lexis.com/api/permalink/0b676b7c-aec3-4560-861e-d030d1dd008c/?context=1000516, (dated Feb. 12, 2014, 7:03 PM), 2 pages.
Michael Carney, "Slack is thriving on a cocktail of whimsy and great timing", PandoDaily, LexisNexis, https://advance.lexis.com/api/permalink/dd2d4ee5-2ddf-4d3a-a1d9-3bcee5e38b74/?context=1000516, (dated Feb. 6, 2015, 2:12 AM) 3 pages.
Mike Issac, "Slack, a Start-Up With an App to Foster Business Collaboration, Is Valued at $1.1 Billion", The New York Times Blogs (BITS), LexisNexis, https://advance.lexis.com/api/permalink/3eb84b34-a8f9-4d7d-9573-89d9598a4963/?context=1000516>. (dated Oct. 31, 2014) 2 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Rebecca Walberg, "Email biggest office waste of time: survey", National Post, At FP10, LexisNexis, https://advance.lexis.com/api/permalink/96268e3f-26ad-48ac-a98f-6c39804ebded/?context=1000516, (dated Mar. 4, 2014) 2 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Japanese Patent Application No. 2019-225306, Office Action with English translation, dated Mar. 23, 2021.
European Application No. 19734545.7, Examination Report dated Apr. 7, 2021.
Australian Patent No. 2020104253, Examination Report dated May 6, 2021.
EP Application No. 19213366.8 European Search Report dated Mar. 19, 2020.

WIPO Application No. PCT/US2019/035870, International Search Report and Written Opinion of the International Searching Authority, dated Sep. 20, 2019.
Australian Office Action dated Apr. 11, 2022 for Australian Patent Application No. 2021107603, a foreign counterpart to U.S. Appl. No. 16/918,284, 3 pages.
Japanese Office Action dated Dec. 14, 2021 for Japanese Patent Application No. 2020-170204, a foreign counterpart to U.S. Appl. No. 16/702,197, 6 pages.
Office Action for U.S. Appl. No. 16/702,197, dated Apr. 13, 2022, Largman, "Methods, Apparatuses, and Computer Program Products for Management of and Search Index Generation Based on Geographically Distributed Data", 24 Pages.
Canadian Office Action dated Aug. 30, 2022 for Canadian Patent Application No. 3092836, a foriegn counterpart to U.S. Appl. No. 16/918,284, 4 pages.
Extended European Search Report dated Feb. 17, 2023 for European Patent Application No. 22193799.8, 9 pages.
Final Office Action dated Oct. 17, 2022, for U.S. Appl. No. 16/702,197, entitled "Methods, Apparatuses, and Computer Program Products for Management of and Search Index Generation Based on Geographically Distributed Data" (26 pages).
Office Action issued by Canadian Patent Office dated Jul. 20, 2023 for related Application No. CA 3,092,836, a foreign counterpart to U.S. Pat. No. 11,539,675 (4 pages).
Extended European Search Report issued by the European Patent Office dated Mar. 19, 2020 for related European Application No. 19213366.8 (9 pages).
Office Action issued by Japan Patent Office dated Mar. 23, 2021 for related Application No. JP 2019-225306, with English translation (9 pages).
Notice of Reasons for Refusal dated Jun. 6, 2023 by the Japan Patent Office for related Application No. JP 2022-043400, a foreign counterpart of U.S. Appl. No. 16/702,197 (5 pages).
Office Action issued by Japan Patent Office dated Jul. 4, 2023 for related Application No. JP 2022-096935, a foreign counterpart to U.S. Pat. No. 11,539,675 ( 5 pages).
Non-Final Office Action dated Jun. 14, 2023, for related U.S. Appl. No. 16/702,197, entitled "Methods, Apparatuses, and Computer Program Products for Management of and Search Index Generation Based on Geogrpahically Distributed Data," (28 Pages).

\* cited by examiner

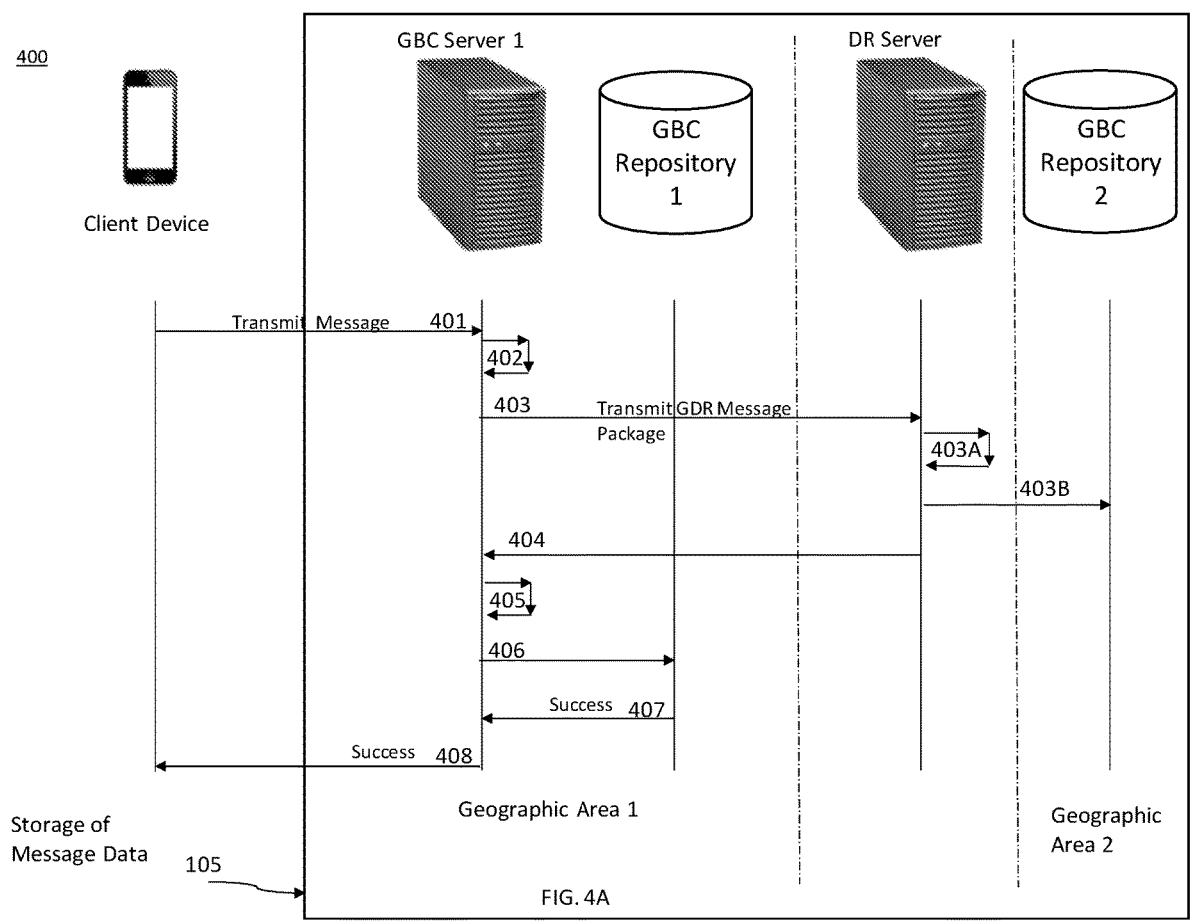

US 11,949,739 B2

METHODS, APPARATUSES, AND COMPUTER PROGRAM PRODUCTS FOR MANAGEMENT OF DATA DELETION REQUESTS BASED ON GEOGRAPHICALLY DISTRIBUTED DATA

RELATED APPLICATIONS

This application is a continuation-in-part of, and claims priority to, U.S. Non-Provisional patent application Ser. No. 16/702,197 filed Dec. 3, 2019 ("the '197 application"). The '197 application claims priority to U.S. Provisional Patent Application No. 62/780,067, filed Dec. 14, 2018, and U.S. Provisional Patent Application No. 62/895,333, filed Sep. 3, 2019. The above-identified applications are herein incorporated by reference in their entirety. This application also claims priority to U.S. Provisional Patent Application No. 62/900,297, filed Sep. 13, 2019. The contents of this provisional application are also herein incorporated by reference in its entirety.

BACKGROUND

Messaging systems are generally configured to facilitate electronic communications between a variety of geographically distributed client devices. Applicant has identified a number of deficiencies and problems associated with the transmission of message data in conventional messaging systems. Through applied effort, ingenuity, and innovation, many of these identified problems have been solved by developing solutions that are included in some embodiments of the present disclosure, many examples of which are described in detail herein.

BRIEF SUMMARY

This specification relates to managing transmission and access of message data in a group-based communication system. Further, this specification relates to generating one or more search indices for storing in various geographic areas, and/or utilizing one or more search indices associated with message data (e.g., message text data and/or message file data) stored in a group-based communication system. Furthermore, this specification relates to managing deletion of geographically distributed message data in a group-based communication system.

In embodiments, an apparatus for managing geographically distributed data storage in a group-based communication system is provided. The apparatus is physically located in a first geographic area defined by a first geographic boundary. The apparatus comprises at least one processor and at least one non-transitory memory including computer program code, the at least one non-transitory memory and the computer program code configured to, with the at least one processor, cause the apparatus to: upon determining that an entity identifier associated with a message is associated with a geographic data storage policy, transmit a geographic data residency message package comprising message data of the message to a geographic data residency server physically located within a second geographic area defined by a second geographic boundary. The second geographic area is associated with the geographic data storage policy. In some embodiments, the at least one non-transitory memory and the computer program code are configured to, with the at least one processor, further cause the apparatus to update the message data of the message with residency token data received from the geographic data residency server. In some embodiments, the at least one non-transitory memory and the computer program code are configured to, with the at least one processor, further cause the apparatus to store the updated message in a geographic data residency local repository physically located in the first geographic area defined by the first geographic boundary. In some embodiments, the updated message comprises the residency token data, the message metadata, and the message identifier. In some embodiments, the geographic data residency local repository address is associated with a geographic data residency local repository physically located within the second geographic boundary associated with the geographic data storage policy. In some embodiments, a recipient identifier associated with the message is associated with a different geographic data storage policy from that with which an author identifier is associated. In some embodiments, the apparatus is further caused to determine the geographic data residency server physically located in the second geographic area is inaccessible; transmit the geographic data residency message package comprising the message data of the message to a geographic data residency server physically located within a backup geographic area defined by a backup geographic boundary, the backup geographic area associated with the geographic data storage policy; update the message data of the message with backup residency token data received from the backup geographic data residency server; and store the updated message data in the geographic data residency local repository physically located in the first geographic area defined by the first geographic boundary. Additionally or alternatively, in some embodiments, the apparatus is further caused to determine the geographic data residency server physically located in the second geographic area has become accessible, and identify the geographic data residency message package from the backup geographic data residency server physically located in the backup geographic area, where transmitting the geographic data residency message package to the geographic data residency server physically located in the second geographic area occurs in response to determining the geographic data residency server located in the second geographic area has become accessible.

In embodiments, an apparatus for managing geographically distributed data storage in a group-based communication system is provided. The apparatus is physically located in a first geographic area defined by a first geographic boundary. The apparatus comprises at least one processor and at least one non-transitory memory including computer program code, the at least one non-transitory memory and the computer program code configured to, with the at least one processor, cause the apparatus to extract an entity identifier from the message metadata. In some embodiments, the at least one non-transitory memory and the computer program code are configured to, with the at least one processor, further cause the apparatus to upon determining that the entity identifier is associated with a geographic data storage policy, transmit a geographic data residency message package comprising message data of the message to a geographic data residency server physically located within a second geographic area defined by a second geographic boundary. The second geographic area is associated with the geographic data storage policy. In some embodiments, the at least one non-transitory memory and the computer program code are configured to, with the at least one processor, further cause the apparatus to receive, from the geographic data residency server, residency token data referencing a geographic data residency local repository address associated with the message data, the geographic data residency local repository address associated with a geographic data residency local repository physically located within the second geographic boundary associated with the geographic data storage policy. In some embodiments, the at least one non-transitory memory and the computer program code are configured to, with the at least one processor, further cause the apparatus to update the message data of the message with residency token data received from the geographic data residency server. The updated message comprises the residency token data, the message metadata, and the message identifier. In some embodiments, the at least one non-transitory memory and the computer program code are configured to, with the at least one processor, further cause the apparatus to store the updated message in a local repository physically located in the first geographic area defined by the first geographic boundary.

In some embodiments, the geographic data residency message package comprises a subset of the message data, and wherein the subset of the message data is replaced with the residency token data in the updated message. In some embodiments, the at least one non-transitory memory and the computer program code are configured to, with the at least one processor, further cause the apparatus to receive, from a second client device, a message retrieval request, the message retrieval request comprising the message identifier. In some embodiments, the at least one non-transitory memory and the computer program code are configured to, with the at least one processor, further cause the apparatus to retrieve, from the local repository, the updated message. In some embodiments, the at least one non-transitory memory and the computer program code are configured to, with the at least one processor, further cause the apparatus to upon determining that the updated message comprises residency token data, transmit a geographic data residency data retrieval request to a geographic data residency server associated with the residency token data, the geographic data residency retrieval request comprising the residency token data. In some embodiments, the at least one non-transitory memory and the computer program code are configured to, with the at least one processor, further cause the apparatus to receive, from the geographic data residency server, the message data stored in the geographic data residency local repository at a geographic data residency local repository address associated with the residency token data. In some embodiments, the at least one non-transitory memory and the computer program code are configured to, with the at least one processor, further cause the apparatus to transmit the message data to the client device.

In some embodiments, the first geographic boundary is defined by a first plurality of latitude and longitude coordinates and the second geographic boundary is defined by a second plurality of latitude and longitude coordinates. In some embodiments, first geographic boundary is subject to a first data storage policy and the second geographic boundary is subject to a second data storage policy. In some embodiments, the geographic data residency message package further comprises a subset of the message metadata, and wherein the subset of the message metadata is also replaced with the data residency data in the updated message. In some embodiments, the geographic data residency server is physically located within a third geographic area defined by a third geographic boundary. In some embodiments, the message data is stored in short term memory such that persistence of the message data only exists at the geographic data residency local repository. In some embodiments, the geographic data storage policy is associated with legal data storage requirements associated with a particular geographic boundary. In some embodiments, each of the first geographic boundary, the second geographic boundary, and the particular geographic boundary is one or more of Asia, western Europe, or North America. In some embodiments, the residency token data comprises one or more of a message identifier, a storage location identifier, or a message encryption key. In some embodiments, at least one organization identifier associated with a group-based communication channel identifier associated with the message is different from the organization identifier associated with the entity identifier. In some embodiments, the message encryption key includes a first message encryption key associated with the organization identifier and a second message encryption key associated with the at least one organization identifier. In some embodiments, the message encryption key is used for decryption in conjunction with a centrally managed message encryption key managed by a group-based communication server. In some embodiments, the residency token data is transmitted to a group-based communication encryption key management server by the geographic data residency server before received by the apparatus. In some embodiments, the message retrieval request is forwarded to a geographic data residency server in an instance where the geographic data residency server cannot locate the residency token data.

In some example embodiments, an apparatus for generating a search index based on geographically distributed data storage in a group-based communication system is provided. The apparatus is physically located in a first geographic area defined by a first geographic boundary. The apparatus comprising at least one processor and at least one non-transitory memory including computer program code, the at least one non-transitory memory and the computer program code configured to, with the at least one processor, cause the apparatus to receive, from a geographic data residency server located within a second geographic area defined by a second geographic boundary, a message metadata set comprising at least a residency token data set. In some embodiments, the at least one non-transitory memory and the computer program code are configured to, with the at least one processor, further cause the apparatus to retrieve, from a geographic data residency local repository associated with the second geographic boundary, a message data set based on at least the residency token data set. In some embodiments, the at least one non-transitory memory and the computer program code are configured to, with the at least one processor, further cause the apparatus to generate a search index based on the message metadata set and the message data set. In some embodiments, the at least one non-transitory memory and the computer program code are configured to, with the at least one processor, further cause the apparatus to store the search index in the geographic data residency local repository within the second geographic area.

In some embodiments, the apparatus is configured to retrieve, from a geographic data residency local repository associated with the second geographic boundary, the message data set based on at least the residency token data set by: generating a geographic data residency data retrieval request comprising the residency token data set; transmitting the geographic data residency data retrieval request to the geographic data residency server associated with the second geographic area to cause the geographic data residency server to retrieve the message data from the geographic data residency local repository associated with the second geographic area; and receiving the message data set as a response from the geographic data residency server associated with the second geographic area.

In some embodiments, the apparatus is configured to retrieve, from a geographic data residency local repository associated with the second geographic boundary, the message data set based on at least the residency token data set by: identifying at least one message decryption key associated with the residency token data set; generating a geographic data residency data retrieval request comprising the residency token data set; receiving an encrypted message data set as a response from the geographic data residency server associated with the second geographic area; and decrypting the encrypted message set using the at least one message decryption key to identify the message data set.

In some embodiments, the apparatus is configured to retrieve the message data set based on one or more of the residency token data set or a message identification set. In some embodiments, the geographic data residency local repository comprises a geographic data residency local cache.

In some example embodiments, an apparatus for generating search results data using a distributed search index in a group-based communication system is provided. The apparatus is physically located in a first geographic area defined by a first geographic boundary. The apparatus comprising at least one processor and at least one non-transitory memory including computer program code, the at least one non-transitory memory and the computer program code configured to, with the at least one processor, cause the apparatus to receive, from a requestor system, a search request associated with a searching entity identifier. The searching entity identifier is associated with a second geographic area defined by a second geographic boundary. In some embodiments, the at least one non-transitory memory and the computer program code are configured to, with the at least one processor, further cause the apparatus to retrieve, from a geographic data residency server associated with the second geographic area, a search index for the searching entity identifier. In some embodiments, the at least one non-transitory memory and the computer program code are configured to, with the at least one processor, further cause the apparatus to identify search results data based on the search index. In some embodiments, the at least one non-transitory memory and the computer program code are configured to, with the at least one processor, further cause the apparatus to provide the search results data to the requestor system.

In some embodiments, the search results data comprises at least a message data set, and identify the search results data based on the search index, the apparatus is configured to: identify, based on the search request and the search index, a residency token data set associated with search results data; receive, from a geographic data residency server associated with the second geographic area, search result data comprising a message data set based on at least the residency token data set; and provide, to the requestor system, the search result data comprising at least the message data set.

In some embodiments, the message data set comprises an encrypted message data set, and the apparatus further is configured to: identify a message decryption key set based on the residency token data set; decrypt the encrypted message data set based on the message decryption key set to identify an unencrypted message data set; and include the unencrypted message data set in the search results data.

In some embodiments, the apparatus is further configured to: retrieve the search index from the geographic data residency server associated with the second geographic boundary based an entity search key, wherein the entity search key is retrievable based on the searching entity identifier.

In some example embodiments, an apparatus for generating a search index based on geographically distributed data storage in a group-based communication system is provided. The apparatus is physically located in a first geographic area defined by a first geographic boundary. the apparatus comprising at least one processor and at least one non-transitory memory including computer program code, the at least one non-transitory memory and the computer program code configured to, with the at least one processor, cause the apparatus to retrieve, from a geographic data residency local repository associated with the first geographic boundary, a first message data subset and a message metadata set associated with a common group-based communication channel identifier.

In some embodiments, the at least one non-transitory memory and the computer program code are configured to, with the at least one processor, further cause the apparatus to receive, from a geographic data residency server located within a second geographic area defined by a second geographic boundary, a second message data subset based on at least a residency token data set of the message metadata set, the second message data subset associated with the common group-based communication channel identifier. In some embodiments, the at least one non-transitory memory and the computer program code are configured to, with the at least one processor, further cause the apparatus to generate a search index based on the first message data subset, the second message data subset, and the message metadata set. In some embodiments, the at least one non-transitory memory and the computer program code are configured to, with the at least one processor, further cause the apparatus to store the search index in the geographic data residency local repository associated with the first geographic boundary.

In some embodiments, to retrieve the second message data subset, the apparatus is configured to: transmit at least the residency token data set to the geographic data residency server located within the second geographic area, wherein the geographic data residency server within the second geographic area retrieves, based on the residency token data set, the second message data subset from a second geographic data residency local repository within the second geographic area; and receive the first message data subset from the geographic data residency server within the second geographic area in response to the transmission.

In some embodiments, the apparatus is further configured to identify at least one message decryption key for a second entity data object identifier associated with the common group-based communication channel identifier. In some embodiments, the second entity data object identifier is associated with a data residency policy data object corresponding to the second geographic area.

In some embodiments, to retrieve the second message data subset, the apparatus is configured to: transmit the residency token data set to the geographic data residency server located within the second geographic area, wherein the geographic data residency server within the second geographic area retrieves a second encrypted message data subset from a second geographic data residency local repository within the second geographic area based on the residency token data set; receive the second encrypted message data subset from the geographic data residency server within the second geographic area; and decrypt the second encrypted message data subset utilizing the at least one message decryption key.

In some embodiments, the apparatus is further configured to identify the geographic data residency server associated with the second geographic area based on one or more of a portion of the message metadata set or the residency token data set. In some embodiments, the apparatus is further configured to cause the geographic data residency server associated with the second geographic boundary to copy the message metadata set.

In some example embodiments, a computer-implemented method for managing geographically distributed data storage in a group-based communication system is provided. The computer-implemented method includes upon determining that an entity identifier associated with a message is associated with a geographic data storage policy, transmitting a geographic data residency message package comprising message data of the message to a geographic data residency server physically located within a second geographic area defined by a second geographic boundary. The second geographic area is associated with the geographic data storage policy. In some embodiments, the computer-implemented method further includes updating the message data of the message with residency token data received from the geographic data residency server. In some embodiments, the computer-implemented method further includes storing the updated message in a geographic data residency local repository physically located in a first geographic area defined by a first geographic boundary. In some embodiments, the computer-implemented method further includes determining the geographic data residency server physically located in the second geographic area is inaccessible; transmitting the geographic data residency message package comprising the message data of the message to a backup geographic data residency server physically located within a backup geographic area defined by a backup geographic boundary, the backup geographic area associated with the geographic data storage policy; updating the message data of the message with backup residency token data received from the backup geographic data residency server; and storing the updated message data in the geographic data residency local repository physically located in the first geographic area defined by the first geographic boundary. Additionally or alternatively, in some embodiments, the computer-implemented method further includes determining the geographic data residency server physically located in the second geographic area has become accessible, and identifying the geographic data residency message package from the backup geographic data residency server physically located in the backup geographic area, where transmitting the geographic data residency message package to the geographic data residency server physically located in the second geographic area occurs in response to determining the geographic data residency server located in the second geographic area has become accessible.

In some embodiments, the updated message comprises the residency token data, the message metadata, and the message identifier. In some embodiments, the geographic data residency local repository address is associated with a geographic data residency local repository physically located within the second geographic boundary associated with the geographic data storage policy. In some embodiments, a recipient identifier associated with the message is associated with a different geographic data storage policy from that with which an author identifier is associated.

In some example embodiments, a computer-implemented method for managing geographically distributed data storage in a group-based communication system is provided. The computer-implemented method includes receiving, from a first client device and at an apparatus physically located in a first geographic area defined by a first geographic boundary, a message comprising message data, message metadata, and a message identifier. In some embodiments, the computer-implemented method further includes extracting an entity identifier from the message metadata. In some embodiments, the computer-implemented method further includes upon determining that the entity identifier is associated with a geographic data storage policy, transmitting a geographic data residency message package comprising message data of the message to a geographic data residency server physically located within a second geographic area defined by a second geographic boundary. The second geographic area is associated with the geographic data storage policy. In some embodiments, the computer-implemented method further includes receiving, from the geographic data residency server, residency token data referencing a geographic data residency local repository address associated with the message data, the geographic data residency local repository address associated with a geographic data residency local repository physically located within the second geographic boundary associated with the geographic data storage policy. In some embodiments, the computer-implemented method further includes updating the message data of the message with residency token data received from the geographic data residency server. The updated message comprises the residency token data, the message metadata, and the message identifier. In some embodiments, the computer-implemented method further includes storing the updated message in a local repository physically located in the first geographic area defined by the first geographic boundary.

In some embodiments, the geographic data residency message package comprises a subset of the message data, and wherein the subset of the message data is replaced with the residency token data in the updated message.

In some embodiments, the computer-implemented method further includes receiving, from a second client device, a message retrieval request, the message retrieval request comprising the message identifier. In some embodiments, the computer-implemented method further includes retrieving, from the local repository, the updated message. In some embodiments, the computer-implemented method further includes upon determining that the updated message comprises residency token data, transmitting a geographic data residency data retrieval request to a geographic data residency server associated with the residency token data, the geographic data residency retrieval request comprising the residency token data. In some embodiments, the computer-implemented method further includes receiving, from the geographic data residency server, the message data stored in the geographic data residency local repository at a geographic data residency local repository address associated with the residency token data. In some embodiments, the computer-implemented method further includes transmitting the message data to the client device.

In some embodiments, the first geographic boundary is defined by a first plurality of latitude and longitude coordinates and the second geographic boundary is defined by a second plurality of latitude and longitude coordinates. In some embodiments, the first geographic boundary is subject to a first data storage policy and the second geographic boundary is subject to a second data storage policy. In some embodiments, the geographic data residency message package further comprises a subset of the message metadata, and wherein the subset of the message metadata is also replaced with the data residency data in the updated message. In some embodiments, the geographic data residency server is physically located within a third geographic area defined by a third geographic boundary. In some embodiments, the message data is stored in short term memory such that persistence of the message data only exists at the geographic data residency local repository. In some embodiments, the geographic data storage policy is associated with legal data storage requirements associated with a particular geographic boundary. In some embodiments, each of the first geographic boundary, the second geographic boundary, and the particular geographic boundary is one or more of Asia, western Europe, or North America. In some embodiments, the residency token data comprises one or more of a message identifier, a storage location identifier, or a message encryption key. In some embodiments, at least one organization identifier associated with a group-based communication channel identifier associated with the message is different from the organization identifier associated with the entity identifier. In some embodiments, the message encryption key includes a first message encryption key associated with the organization identifier and a second message encryption key associated with the at least one organization identifier. In some embodiments, the message encryption key is used for decryption in conjunction with a centrally managed message encryption key managed by a group-based communication server. In some embodiments, the residency token data is transmitted to a group-based communication encryption key management server by the geographic data residency server before received by the apparatus. In some embodiments, the message retrieval request is forwarded to a geographic data residency server in an instance where the geographic data residency server cannot locate the residency token data.

In some embodiments, a computer-implemented method for generating a search index based on geographically distributed data storage in a group-based communication system is provided. The computer-implemented method includes receiving, from a geographic data residency server located within a second geographic area defined by a second geographic boundary and at an apparatus physically located in a first geographic area defined by a first geographic boundary, a message metadata set comprising at least a residency token data set. In some embodiments, the computer-implemented method further includes retrieving, from a geographic data residency local repository associated with the second geographic boundary, a message data set based on at least the residency token data set. In some embodiments, the computer-implemented method further includes generating a search index based on the message metadata set and the message data set. In some embodiments, the computer-implemented method further includes storing the search index in the geographic data residency local repository within the second geographic area. In some embodiments, retrieving, from the geographic data residency local repository associated with the second geographic boundary, the message data set based on at least the residency token data set comprises: generating a geographic data residency data retrieval request comprising the residency token data set; transmitting the geographic data residency data retrieval request to the geographic data residency server associated with the second geographic area to cause the geographic data residency server to retrieve the message data from the geographic data residency local repository associated with the second geographic area; and receiving the message data set as a response from the geographic data residency server associated with the second geographic area.

In some embodiments, retrieving, from the geographic data residency local repository associated with the second geographic boundary, the message data set based on at least the residency token data set comprises: identifying at least one message decryption key associated with the residency token data set; generating a geographic data residency data retrieval request comprising the residency token data set; receiving an encrypted message data set as a response from the geographic data residency server associated with the second geographic area; and decrypting the encrypted message set using the at least one message decryption key to identify the message data set.

In some embodiments, the computer-implemented method further includes retrieving the message data set based on one or more of the residency token data set or a message identification set. In some embodiments, the geographic data residency local repository comprises a geographic data residency local cache.

In some embodiments, a computer-implemented method for generating search results data using a distributed search index in a group-based communication system is provided. The computer-implemented method includes receiving, from a requestor system and at an apparatus physically located in a first geographic area defined by a first geographic boundary, a search request associated with a searching entity identifier. The searching entity identifier is associated with a second geographic area defined by a second geographic boundary. In some embodiments, the computer-implemented method further includes retrieving, from a geographic data residency server associated with the second geographic area, a search index for the searching entity identifier. In some embodiments, the computer-implemented method further includes identifying search results data based on the search index. In some embodiments, the computer-implemented method further includes providing the search results data to the requestor system.

In some embodiments, the search results data comprises at least a message data set, and identifying the search results data based on the search index comprises: identifying, based on the search request and the search index, a residency token data set associated with search results data; receiving, from a geographic data residency server associated with the second geographic area, search result data comprising a message data set based on at least the residency token data set; and providing, to the requestor system, the search result data comprising at least the message data set.

In some embodiments, the message data set comprises an encrypted message data set, and the method further includes identifying a message decryption key set based on the residency token data set; decrypting the encrypted message data set based on the message decryption key set to identify an unencrypted message data set; and including the unencrypted message data set in the search results data. In some embodiments, the computer-implemented method further includes retrieving the search index from the geographic data residency server associated with the second geographic boundary based an entity search key, wherein the entity search key is retrievable based on the searching entity identifier.

In some embodiments, a computer-implemented method for generating a search index based on geographically distributed data storage in a group-based communication system is provided. The computer-implemented method includes retrieving, by an apparatus physically located in a first geographic area defined by a first geographic boundary and from a geographic data residency local repository associated with the first geographic boundary, a first message data subset and a message metadata set associated with a common group-based communication channel identifier. In some embodiments, the computer-implemented method further includes receiving, from a geographic data residency server located within a second geographic area defined by a second geographic boundary, a second message data subset based on at least a residency token data set of the message metadata set, the second message data subset associated with the common group-based communication channel identifier. In some embodiments, the computer-implemented method further includes generating a search index based on the first message data subset, the second message data subset, and the message metadata set. In some embodiments, the computer-implemented method further includes storing the search index in the geographic data residency local repository associated with the first geographic boundary.

In some embodiments, retrieving the second message data subset comprises: transmitting at least the residency token data set to the geographic data residency server located within the second geographic area, wherein the geographic data residency server within the second geographic area retrieves, based on the residency token data set, the second message data subset from a second geographic data residency local repository within the second geographic area; and receiving the first message data subset from the geographic data residency server within the second geographic area in response to the transmission.

In some embodiments, the computer-implemented method further includes identifying at least one message decryption key for a second entity data object identifier associated with the common group-based communication channel identifier. In some embodiments, the second entity data object identifier is associated with a data residency policy data object corresponding to the second geographic area.

In some embodiments, retrieving the second message data subset comprises: transmitting the residency token data set to the geographic data residency server located within the second geographic area, wherein the geographic data residency server within the second geographic area retrieves a second encrypted message data subset from a second geographic data residency local repository within the second geographic area based on the residency token data set; receiving the second encrypted message data subset from the geographic data residency server within the second geographic area; and decrypting the second encrypted message data subset utilizing the at least one message decryption key.

In some embodiments, the method further includes identifying the geographic data residency server associated with the second geographic area based on one or more of a portion of the message metadata set or the residency token data set.

In some embodiments, the method further includes causing the geographic data residency server associated with the second geographic boundary to copy the message metadata set.

In some example embodiments, a computer program product for managing geographically distributed data storage in a group-based communication system is provided. The computer program product comprising at least one non-transitory computer-readable storage medium having computer-executable program code instructions stored therein, the computer-executable program code instructions, in execution with a processor, configured to: upon determining that an entity identifier associated with a message is associated with a geographic data storage policy, transmit a geographic data residency message package comprising message data of the message to a geographic data residency server physically located within a second geographic area defined by a second geographic boundary. The second geographic area is associated with the geographic data storage policy. The computer-executable program code instructions, in execution with a processor, are further configured to update the message data of the message with residency token data received from the geographic data residency server. The computer-executable program code instructions, in execution with a processor, are further configured to store the updated message in a geographic data residency local repository physically located in a first geographic area defined by a first geographic boundary. In some embodiments, the compute program product is further configured to determine the geographic data residency server physically located in the second geographic area is inaccessible; transmit the geographic data residency message package comprising the message data of the message to a geographic data residency server physically located within a backup geographic area defined by a backup geographic boundary, the backup geographic area associated with the geographic data storage policy; update the message data of the message with backup residency token data received from the backup geographic data residency server; and store the updated message data in the geographic data residency local repository physically located in the first geographic area defined by the first geographic boundary. Additionally or alternatively, in some embodiments, the computer program product is further configured to determine the geographic data residency server physically located in the second geographic area has become accessible, and identify the geographic data residency message package from the backup geographic data residency server physically located in the backup geographic area, where transmitting the geographic data residency message package to the geographic data residency server physically located in the second geographic area occurs in response to determining the geographic data residency server located in the second geographic area has become accessible.

In some embodiments, the updated message comprises the residency token data, the message metadata, and the message identifier.

In some embodiments, the geographic data residency local repository address is associated with a geographic data residency local repository physically located within the second geographic boundary associated with the geographic data storage policy.

In some embodiments, a recipient identifier associated with the message is associated with a different geographic data storage policy from that with which an author identifier is associated.

In some example embodiments, a computer program product for managing geographically distributed data storage in a group-based communication system is provided. The computer program product comprising at least one non-transitory computer-readable storage medium having computer-executable program code instructions stored therein, the computer-executable program code instructions, in execution with a processor, configured to: receive, from a first client device and at an apparatus physically located in a first geographic area defined by a first geographic boundary, a message comprising message data, message metadata, and a message identifier. The computer-executable program code instructions, in execution with a processor, are further configured to extract an entity identifier from the message metadata. The computer-executable program code instructions, in execution with a processor, are further configured to upon determining that the entity identifier is associated with a geographic data storage policy, transmit a geographic data residency message package comprising message data of the message to a geographic data residency server physically located within a second geographic area defined by a second geographic boundary. The second geographic area is associated with the geographic data storage policy. The computer-executable program code instructions, in execution with a processor, are further configured to receive, from the geographic data residency server, residency token data referencing a geographic data residency local repository address associated with the message data, the geographic data residency local repository address associated with a geographic data residency local repository physically located within the second geographic boundary associated with the geographic data storage policy. The computer-executable program code instructions, in execution with a processor, are further configured to update the message data of the message with residency token data received from the geographic data residency server. The updated message comprises the residency token data, the message metadata, and the message identifier. The computer-executable program code instructions, in execution with a processor, are further configured to store the updated message in a local repository physically located in the first geographic area defined by the first geographic boundary.

In some embodiments, the geographic data residency message package comprises a subset of the message data and the subset of the message data is replaced with the residency token data in the updated message.

In some embodiments, the computer-executable program code instructions, in execution with the processor, are further configured to: receive, from a second client device, a message retrieval request, the message retrieval request comprising the message identifier; retrieve, from the local repository, the updated message; upon determining that the updated message comprises residency token data, transmit a geographic data residency data retrieval request to a geographic data residency server associated with the residency token data, the geographic data residency retrieval request comprising the residency token data; receive, from the geographic data residency server, the message data stored in the geographic data residency local repository at a geographic data residency local repository address associated with the residency token data; and transmit the message data to the client device.

In some embodiments, the first geographic boundary is defined by a first plurality of latitude and longitude coordinates and the second geographic boundary is defined by a second plurality of latitude and longitude coordinates. In some embodiments, the first geographic boundary is subject to a first data storage policy and the second geographic boundary is subject to a second data storage policy. In some embodiments, the geographic data residency message package further comprises a subset of the message metadata, and wherein the subset of the message metadata is also replaced with the data residency data in the updated message. In some embodiments, the geographic data residency server is physically located within a third geographic area defined by a third geographic boundary. In some embodiments, the message data is stored in short term memory such that persistence of the message data only exists at the geographic data residency local repository. In some embodiments, the geographic data storage policy is associated with legal data storage requirements associated with a particular geographic boundary. In some embodiments, each of the first geographic boundary, the second geographic boundary, and the particular geographic boundary is one or more of Asia, western Europe, or North America. In some embodiments, the residency token data comprises one or more of a message identifier, a storage location identifier, or a message encryption key.

In some embodiments, at least one organization identifier associated with a group-based communication channel identifier associated with the message is different from the organization identifier associated with the entity identifier. In some embodiments, the message encryption key includes a first message encryption key associated with the organization identifier and a second message encryption key associated with the at least one organization identifier. In some embodiments, the message encryption key is used for decryption in conjunction with a centrally managed message encryption key managed by a group-based communication server. In some embodiments, the residency token data is transmitted to a group-based communication encryption key management server by the geographic data residency server before received by the apparatus. In some embodiments, the message retrieval request is forwarded to a geographic data residency server in an instance where the geographic data residency server cannot locate the residency token data.

In some embodiments, a computer program product for generating a search index based on geographically distributed data storage in a group-based communication system is provided. The computer program product comprising at least one non-transitory computer-readable storage medium having computer-executable program code instructions stored therein, the computer-executable program code instructions, in execution with a processor, configured to: receive, at an apparatus located within a first geographic area defined by a first geographic boundary and from geographic data residency server located within a second geographic area defined by a second geographic boundary, a message metadata set comprising at least a residency token data set. In some embodiments, the computer-executable program code instructions, in execution with the processor, are further configured to retrieve, from a geographic data residency local repository associated with the second geographic boundary, a message data set based on at least the residency token data set. In some embodiments, the computer-executable program code instructions, in execution with the processor, are further configured to generate a search index based on the message metadata set and the message data set. In some embodiments, the computer-executable program code instructions, in execution with the processor, are further configured to store the search index in the geographic data residency local repository within the second geographic area.

In some embodiments, the computer-executable program code instructions, in execution with the processor, are further configured to retrieve, from the geographic data residency local repository associated with the second geographic boundary, the message data set based on at least the residency token data set by: generating a geographic data residency data retrieval request comprising the residency token data set; transmitting the geographic data residency data retrieval request to the geographic data residency server associated with the second geographic area to cause the geographic data residency server to retrieve the message data from the geographic data residency local repository associated with the second geographic area; and receiving the message data set as a response from the geographic data residency server associated with the second geographic area.

In some embodiments, the computer-executable program code instructions, in execution with the processor, are further configured to retrieve, from the geographic data residency local repository associated with the second geographic boundary, the message data set based on at least the residency token data set by: identifying at least one message decryption key associated with the residency token data set; generating a geographic data residency data retrieval request comprising the residency token data set; receiving an encrypted message data set as a response from the geographic data residency server associated with the second geographic area; and decrypting the encrypted message set using the at least one message decryption key to identify the message data set.

In some embodiments, the computer-executable program code instructions, in execution with the processor, are further configured to retrieve the message data set based on one or more of the residency token data set or a message identification set. In some embodiments, the geographic data residency local repository comprises a geographic data residency local cache.

In some embodiments, a computer program product for generating search results data using a distributed search index in a group-based communication system in a group-based communication system is provided. The computer program product comprising at least one non-transitory computer-readable storage medium having computer-executable program code instructions stored therein, the computer-executable program code instructions, in execution with a processor, configured to: receive, at an apparatus located within a first geographic area defined by a first geographic boundary and from a requestor system, a search request associated with a searching entity identifier. The searching entity identifier is associated with a second geographic area defined by a second geographic boundary. In some embodiments, the computer-executable program code instructions, in execution with the processor, are further configured to retrieve, from a geographic data residency server associated with the second geographic area, a search index for the searching entity identifier. In some embodiments, the computer-executable program code instructions, in execution with the processor, are further configured to identify search results data based on the search index. In some embodiments, the computer-executable program code instructions, in execution with the processor, are further configured to provide the search results data to the requestor system. In some embodiments, the search results data comprises at least a message data set, and to identify the search results data based on the search index, the computer-executable program code instructions, in execution with the processor, are further configured to: identify, based on the search request and the search index, a residency token data set associated with search results data; receive, from a geographic data residency server associated with the second geographic area, search result data comprising a message data set based on at least the residency token data set; and provide, to the requestor system, the search result data comprising at least the message data set.

In some embodiments, the message data set comprises an encrypted message data set, and the computer-executable program code instructions, in execution with the processor, are further configured to: identify a message decryption key set based on the residency token data set; decrypt the encrypted message data set based on the message decryption key set to identify an unencrypted message data set; and include the unencrypted message data set in the search results data. In some embodiments, the computer-executable program code instructions, in execution with the processor, are further configured to: retrieve the search index from the geographic data residency server associated with the second geographic boundary based an entity search key, wherein the entity search key is retrievable based on the searching entity identifier.

In some embodiments, a computer program product for generating a search index based on geographically distributed data storage in a group-based communication system is provided. The computer program product comprising at least one non-transitory computer-readable storage medium having computer-executable program code instructions stored therein, the computer-executable program code instructions, in execution with a processor, configured to retrieve, at an apparatus located within a first geographic area defined by a first geographic boundary and from a geographic data residency local repository associated with the first geographic boundary, a first message data subset and a message metadata set associated with a common group-based communication channel identifier. In some embodiments, the computer-executable program code instructions, in execution with the processor, are further configured to receive, from a geographic data residency server located within a second geographic area defined by a second geographic boundary, a second message data subset based on at least a residency token data set of the message metadata set, the second message data subset associated with the common group-based communication channel identifier. In some embodiments, the computer-executable program code instructions, in execution with the processor, are further configured to generate a search index based on the first message data subset, the second message data subset, and the message metadata set. In some embodiments, the computer-executable program code instructions, in execution with the processor, are further configured to store the search index in the geographic data residency local repository associated with the first geographic boundary.

In some embodiments, to retrieve the second message data subset, the computer-executable program code instructions, in execution with the processor, are further configured to: transmit at least the residency token data set to the geographic data residency server located within the second geographic area, wherein the geographic data residency server within the second geographic area retrieves, based on the residency token data set, the second message data subset from a second geographic data residency local repository within the second geographic area; and receive the first message data subset from the geographic data residency server within the second geographic area in response to the transmission.

In some embodiments, the computer-executable program code instructions, in execution with the processor, are further configured to: identify at least one message decryption key for a second entity data object identifier associated with the common group-based communication channel identifier. In some embodiments, the second entity data object identifier is associated with a data residency policy data object corresponding to the second geographic area. In some embodiments, to retrieve the second message data subset, the computer-executable program code instructions, in execution with the processor, are further configured to: transmit the residency token data set to the geographic data residency server located within the second geographic area, wherein the geographic data residency server within the second geographic area retrieves a second encrypted message data subset from a second geographic data residency local repository within the second geographic area based on the residency token data set; receive the second encrypted message data subset from the geographic data residency server within the second geographic area; and decrypt the second encrypted message data subset utilizing the at least one message decryption key.

In some embodiments, the computer-executable program code instructions, in execution with the processor, are further configured to: identify the geographic data residency server associated with the second geographic area based on one or more of a portion of the message metadata set or the residency token data set. In some embodiments, the computer-executable program code instructions, in execution with the processor, are further configured to cause the geographic data residency server associated with the second geographic boundary to copy the message metadata set.

In embodiments, an apparatus for servicing message deletion requests for geographically distributed data in a group-based communication system is provided. In embodiments, the apparatus is physically located in a first geographic area defined by a first geographic boundary. In embodiments, the apparatus comprises at least a processor, and a memory associated with the processor having computer coded instructions therein. In embodiments, the computer instructions are configured to, when executed by the processor, cause the apparatus to service message deletion requests.

In embodiments, the apparatus is configured to receive, from a client device, a message deletion request. In embodiments, the message deletion request comprises a message identifier. In embodiments, the apparatus is configured to, upon locating, in a local repository, a first repository row comprising message metadata and residency token data associated with the message identifier, initiate a local repository row erasure operation by which contents of the first repository row are erased from the local repository.

In embodiments, the apparatus is configured to, upon completion of the local repository row erasure operation, transmit a data residency data deletion request to a geographic data residency server associated with the residency token data. In embodiments, the data residency deletion request comprises the residency token data. In embodiments, the data residency data deletion request is a request to initiate a data residency repository row erasure operation by which contents of a data residency row associated with the residency token data are erased from a geographic data residency local repository comprising the data residency row. In embodiments, the apparatus is configured to, in an instance where a data residency deletion confirmation is not received within a deletion confirmation window, enqueue a subsequent data residency deletion request comprising the residency token data to be transmitted to the geographic data residency server.

In embodiments, an apparatus for servicing message deletion requests for geographically distributed data storage in a group-based communication system is provided. In embodiments, the apparatus is physically located in a first geographic area defined by a first geographic boundary. In embodiments, the apparatus comprises at least one processor and a memory associated with the processor having computer coded instructions therein. In embodiments, the computer instructions are configured to, when executed by the processor, cause the apparatus to service message deletion requests.

In embodiments, the apparatus is configured to receive, from a client device, a message deletion request. In embodiments, the message deletion request comprises a message identifier associated with message metadata and residency token data. In embodiments, the apparatus is configured to transmit a data residency data deletion request to a geographic data residency server associated with the residency token data. In embodiments, the data residency deletion request comprises the residency token data. In embodiments, the data residency data deletion request is a request to initiate a data residency repository row erasure operation by which contents of a data residency row associated with the residency token data are erased from a geographic data residency local repository comprising the data residency row.

In embodiments, the apparatus is configured to, upon receiving a data residency deletion confirmation, initiate a local repository row erasure operation by which contents of a first repository row associated with the message identifier are erased from the local repository. In embodiments, an apparatus for servicing message deletion requests for geographically distributed data in a group-based communication system is provided. In embodiments, the apparatus is physically located in a first geographic area defined by a first geographic boundary. In embodiments, the apparatus comprises at least a processor, and a memory associated with computer coded instructions therein. In embodiments, the computer instructions are configured to, when executed by the processor, cause the apparatus to service message deletion requests.

In embodiments, the computer instructions are configured to, when executed by the processor, cause the apparatus to copy a plurality of first local repository rows to a plurality of second local repository rows. In embodiments, the computer instructions are configured to, when executed by the processor, cause the apparatus to traverse each first local repository row of the first local repository to identify first local repository rows for exclusion from a plurality of second local repository rows. In embodiments, each identified first local repository row is associated with a message identifier associated with an application deletion request. In some embodiments, an application deletion request comprises a message identifier and is a request to erase contents of a local repository row associated with the message identifier from a local repository.

In embodiments, an apparatus for servicing message deletion requests for geographically distributed data in a group-based communication system is provided. In embodiments, the apparatus is physically located in a first geographic area defined by a first geographic boundary. In embodiments, the apparatus comprises at least a processor, and a memory associated with the processor having computer coded instructions therein. In embodiments, the computer instructions are configured to, when executed by the processor, cause the apparatus to service message deletion requests.

In embodiments, the apparatus is configured to receive, from a client device, a message deletion request. In embodiments, the message deletion request comprises a message identifier. In embodiments, the apparatus is configured to append a message deletion request identifier associated with the message deletion request to a message deletion request ledger. In embodiments, the apparatus is configured to upon locating, in a local repository, a first repository row comprising message metadata and residency token data associated with the message identifier, initiate a local repository row erasure operation by which contents of the first repository row are erased from the local repository.

In embodiments, the apparatus is configured to, upon completion of the local repository row erasure operation, transmit a data residency data deletion request to a geographic data residency server. In embodiments, the geographic data residency server is associated with the residency token data. In embodiments, the data residency deletion request comprises the residency token data. In embodiments, the data residency data deletion request is a request to initiate a data residency repository row erasure operation by which contents of a data residency row associated with the residency token data are erased from a geographic data residency local repository comprising the data residency row.

In some embodiments, the computer instructions are configured to, when executed by the processor, further cause the apparatus to periodically traverse the message deletion request ledger to identify message deletion request identifiers associated with failed message deletion request operations and enqueue subsequent message deletion requests comprising the identified message deletion request identifiers. In embodiments, a message deletion request is received from a client device. In embodiments, the message deletion request comprises a message identifier.

In embodiments, upon locating, in a local repository, a first repository row comprising message metadata and residency token data associated with the message identifier, a local repository row erasure operation is initiated by which contents of the first repository row are erased from the local repository. In embodiments, upon completion of the local repository row erasure operation, a data residency data deletion request is transmitted to a geographic data residency server associated with the residency token data. In embodiments, the data residency deletion request comprises the residency token data.

In embodiments, the data residency data deletion request is a request to initiate a data residency repository row erasure operation by which a data residency row associated with the residency token data, in a geographic data residency local repository, is designated as expired and assigned an expiration window. In embodiments, upon completion of the expiration window, contents of the data residency row associated with the residency token data are erased from the geographic data residency local repository. In embodiments, the expiration window is one of more of 14 days, 21 days, or 30 days from a timestamp associated with the data residency data deletion request. In embodiments, an apparatus for managing storage of geographically distributed data in a group-based communication system is provided.

In embodiments, a message comprising message data, message metadata, and a message identifier is received from a first client device. In embodiments, an entity identifier is extracted from the message metadata. In embodiments, upon determining that the entity identifier is associated with a geographic data storage policy, a geographic data residency message package comprising message data of the message is transmitted to a geographic data residency server physically located within a second geographic area defined by a second geographic boundary. In embodiments, the second geographic area is associated with the geographic data storage policy.

In embodiments, residency token data is received from the geographic data residency server, the residency token data referencing a geographic data residency local repository address associated with the message data. In embodiments, the geographic data residency local repository address is associated with a geographic data residency local repository physically located within the second geographic boundary associated with the geographic data storage policy.

In embodiments, a residency token data acknowledgement is transmitted to the geographic data residency server.

In embodiments, the geographic data residency server associates the residency token data acknowledgement with the geographic data residency message package in a data residency message package journal comprising a plurality of entries, each entry comprising a first record for storing a geographic data residency message package identifier and a second record for storing an associated residency token data acknowledgement.

In embodiments, periodically, the geographic data residency server traverses the data residency message package journal to identify entries of the plurality of entries that store a geographic data residency package identifier in its first record but do not store an associated residency token data acknowledgement in its second record.

In embodiments, the geographic data residency server transmits deletion confirmations for each of the identified entries before erasing data residency rows associated with the identified entries.

Other systems, apparatuses, methods, computer readable media, and features will be, or will become, apparent to one with skill in the art upon examination of the following figures and detailed description. It is intended that all such additional systems, apparatuses, methods, computer readable media, and features be included within this description be within the scope of the disclosure, and be protected by the following claims.

BRIEF DESCRIPTION OF THE DRAWINGS

Figure 1:
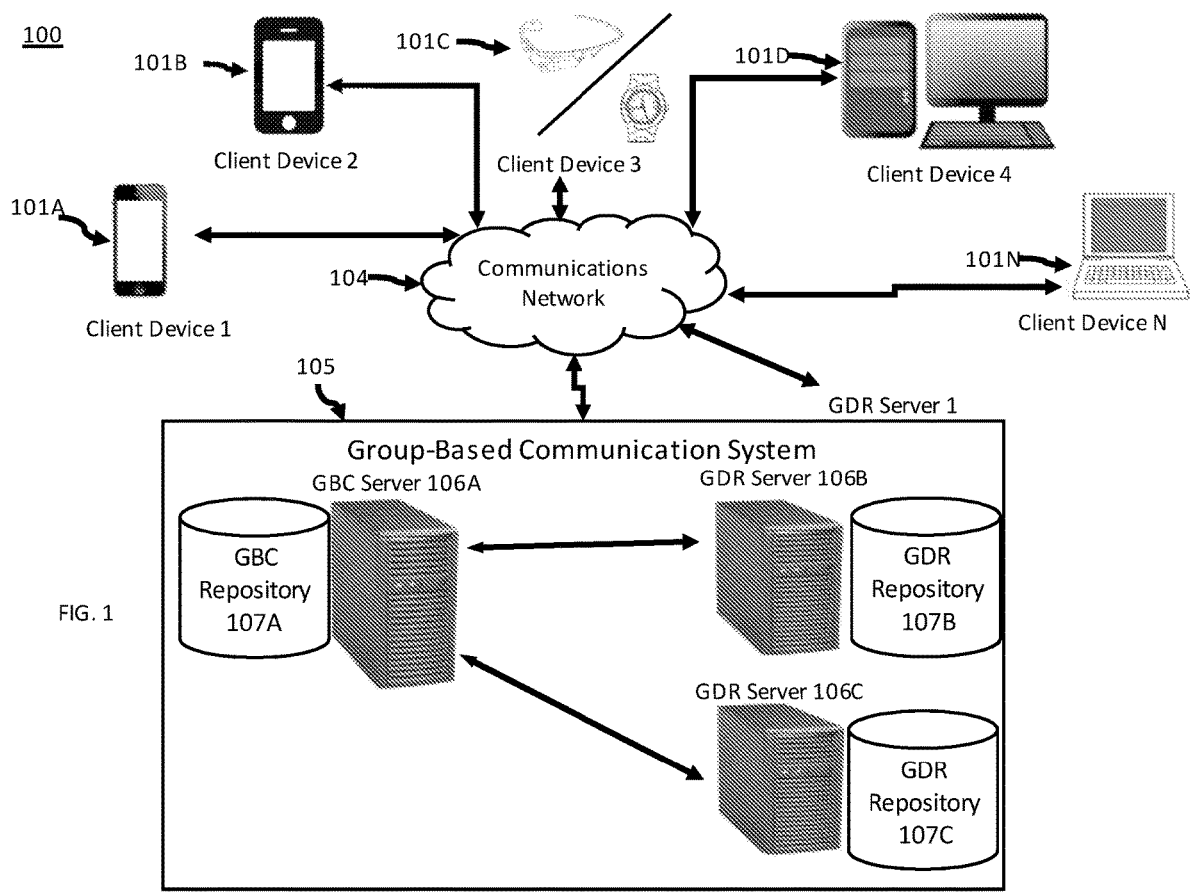
Figure 2:
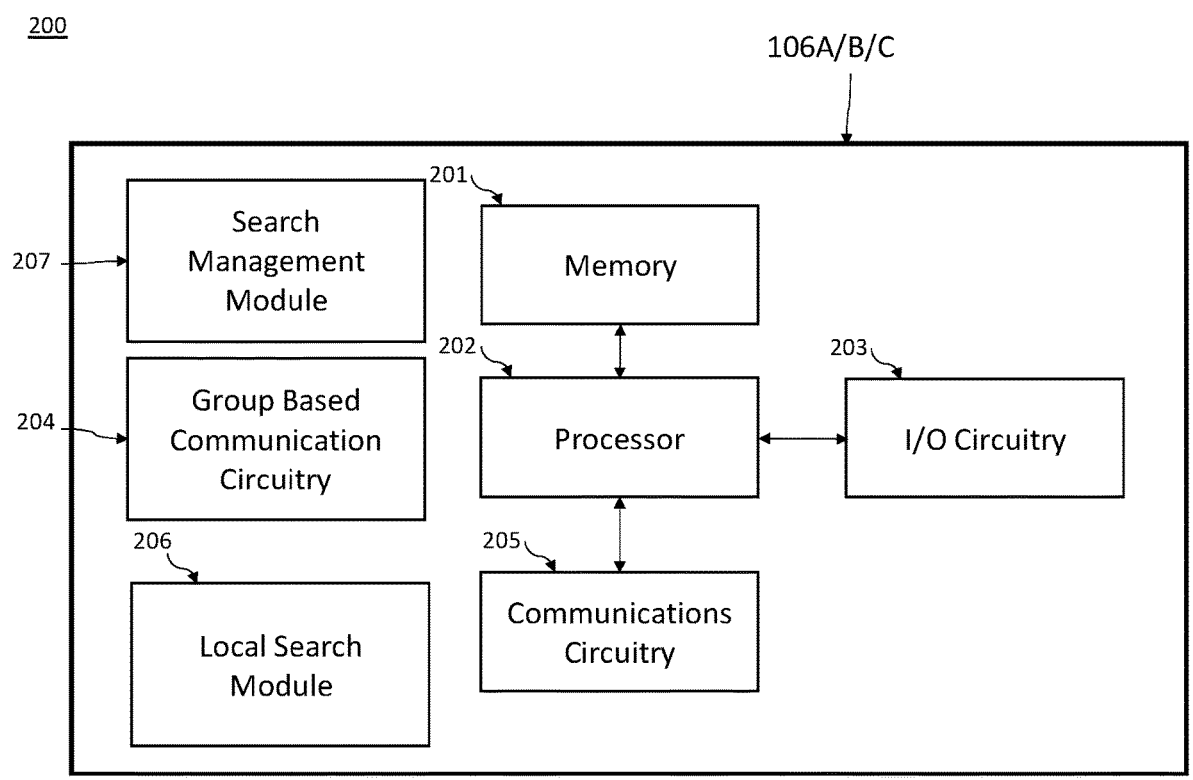
Figure 3:
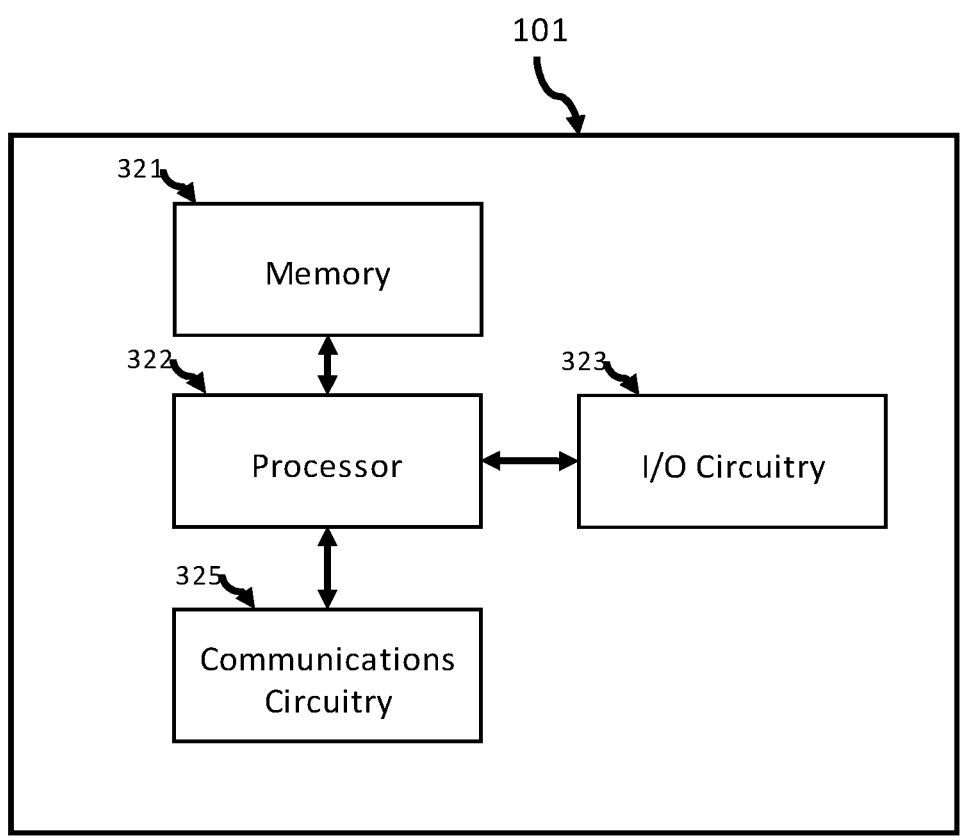
Figure 4B:
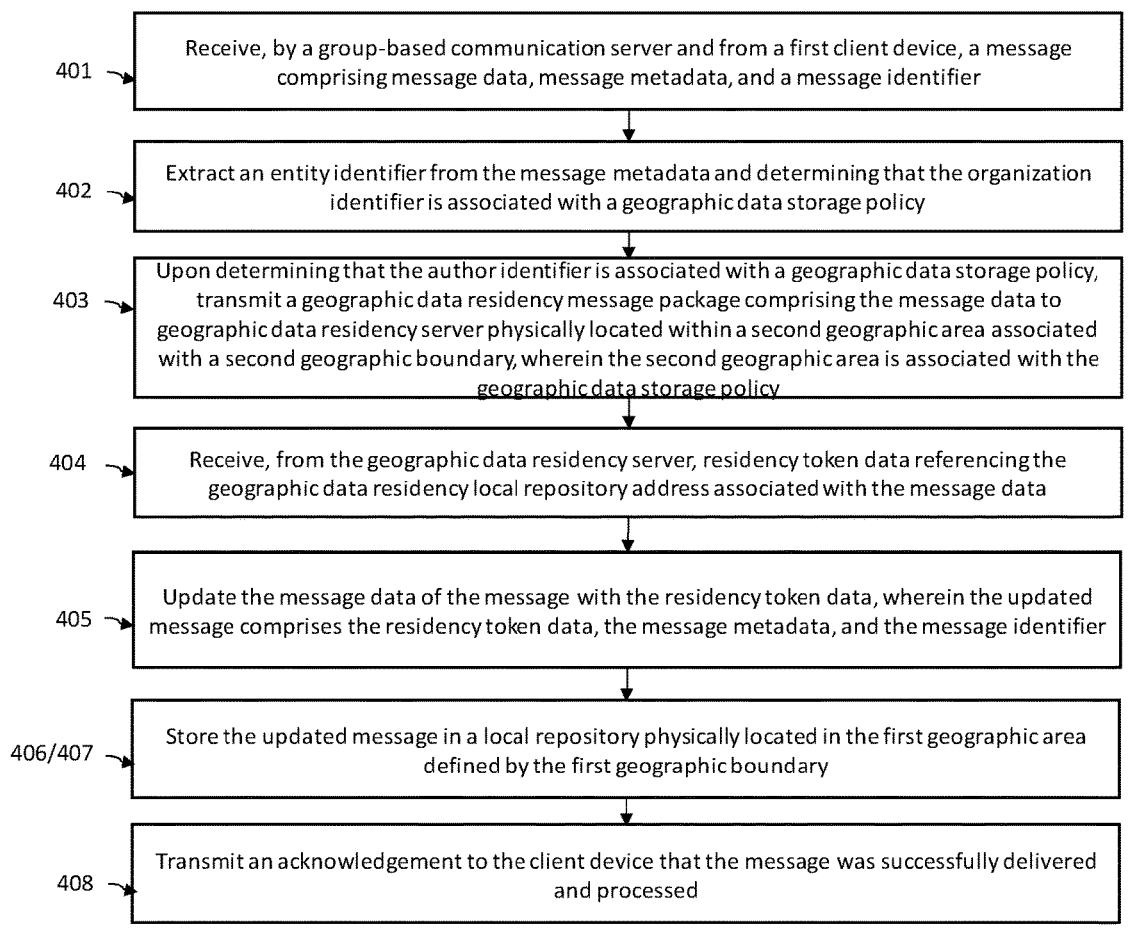
Figure 5A:
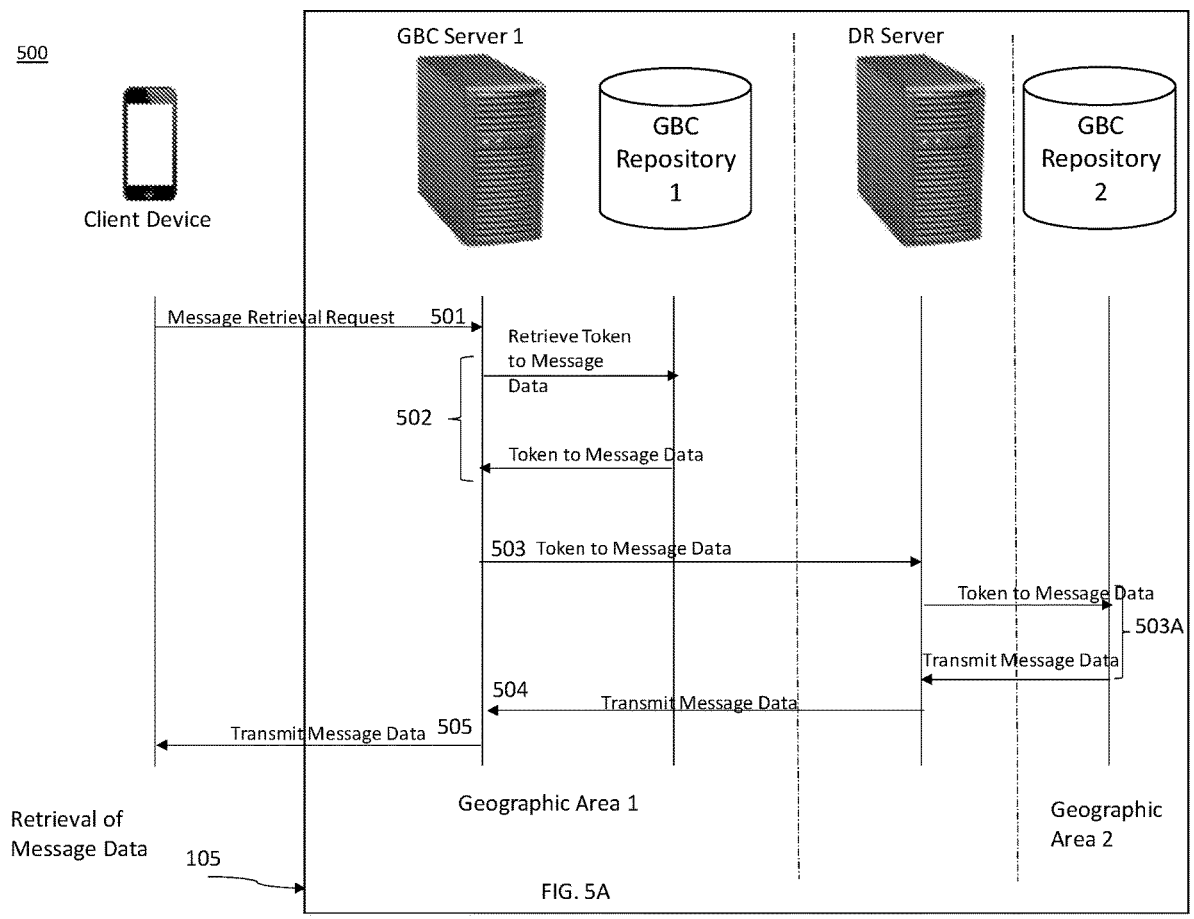
Figure 5B:
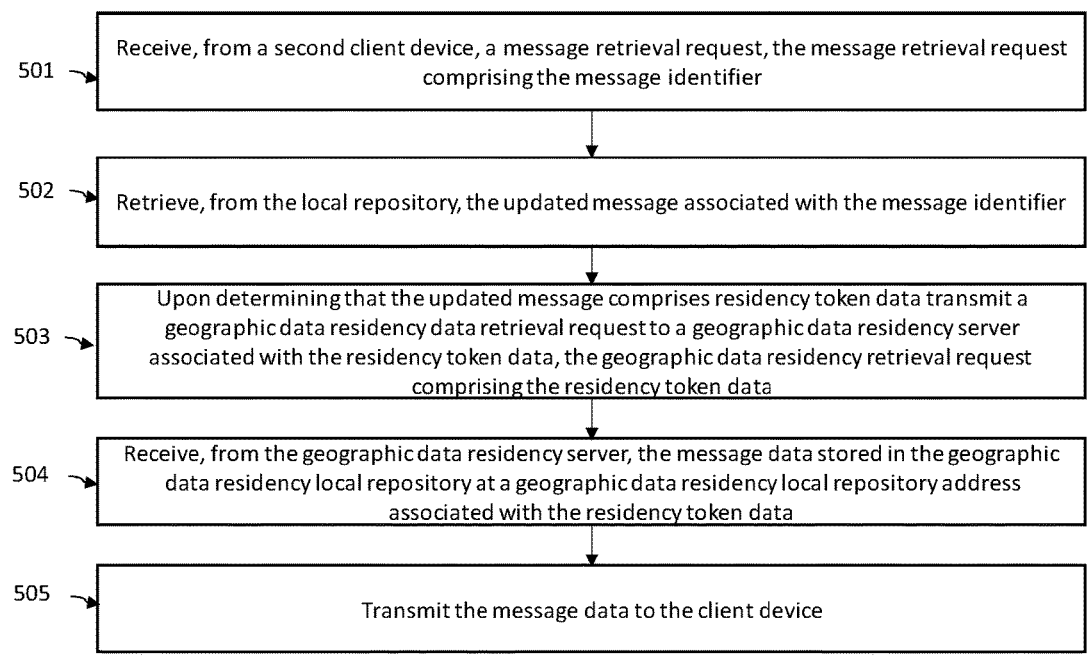
Figure 6:
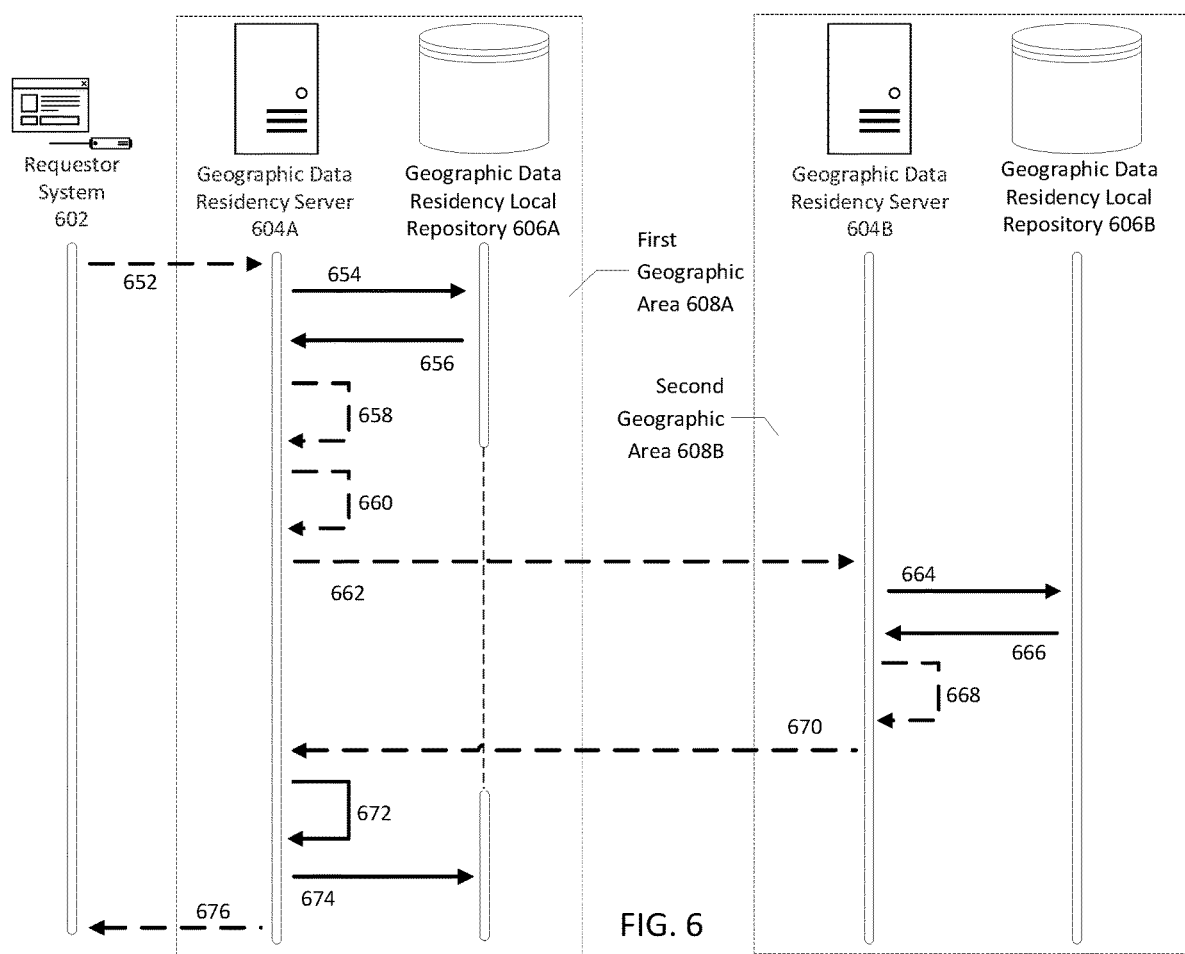
Figure 7:
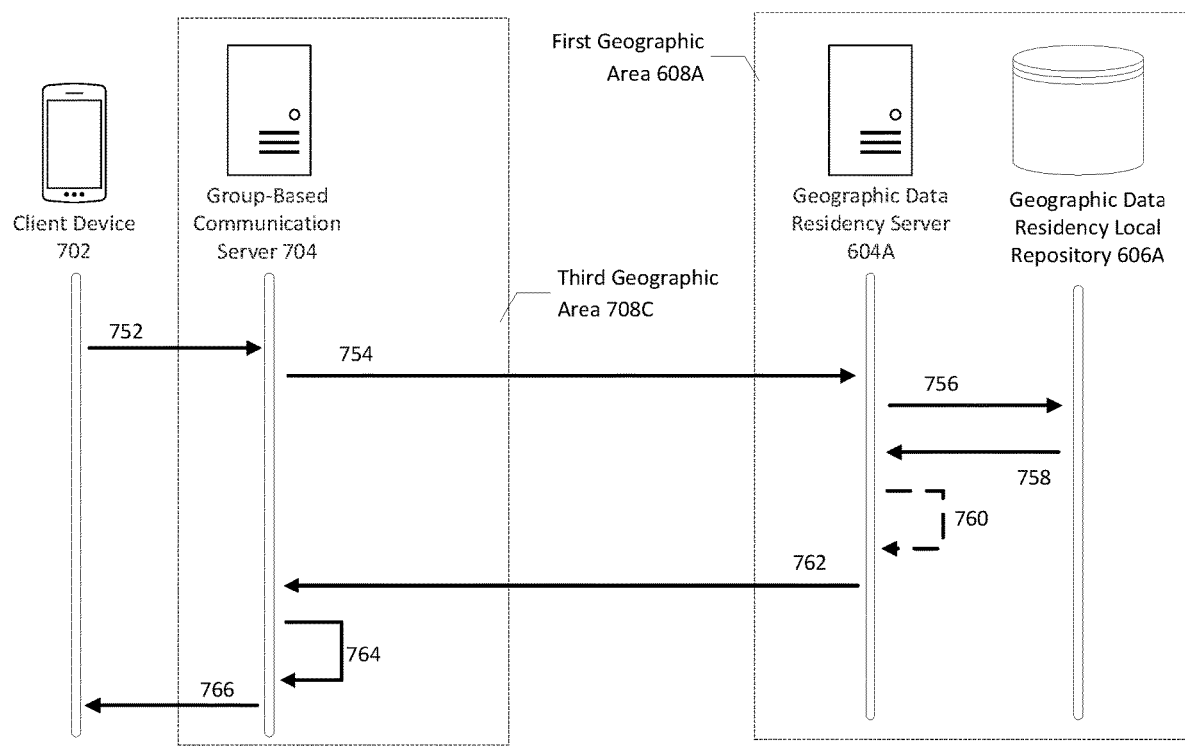
Figure 12:
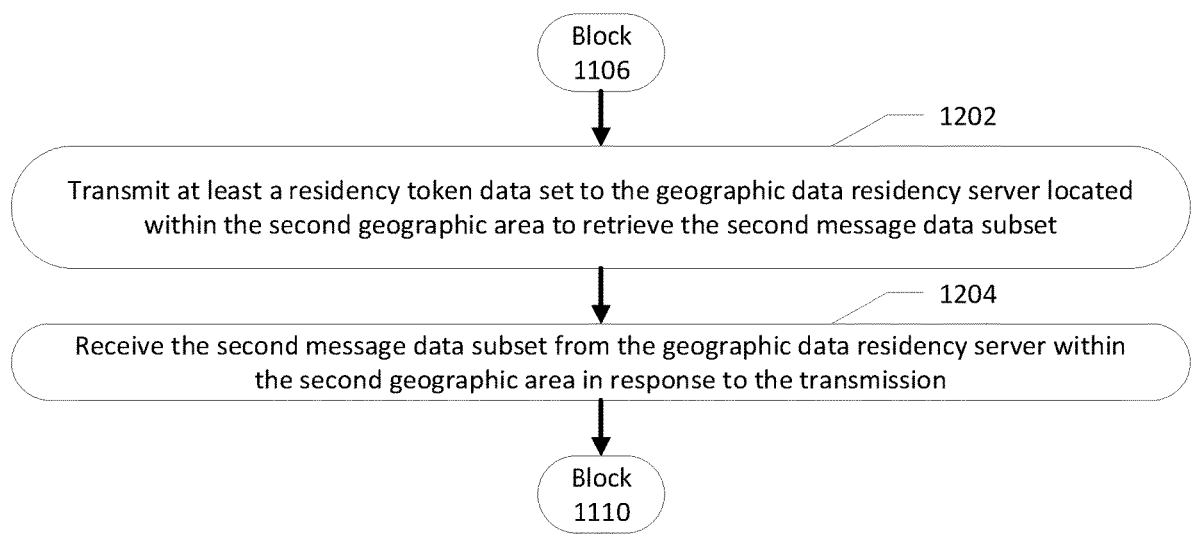
Figure 13:
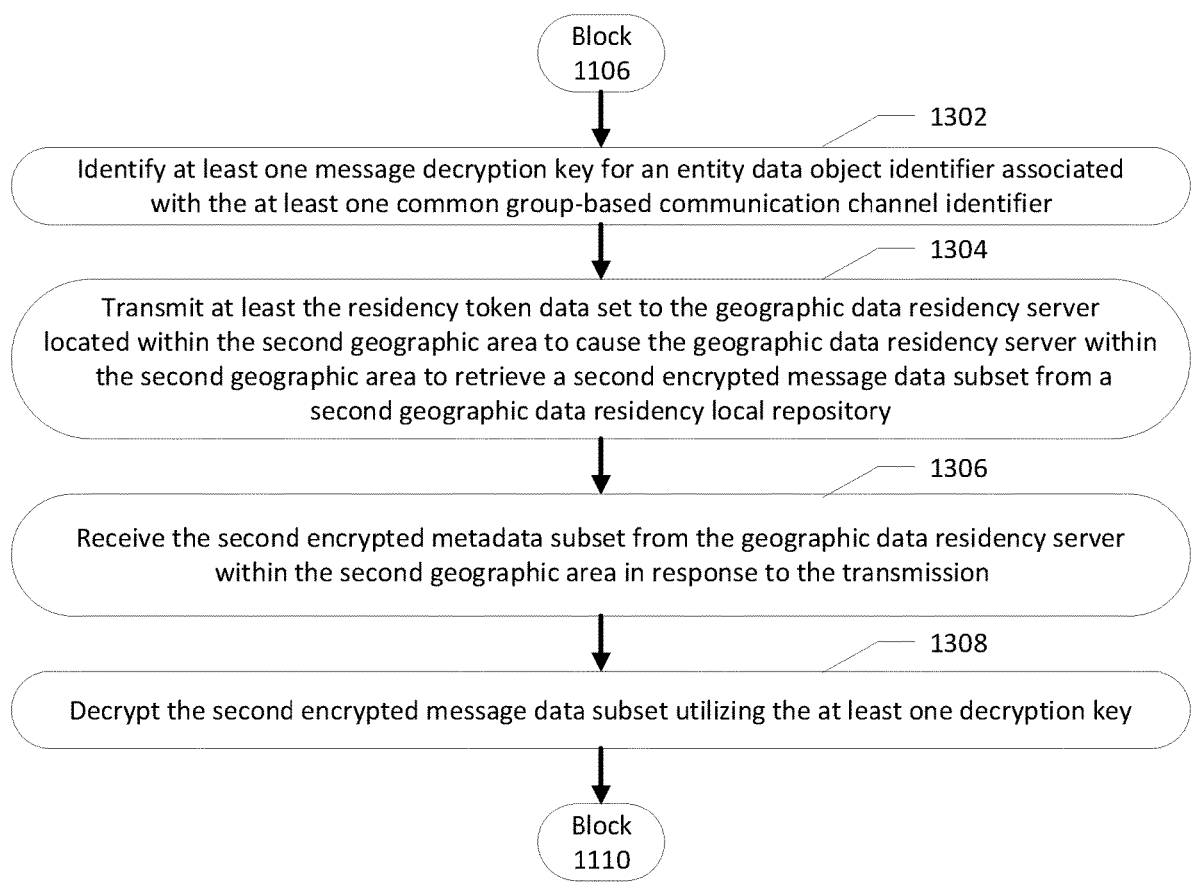
Figure 14:
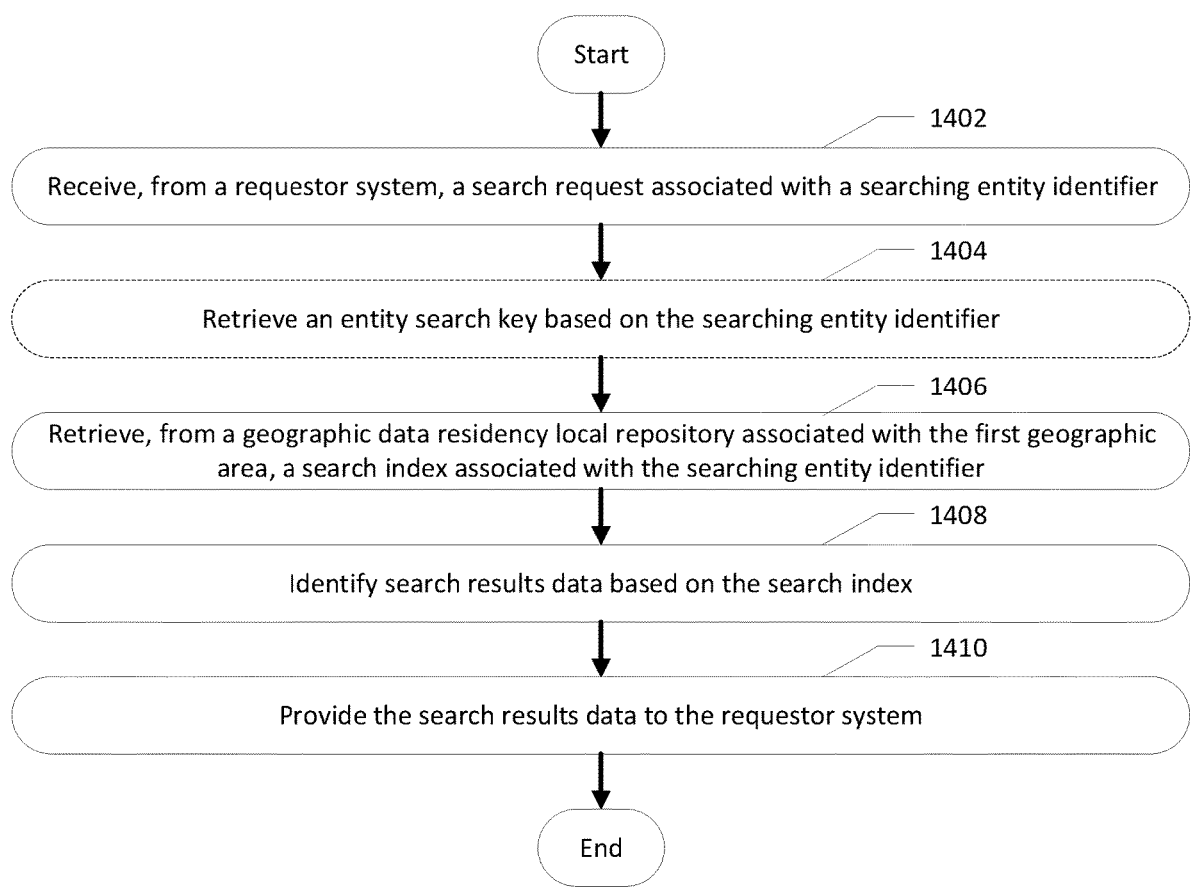
Figure 15:
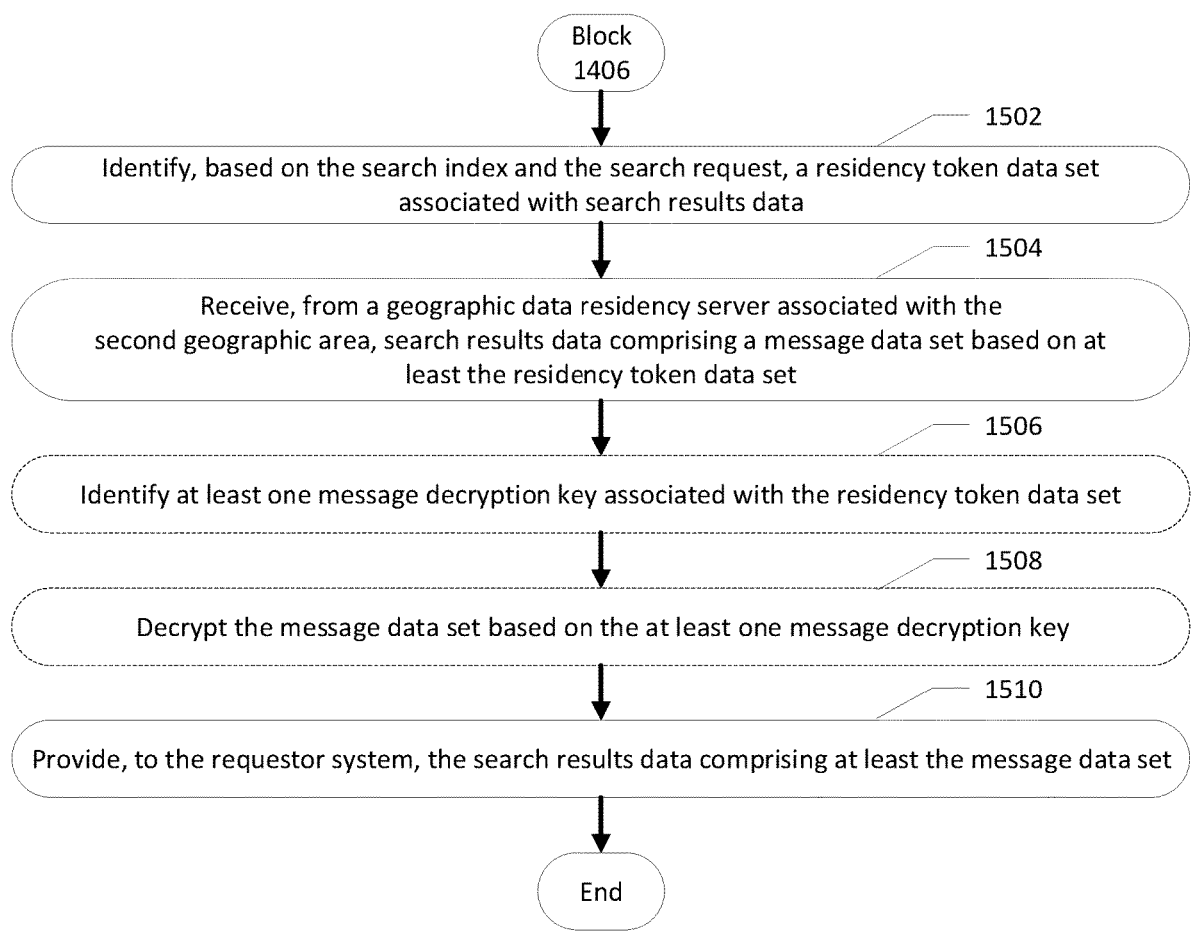
Figure 16A:
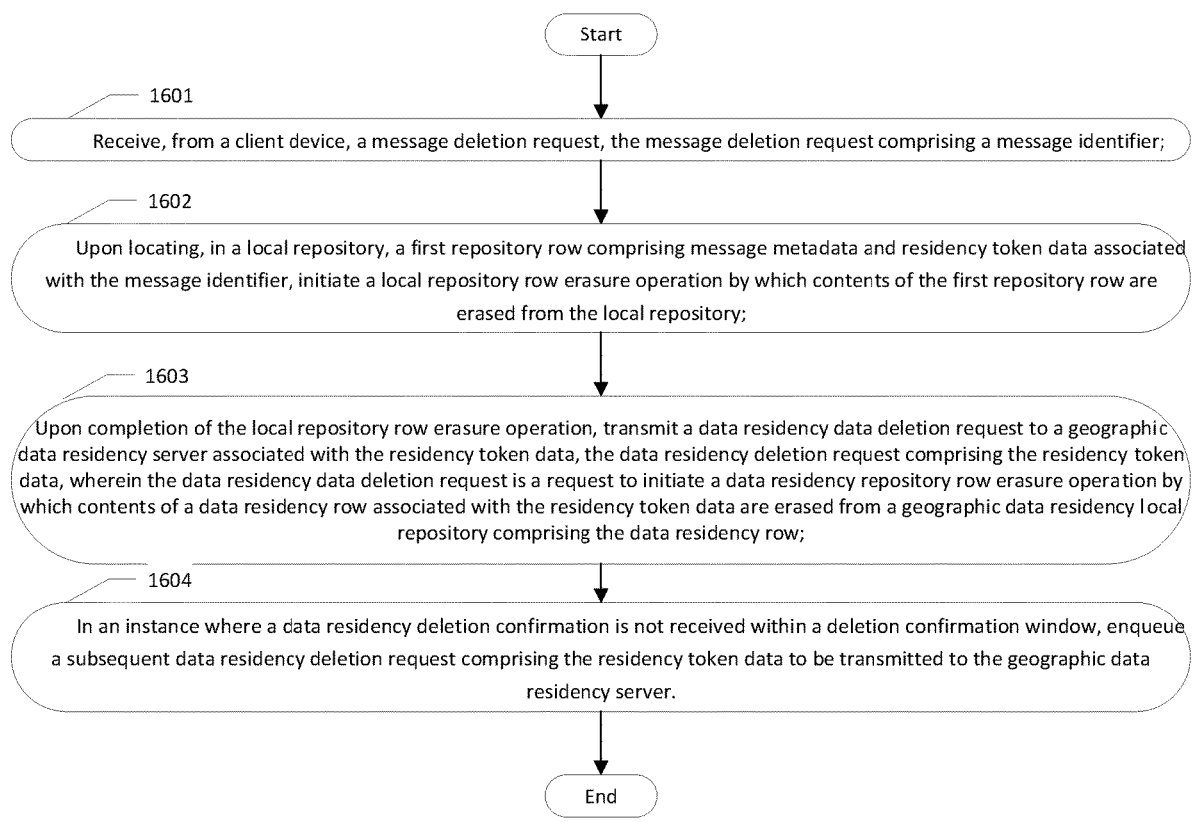
Figure 16B:
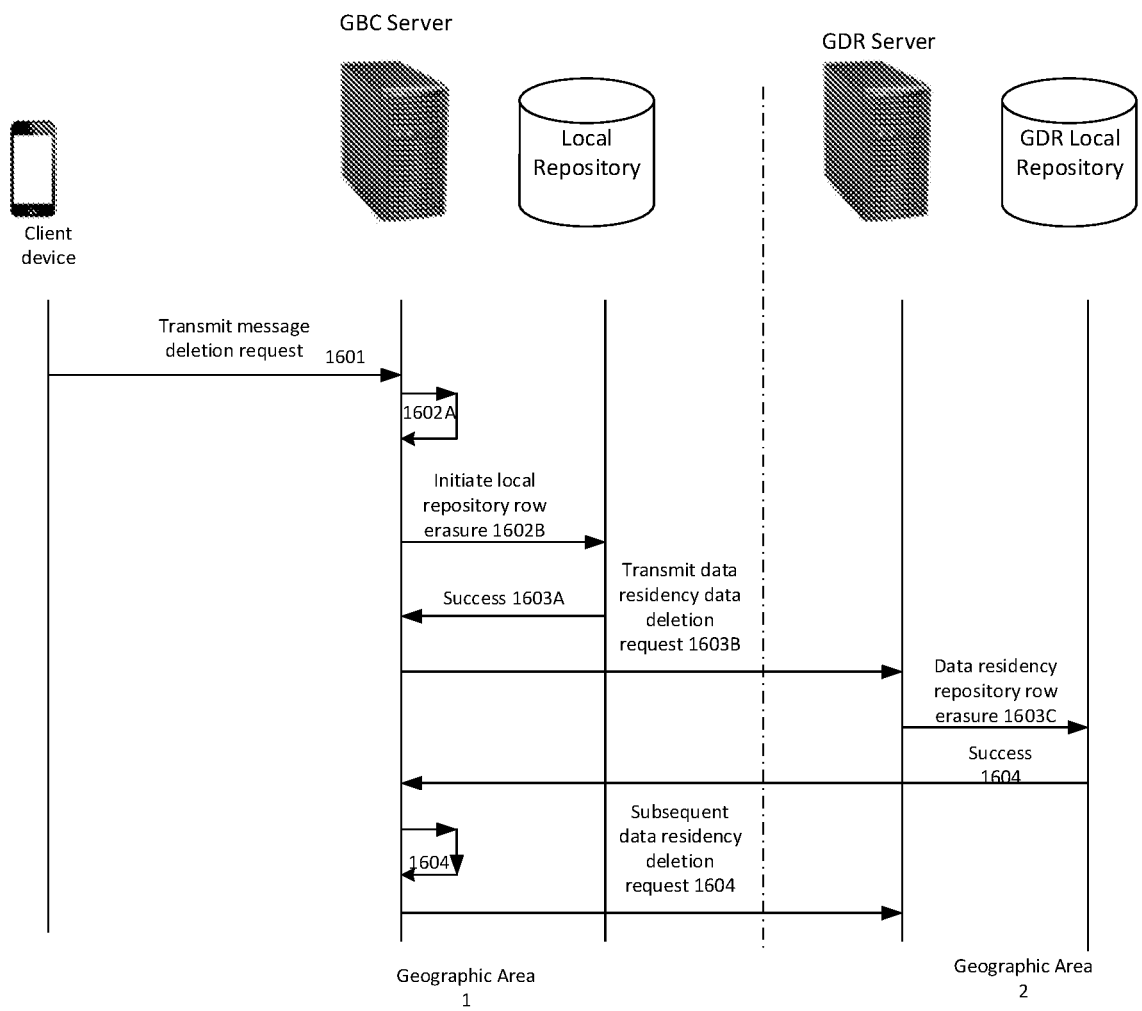
Figure 17A:
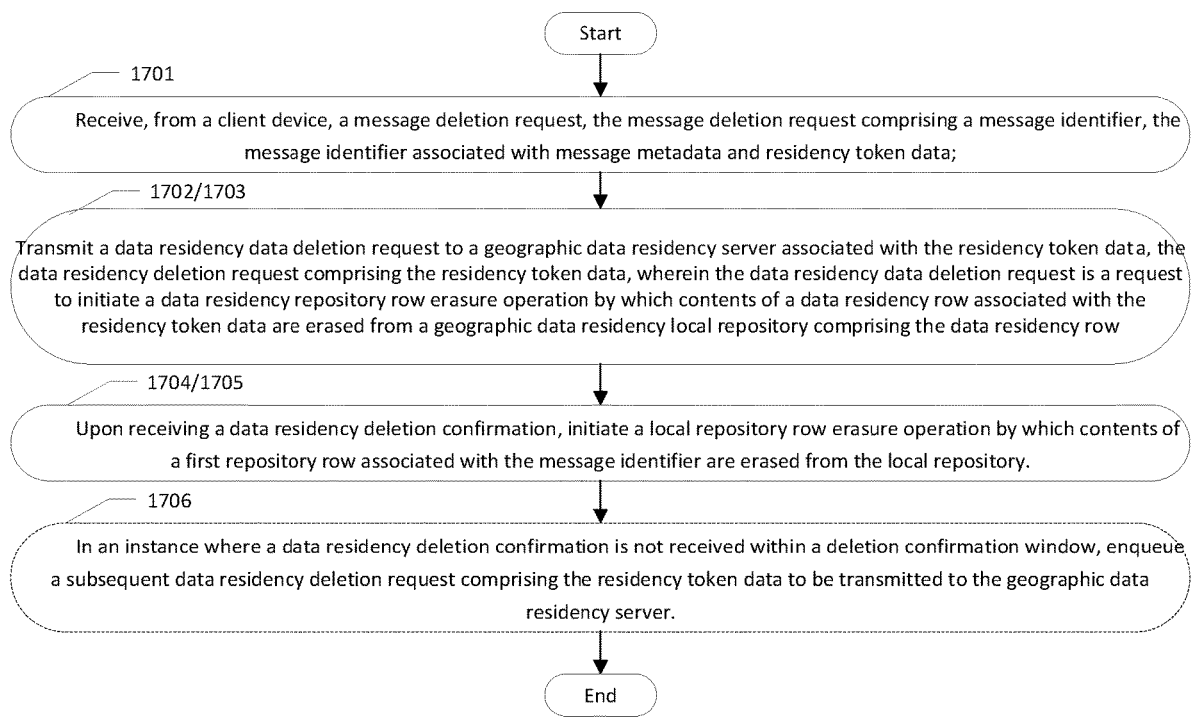
Figure 17B:
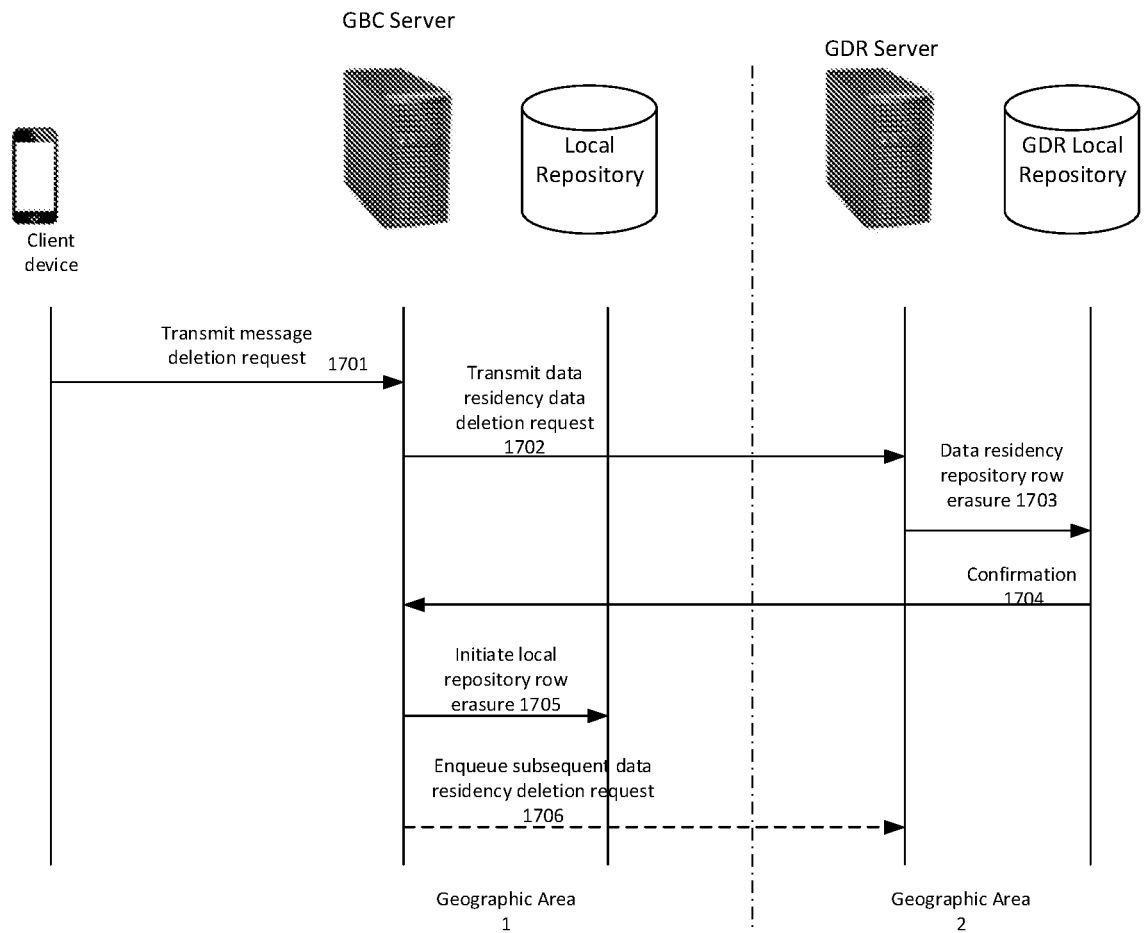
Figure 18A:
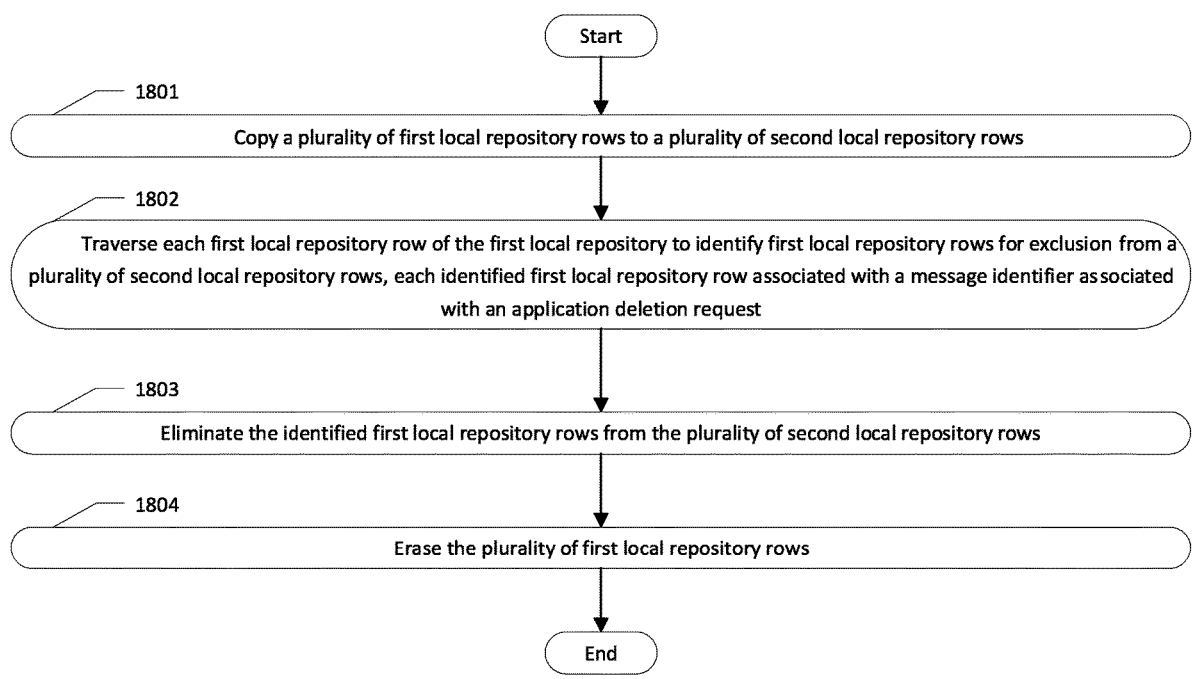
Figure 18B:
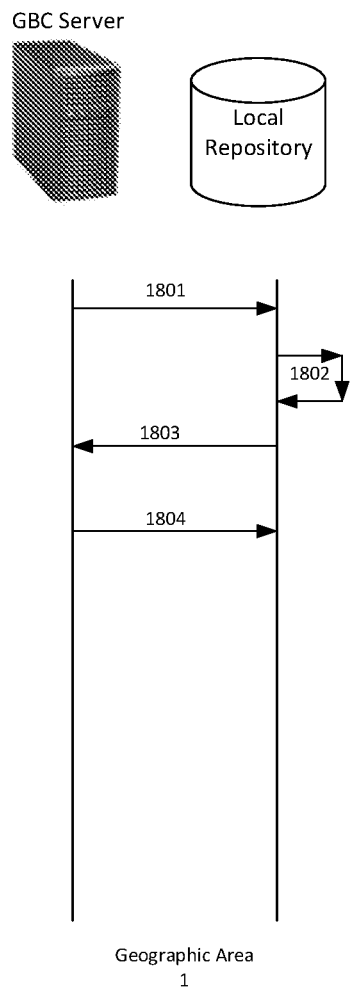
Figure 19A:
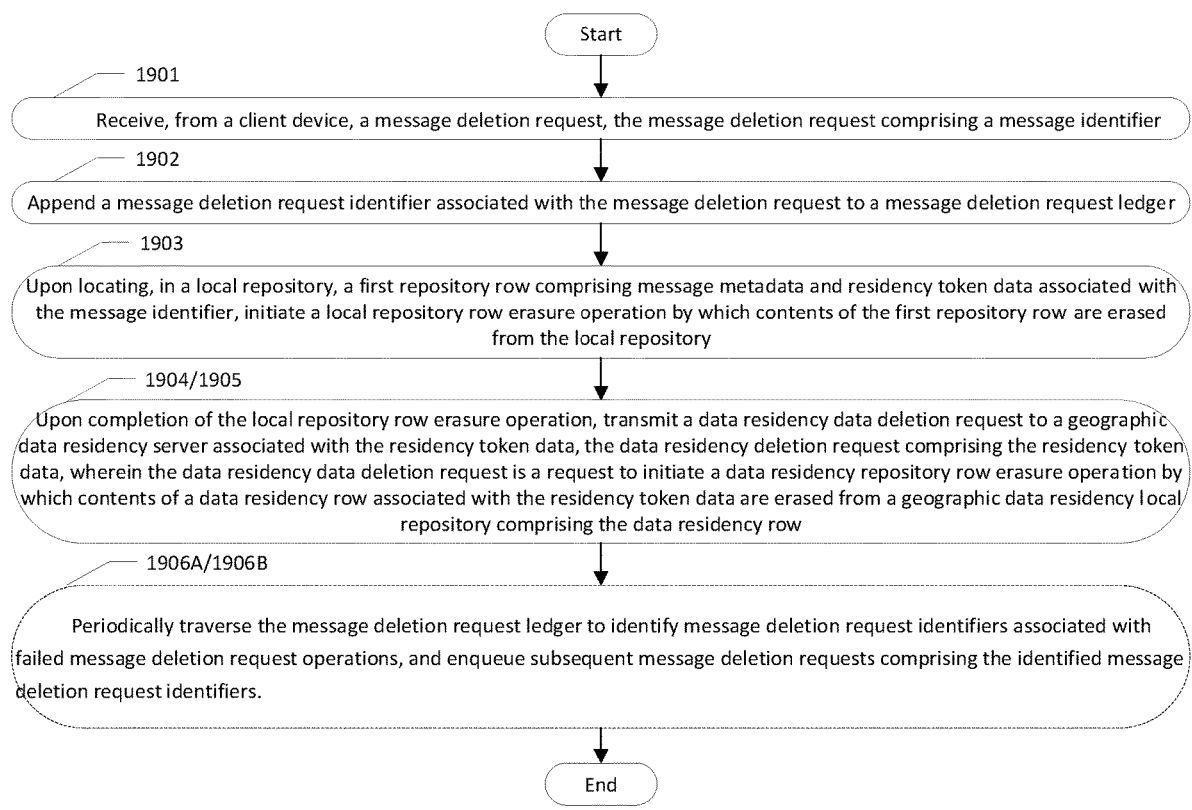
Figure 19B:
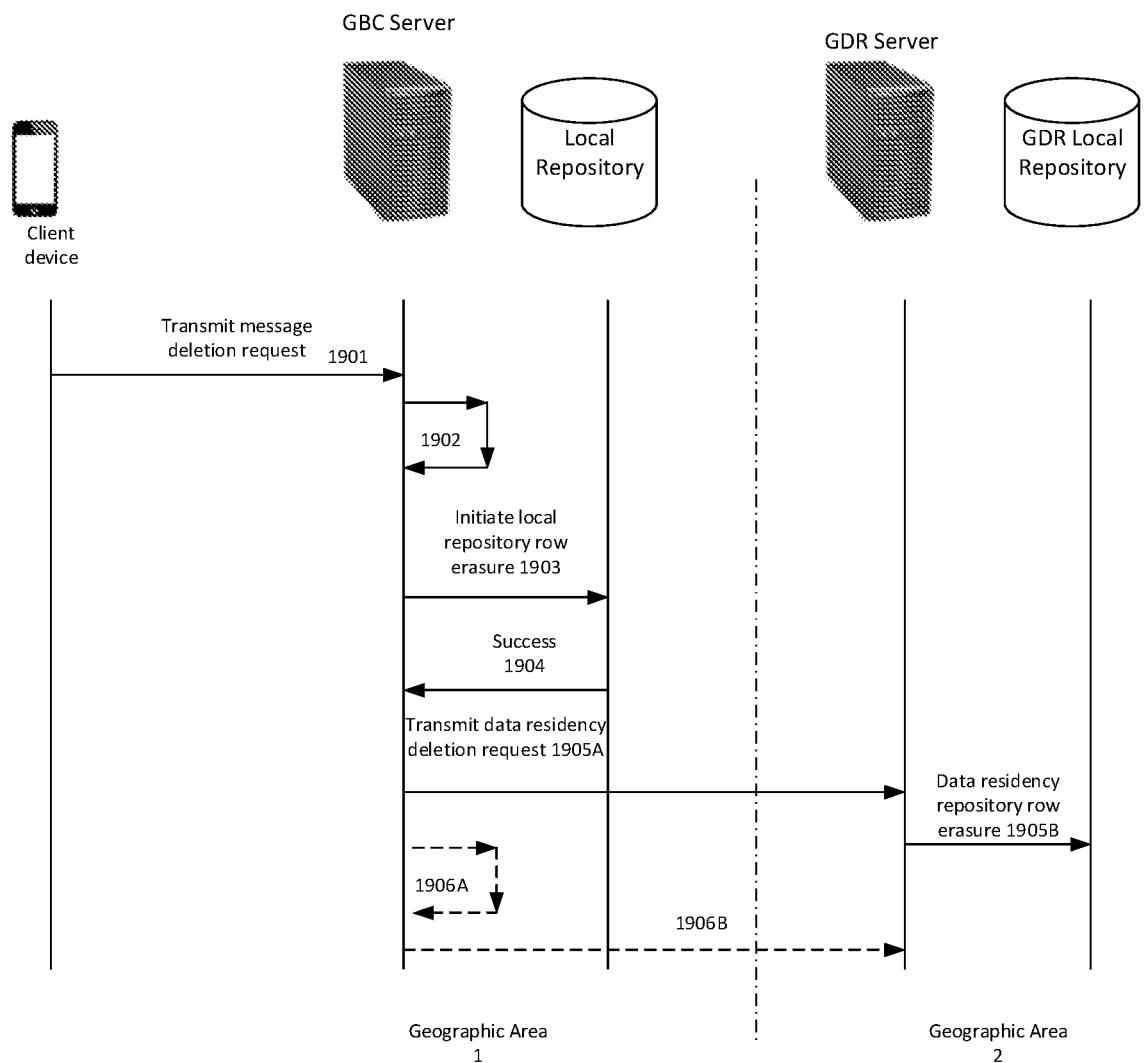
Figure 20A:
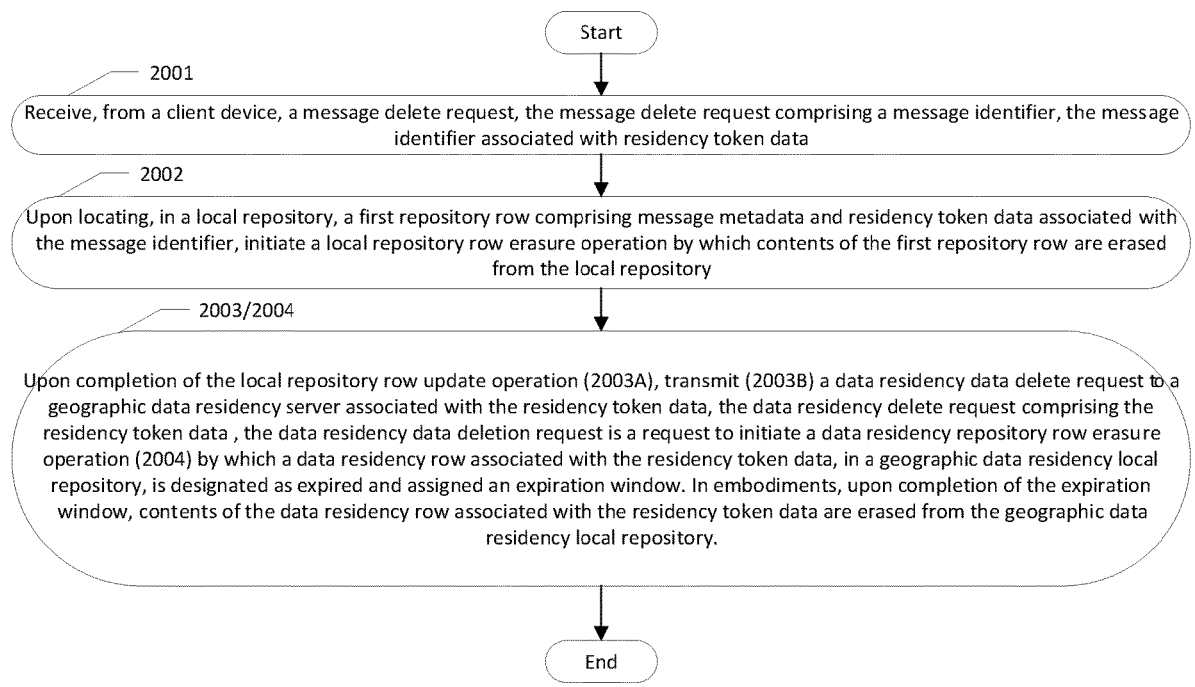
Figure 20B:
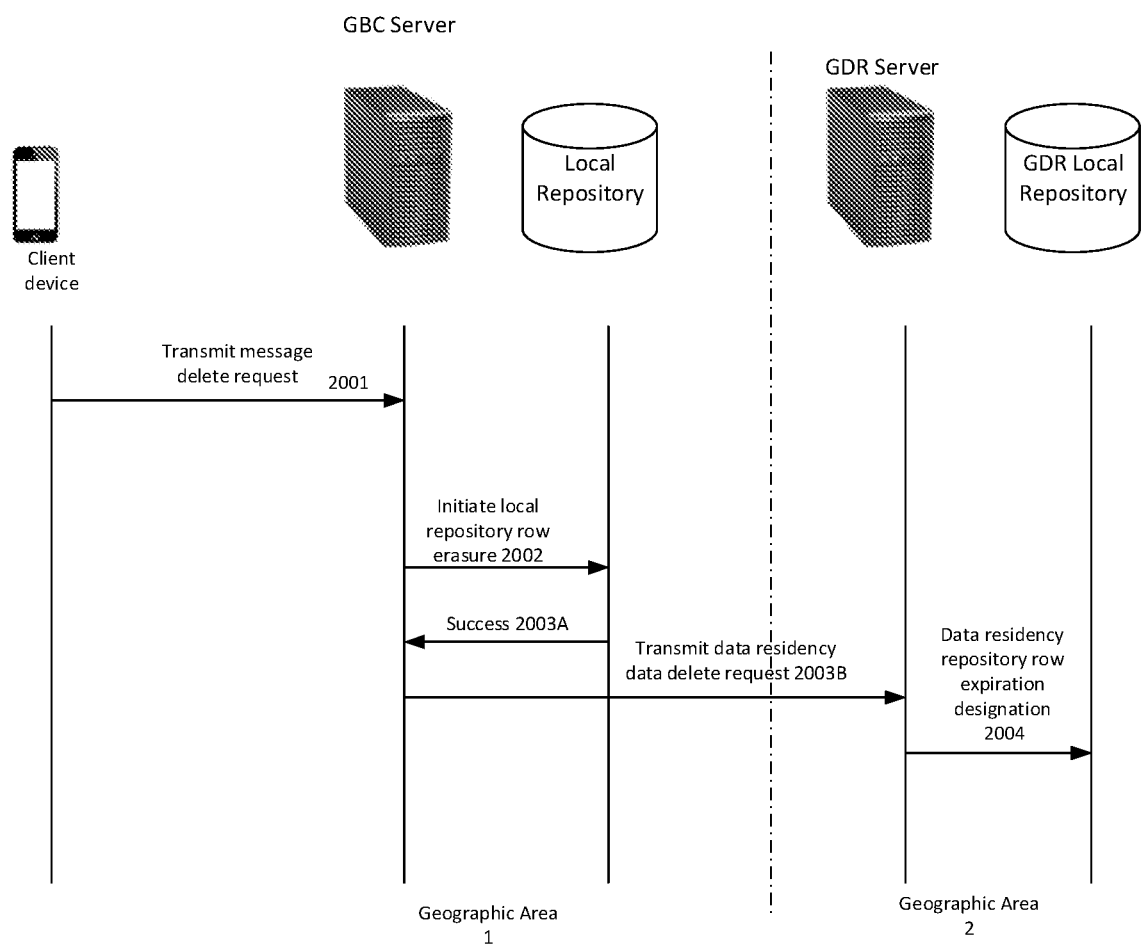
Figure 21A:
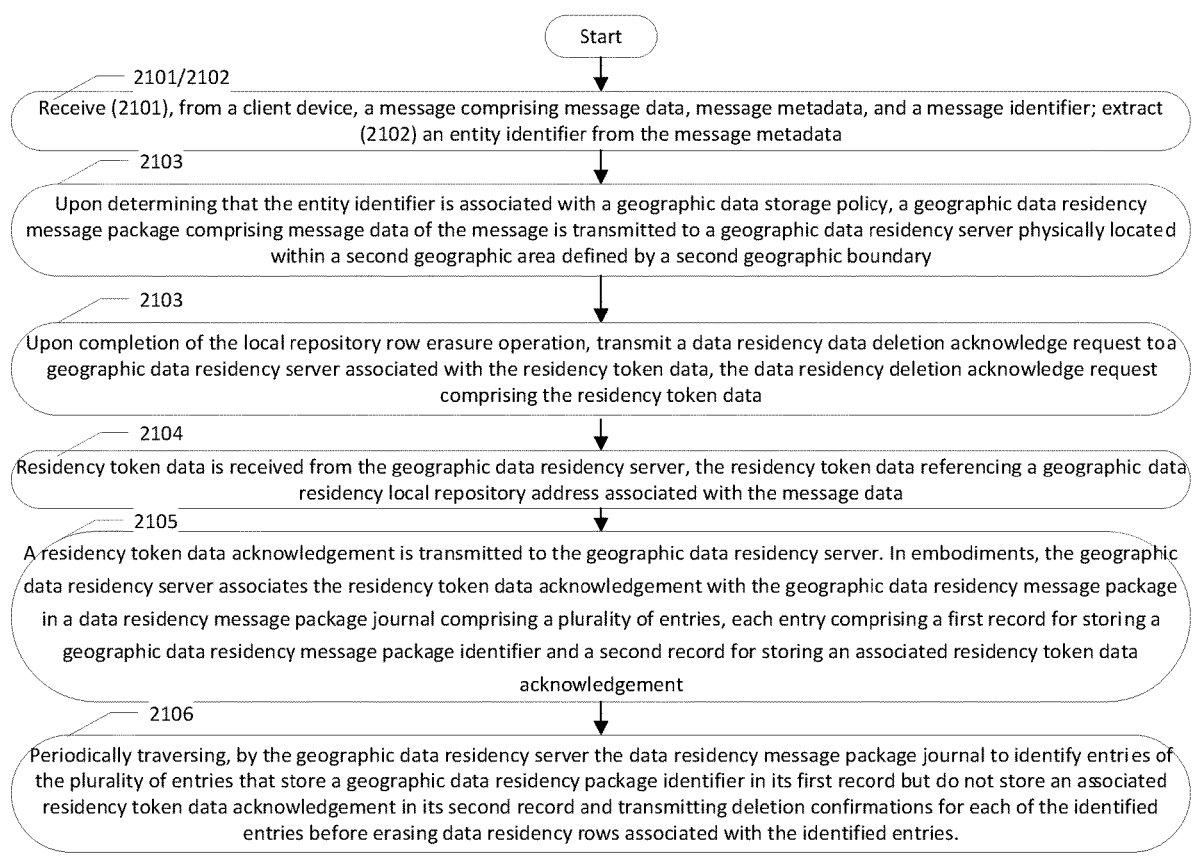
Figure 21B:
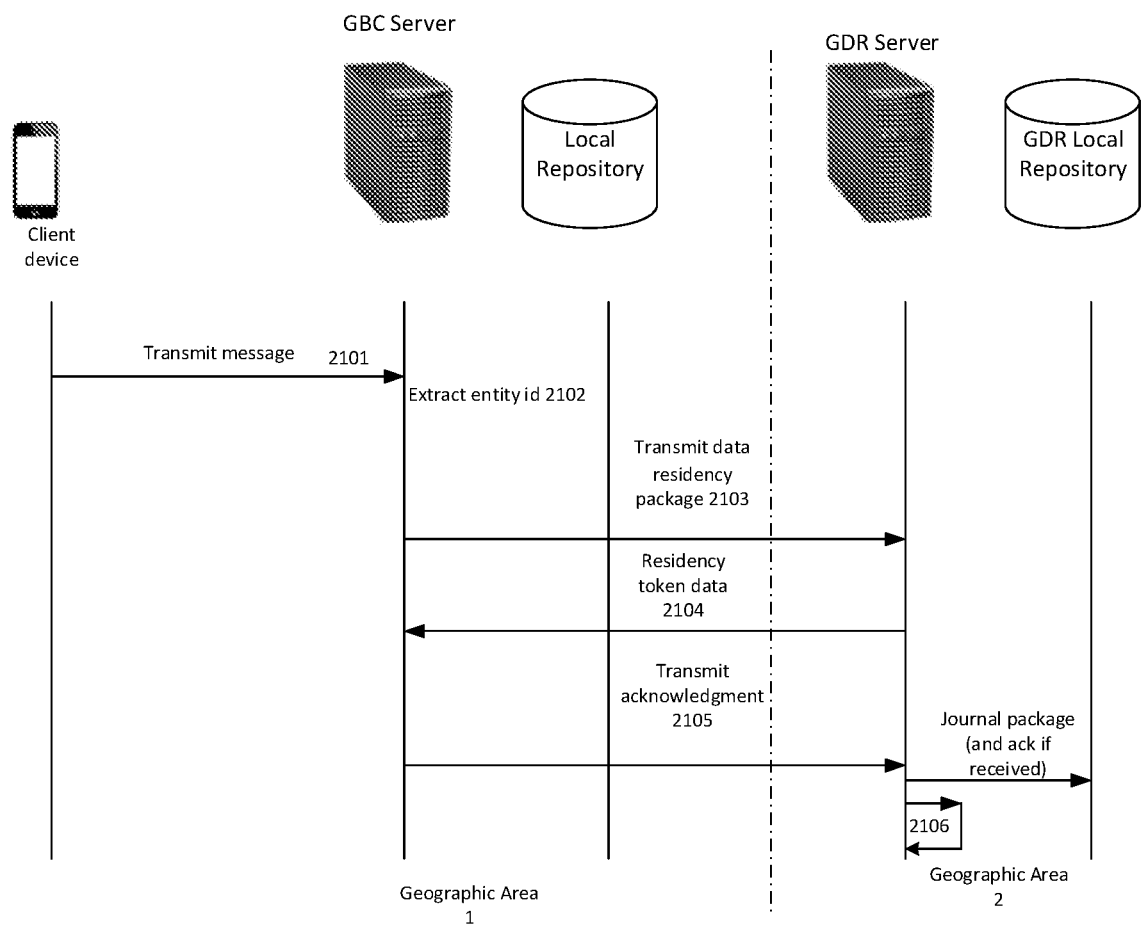

Having thus described the disclosure in general terms, reference will now be made to the accompanying drawings, which are not necessarily drawn to scale, and wherein:

FIG. 1 is a system architecture diagram of a group-based communication system configured to practice embodiments of the present disclosure;

FIG. 2 is an exemplary schematic diagram of a computing entity according to embodiments of the present disclosure;

FIG. 3 is an exemplary schematic diagram of a remote apparatus according to embodiments of the present disclosure;

FIG. 4A illustrates exemplary signal transmission flows for managing geographically distributed data storage, according to embodiments of the present disclosure;

FIG. 4B illustrates exemplary data flows for managing geographically distributed data storage, according to embodiments of the present disclosure;

FIG. 5A illustrates exemplary signal transmission flows for retrieving geographically distributed data storage, according to embodiments of the present disclosure;

FIG. 5B illustrates exemplary data flows for retrieving geographically distributed data storage, according to embodiments of the present disclosure;

FIG. 6 illustrates an example data flow diagram for generating a search index associated with a geographic area, according to embodiments of the present disclosure;

FIG. 7 illustrates an example data flow diagram for utilizing a stored search index to process a search request, according to embodiments of the present disclosure;

FIGS. 8-13 illustrate example operations performed for search index generation, according to embodiments of the present disclosure; and FIGS. 14-15 illustrate example operations performed for search index utilization, according to embodiments of the present disclosure;

FIGS. 16A-16B illustrate example operations performed for servicing message deletion requests, according to embodiments of the present disclosure;

FIGS. 17A-17B illustrate example operations performed for servicing message deletion requests, according to embodiments of the present disclosure;

FIGS. 18A-18B illustrate example operations performed for servicing message deletion requests, according to embodiments of the present disclosure;

FIGS. 19A-19B illustrate example operations performed for servicing message deletion requests, according to embodiments of the present disclosure;

FIGS. 20A-20B illustrate example operations performed for servicing message deletion requests, according to embodiments of the present disclosure; and FIGS. 21A-21B illustrate example operations performed for servicing message deletion requests, according to embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

Various embodiments of the disclosure generally relate to a protocol for managing transmission and access of message data in a group-based communication system.

In some embodiments, residency token data is generated as a replacement for message data in group-based communication messages that are transmitted over defined geographic boundaries. The residency token data may be used to fetch message data from a local database address associated with a local database positioned within the defined geographic boundary, for example to provide message data to a receiving client device.

In other embodiments, group-based communication messages are configured to include residency token data and message data. The message data may include encrypted message data. A second residency token data may be generated and used as reference to a second local database address associated with the local database positioned within the defined geographic boundary for storing a decryption key that is configured to decrypt the encrypted message data. In such embodiments, the group-based communication message that is transmitted over the defined geographic boundaries includes the residency token data, the second residency token data, and the message data including the encrypted message data.

One or more decryption keys may be fetched by a group-based communication server located outside the defined geographic boundary. The one or more decryption keys are fetched from a local database positioned within the defined geographic boundary and are used to decrypt the encrypted message data to a readable form. The group-based communication system is configured to generate a renderable group-based communication message comprising decrypted message data and may transmit the renderable group-based communication message to a client device for rendering.

Additionally or alternatively, various embodiments of the disclosure generally relate to a protocol for generating, storing, and/or using a search index associated with data that is distributed across several geographic boundaries. The search index, and/or message data associated with group-based messages, may be maintained by a geographic data residency server in communication with a geographic data residency local repository. In some embodiments, the geographic data residency server and/or geographic data residency local repository are located in a particular geographic area. Multiple geographic data residency server(s) and/or geographic data residency local repositories are distributed across various geographic areas, each geographic data residency server configured to maintain one or more geographic data residency local repository/repositories within the geographic area.

In some embodiments, one or more geographic data residency local repositories store message metadata and/or residency token data associated with one or more group-based messages stored by at least one other geographic data residency local repositories located in a different geographic area. A geographic data residency server may utilize the residency token data, alone or in combination with other message metadata stored by an associated geographic data residency local server, to retrieve message data for a corresponding group-based message. Each geographic data residency server may communicate with a geographic data residency local repository, and/or one or more geographic data residency local repositories via one or more distributed geographic data residency server(s), to generate and/or store a search index for use in processing future received search requests.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

"Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation originated from one user who has been granted access to the group to another entity who has not been granted access to the group. Group identifiers are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface.

The term "group-based communication server" refers to a software platform and associated hardware that is configured to manage access to the various group-based communication interfaces of the group-based communication system. The group-based communication server is configured to access, maintain, and support application product logic of the group-based communication system and to access one or more data repositories such as a group-based communication repository. A group-based communication repository may include one or more geographic data residency local repositories. A group-based communication server may include several geographic data residency servers in different geographic areas.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

In some embodiments, one group-based communication channel may be associated with one or more organization identifiers. A group-based communication channel associated with more than one organization identifiers is a "common group-based communication channel".

The terms "group-based communication channel identifier" or "channel identifier" refer to one or more items of data by which a group-based communication channel may be uniquely identified by a group-based communication system. For example, a group-based communication channel identifier may comprise American Standard Code for Information Interchange (ASCII) text, a pointer, a memory address, and the like. A group-based communication channel identifier associated with a common group-based communication channel is a "common group-based communication channel identifier".

The terms "group identifier" or "team identifier" refer to one or more items of data by which a group within a group-based communication system may be uniquely identified. For example, a group identifier may comprise ASCII text, a pointer, a memory address, and the like. For example, the group identifier associated with member users of a Slack Corporation workspace (i.e., a group-based communication interface) may be 104356721.

Group-based communication system users are organized into organization groups (e.g., employees of each company may be a separate organization group) and each organization group may have one or more group-based communication channels (explained below) to which users may be assigned or which the users may join (e.g., group-based communication channels may represent departments, geographic locations such as offices, product lines, user interests, topics, issues, and/or the like). A group identifier is used to facilitate access control for a message (e.g., access to the message, such as having the message return as part of search results in response to a search query, may be restricted to those users having the group identifier associated with their user profile). The group identifier may be used to determine context for the message (e.g., a description of the group, such as the name of an organization and/or a brief description of the organization, may be associated with the group identifier).

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

As used herein, the terms "group-based communication message," "group-based message," and "message" refer to any electronically generated device rendered object provided by a user using a client device and that is configured for display within a group-based communication channel. Group-based communication messages may include any text, file, image, video, audio or combination thereof provided by a user (using a client device). For instance, the user may provide a group-based message that includes text as well as an image and a video within the group-based message as message contents. In such a case, the text, image, and video would comprise the group-based message or device rendered object. Each message sent or posted to a group-based communication channel of the group-based communication system includes metadata comprising the following: a sending user identifier, a message identifier, message contents, a group identifier, and a group-based communication channel identifier. Each of the foregoing identifiers may comprise ASCII text, a pointer, a memory address, and the like. In some embodiments, the user may provide a group-based message by uploading a file via an application programming interface (API) and the file may be renderable within a group-based communication channel.

A "sending user identifier" is associated with a collection of messages that are sent by a particular user (i.e., a client device associated with the particular user). These messages may be analyzed to determine context regarding the user (e.g., the user's expertise or interest in a topic may be determined based on the frequency of mention of the topic or key words associated with the topic within such messages). In some embodiments, a sending user identifier may be used as an author identifier.

An "author identifier" is associated with one or more message that initiated by a client device associated with a user account identifier, organization identifier, or other entity identifier. In some embodiments, the author identifier may take the form of a user identifier and a sending user identifier may be used as an author identifier. In some embodiments, the author identifier may take the form of an organization identifier. In some embodiments, the author identifier may take the form of another entity identifier.

The term "entity" refers to an entity that includes one or more user, such as a user, a subset of users such as users that have access to a group-based communication channel or a workspace, or an organization. An entity identifier, which may take the form of a user identifier, an organization identifier, or another identifier associated with a subset of users may uniquely identify an entity such as a group-based communication channel identifier or a workspace identifier.

The term "recipient identifier" refers to a collection of user identifier(s), organization identifier, or other identifiers associated with a recipient of a message. In some embodiments, a recipient identifier for a message associated with a channel identifier is one or more of user identifiers and/or an organization identifier associated with the channel identifier.

The terms "message" refers to an electronic message received from a client device of a group-based communication message that includes message text data and/or message file data in a group-based communication system. A message request may include message data and message metadata, that may be electronically generated based on user input via a client device.

The term "updated message" refers to a "message" having one or more of message data object incorporated in the message replaced by residency token data. For example, an updated message may be created by replacing all or a subset of the message data from a message with residency token data, such that the updated message comprises the residency token data, the message metadata, and the message identifier. In another embodiment, an updated message may be created by replacing all or a subset of the message metadata with residency token data, such that the updated message comprises the residency token data, the message data objects, and the message identifier. It will be appreciated that a combination of all or a subset of the message data and all or a subset of the metadata may be replaced by residency token data without departing from the scope of the present disclosure.

The term "user" should be understood to refer to an individual, group of individuals, business, organization, and the like; the users referred to herein are accessing a group-based communication or messaging system using client devices.

The terms "user profile," "user account," and "user account details" refer to information associated with a user, including, for example, a user identifier, one or more group-based communication channel identifiers associated with group-based communication channels that the user has been granted access to, one or more group identifiers for groups with which the user is associated, one or more organization identifiers for organizations with which the user is associated, one or more third party resource provider identifiers indicating whether a client device associated with the user profile is authorized to access respective one or more third party resources, an indication as to whether the user is an owner of any group-based communication channels, an indication as to whether the user has any group-based communication channel restrictions, a plurality of messages, an emoji, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The term "group-based communication repository" refers to a location outside the client device where data is persistently stored, accessed, modified and otherwise maintained by the group-based communication system. The stored data includes information that facilitates the operation of the group-based communication system. The group-based communication repository may be embodied as a data storage device or devices, as a separate database server or servers, or as a combination of data storage devices and separate database servers. Further, in some embodiments, the group-based communication repository may be embodied as a distributed repository such that some of the stored data is stored centrally in a location within the group-based communication system and other data stored in a single remote location or a plurality of remote locations. Alternatively, in some embodiments, the group-based communication repository may be distributed over a plurality of remote storage locations only. In some embodiments, the group-based communication repository may include one or more include one or more geographic data residency local repositories located in different geographic areas.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface includes a plurality of group-based communication channels (e.g., a marketing channel, sales channel, accounting channel, etc.), which are defined below. In some embodiments, a group-based communication interface allows users from different organizations (e.g., the Slack Corp. and ACME corporation) to access, communicate via, and/or otherwise view certain group-based communication channels, such as one or more common group-based communication channel(s), to facilitate cross-organization communication.

The terms "geographic data storage policy," "geographic data security policy," "data storage policy," "data residency policy," and "data security policy" refer to policies governing physical locations within which particular data may be persistently stored (i.e., not in short-term memory). For example, a geographic data storage policy may comply with a law that requires data belonging to or about a nations' citizens or residents be collected, processed, and/or stored inside the country, often before being transferred internationally, and usually transferred only after meeting local privacy or data protection laws, such as giving the user notice of how the information will be used and obtaining their consent. Further, a geographic data storage policy may require that records belonging to or about a nation's citizens or residents follow its personal or financial data processing laws, data localization goes a step further in requiring that initial collection, processing, and storage occur first within the national boundaries. In some cases, data about a nation's citizens or residents must also be deleted from foreign systems before being removed from systems in the data subject's nation. Accordingly, geographic data storage policies are associated, in some embodiments, with legal data storage requirements associated with a particular geographic boundary (e.g., Asia, western Europe, North America, United States, Germany, India, China, Japan, Europe, France, and the like).

The term "geographic area" refers to a physical region where a server, repository, and/or other computing hardware is physically located. A geographic area may be defined by a "geographic boundary," which refers to a regional border enclosing a particular geographic area. In some example circumstances, a geographic area refers to a country defined by the physical borders of the country. In some embodiments, a geographic boundary defining a geographic area includes various location markers (e.g., GPS coordinates, latitude and longitude coordinates, or the like) that define an enclosed area. It should be appreciated that various geographic areas may be constructed with different levels of granularity. Non-limiting examples of geographic areas include various cities, states, and/or countries where computing devices, such as at least a geographic data residency server and geographic data residency local repository, are physically located. In one example context, the geographic data areas include, without limitation, Frankfurt, Paris, London, Tokyo, United States, and Canada. In some embodiments, geographic areas accessible by a group-based communication system are defined based on computing devices accessible via a cloud service and/or other remote computing service that enables access to physical and/or virtual computing devices within a geographic boundary.

A geographic data storage policy may be configured to identify one or more geographic areas. The term "primary geographic area" refers to a geographic area identified in a geographic data storage policy as an intended geographic area for storing message data and/or metadata associated with an entity identified within the geographic data storage policy. In this regard, some embodiments are configured to store message data and/or associated metadata, associated with an entity, in computing devices located within the primary geographic area in a circumstance where computing devices within the primary geographic area are accessible.

The term "backup geographic area" refers to a second geographic area identified in a geographic data storage policy as a temporary and/or secondary geographic area for storing message data and/or metadata associated with an entity identified within the geographic data storage policy. In this regard, some embodiments are configured to store message data and/or associated metadata, associated with an entity, in computing devices located within the backup geographic area in a circumstance where computing devices within the primary geographic area are in accessible. In some embodiments, each primary geographic area is linked to a predetermined list of possible backup geographic areas for selection by an administrator user account for a corresponding entity when generating and/or editing a geographic data storage policy.

The term "inaccessible," when used with respect to computing device, refers to a state of communication between first computing device and second computing device, where the first computing device cannot successfully communicate and/or process one or more requests, transmissions, and/or other data to the second computing device, and/or cannot successfully receive and/or process one or more requests, responses, transmissions, and/or other data from the second computing device. In some embodiments, a computing device is configured to determine another computing device is inaccessible by receiving an error response, for example a transmission timeout, associated with an attempted transmission to the second computing device. In some embodiments, a computing device is configured to transmit an error response to other computing devices when one or more associated computing devices and/or sub-systems remain inaccessible. For example, in a circumstance where a geographic data residency local repository within a geographic area is inaccessible, but a corresponding geographic data residency server can receive communications, the geographic data residency server may be configured to transmit an error response indicating the geographic data residency server is inaccessible. A computing device may become inaccessible for a temporary time period, for example due to deficiencies in a communication network or a temporary event, such as harsh weather. A computing device may become permanently inaccessible, for example in a circumstance where the computing device is destroyed and/or the data therein becomes otherwise permanently inaccessible. Similarly, the term "accessible," when used with respect to computing device, refers to a state of communication between first computing device and second computing device, where the first computing device can successfully communicate and/or complete one or more requests, transmissions, and/or other data to the second computing device, and/or can successfully receive and/or process one or more requests, responses, transmissions, and/or other data from the second computing device.

The term "geographic data residency local repository" refers to computing hardware located in a particular geographic area and configured to store various data associated with group-based communication system functionality. In some embodiments, a geographic data residency local repository is configured to store at least a message metadata set, a message data set, a residency token data set, a search index set, a data encryption key set, an entity search key set, or any combination thereof. The geographic data residency local data repository is, in some embodiments, configured to store data for one or more entities (e.g., an organization, a group-based communication workspace, or a group-based communication user) that are associated with the geographic area in which the geographic data residency local repository is physically located. For example, in some embodiments, an entity is associated with a particular data residency policy data object identifying a particular geographic area for storing data associated with the entity. Data stored within such a repository may be associated with a geographic data residency local repository address. The term "backup geographic data residency local repository" refers to a geographic data residency local repository physically located within a backup geographic area for a particular geographic data storage policy. In some such embodiments, data is stored to a backup geographic data residency local repository when a geographic data residency local repository in a primary geographic area for the particular geographic data storage policy is inaccessible.

The term "message row" refers to one or more columns of data located at a location in a geographic data residency local repository identified by a numerical, categorical, and/or text identifier. In some embodiments, a message row corresponds to a residency token data object, such that the residency token data object is usable to retrieve and/or identify the message row corresponding to particular group-based message. In some embodiments, one or more columns of a message row corresponding to a particular group-based message defines a message data object for the group-based message.

The term "geographic data residency server" refers to computing hardware located in a particular geographic area and configured for communication with one or more other computing systems, computing devices, and/or other computing hardware. In some embodiments, a geographic data residency server is configured to communicate over one or more network(s). In some embodiments, a geographic data residency server is configured to communicate with at least one geographic data residency local repository in the same geographic area, for example to store data, retrieve data, and/or otherwise maintain data via the geographic data residency local repository. In some embodiments, a geographic data residency server includes a plurality of sub-servers and/or distributed cloud servers. The term "backup geographic data residency server" refers to a geographic data residency server physically located within a backup geographic area for a particular geographic data storage policy. In some such embodiments, a backup geographic data residency server is in communication with a corresponding backup geographic data residency local repository for storage to the backup geographic data residency local repository when a geographic data residency server and/or geographic data residency local repository within a primary geographic area for a particular geographic data storage policy are inaccessible.

The terms "residency token data object" and "residency token data" refer to electronically managed data stored by a first geographic data residency local repository located within a first geographic area that indicates a message data object for a particular group-based message is stored in a second geographic data residency local repository associated with a second geographic area.

In some embodiments, a residency token data object is provided to a geographic data residency local repository to retrieve message data object corresponding to the residency token data object. A geographic data residency local repository may include a "residency token data set," which refers to a data object embodying zero or more residency token data object(s). In some embodiments, a residency token data object comprises a message identifier (including, without limitation, a time-ordered universal unique identifier UUID, randomly-generated UUID, or the like), a storage location identifier, and a message encryption key.

The terms "backup residency token data object" and "backup residency token data" refers to a residency token data object identifying data stored within a backup geographic data residency local repository in a backup geographic area for a particular geographic data storage policy. In some embodiments, backup residency token data includes data indicating that the current geographic area where the data is stored is a backup geographic area.

The terms "organization identifier" refer to one or more items of data by which an organization entity (e.g., employees of each company may be a separate organization/business) within a group-based communication system may be identified. For example, an organization identifier may comprise ASCII text, numbers or the like.

The term "message identifier" refers to electronically managed data that uniquely indicates a particular group-based message transmitted via a group-based communication system. In some such embodiments, a message identifier comprises a universal unique identifier (UUID) comprising at least a minimum number of characters of a particular encoding (e.g., ASCII text, Unicode text, or the like). In some embodiments, a message identifier is a time-ordered UUID based on the timestamp representing a time at which the group-based message was received by the group-based communication system.

The term "message metadata data object" refers to information and/or data, associated with a particular group-based message, that is used for identifying, locating, and/or retrieving a corresponding group-based message or associated message data thereof. In some embodiments, the message metadata data object includes information and/or data includes data identified and/or otherwise determined by a group-based communication system without the information and/or data being input explicitly by the user. In some example embodiments, a message metadata data object includes, without limitation, a team identifier, a channel identifier, an author identifier, a mention identifier set, a timestamp, an entity identifier in any form defined herein, or any combination thereof. In some embodiments, a message metadata data object includes data generated by a group-based communication system for identifying, locating, and/or retrieving a corresponding group-based message. For example, in some embodiments, a message metadata data object includes a residency token data object for identifying, locating, and/or retrieving associated message data from a geographic data residency local repository physically located within another geographic region. The term "message metadata set" or "message metadata" refers to one or more message metadata data object(s), each associated with a group-based message.

The term "message data" refers to a collection of one or more message data objects. The term "message data object" refers to electronically managed data that includes substantive content associated with a group-based message. Examples of a message data object include, without limitation, message text data, message file data, message image data, message video data, message audio data, or any combination thereof. In some embodiments, a message data object associated with a particular group-based message is stored in a particular geographic data residency local repository based on particular data in a message metadata data object for the group-based message.

The term "message file data" refers to a collection of one or more file data objects. The term "file data object" refers to electronically managed data that includes a package of data managed by a group-based communication system. In some embodiments, a file data object includes data managed by, and/or accessible through, an external resource of the group-based communication system. Additionally or alternatively, in some embodiments, a file data object includes data managed by, and/or accessible through, a third-party application. In some embodiments, a group-based message includes message file data as a portion of message data. In some such embodiments, a group-based message includes file data attached to other message data and/or message metadata, for example in addition or alternative to text, image, video, and/or audio data provided within the group-based message. In some embodiments, message file data may be a file associated with a user identifier uploaded via an API and the file may be renderable within a group-based communication channel.

The term "geographic data residency message package" refers to an electronic transmission of one or more data structures, the one or more data structures comprising a message identifier, an organization identifier, and one or more of all or a subset of message data or all or a subset of message metadata associated with the message identifier. The geographic data residency message package is transmitted to a geographic data residency server so that the geographic data residency server may properly route one or more of all or a subset of message data or all or a subset of message metadata associated with the message identifier to a repository for storage according to a data storage/security policy associated with the organization identifier.

The term "message data object retrieval request" refers to an electronic request received from a client device (or other computing device) for retrieval of one or more message data objects in one or more messages. In some embodiments, the message data object retrieval request comprises a message identifier. For example, a client device may perform a search query with the group-based communication system that returns several messages as results. In such an example, the client device may request to retrieve one or more message data objects of the messages contained in the results. In order to do so, the client device submits a message data object retrieval request comprising a message identifier.

The term "geographic data residency data retrieval request" refers to an electronic request submitted to a geographic data residency server, by a group-based communication server, for message data and/or metadata stored at a repository address referred to by residency token data contained in the geographic data residency data retrieval request.

The term "search index" refers to an electronically managed data set, file, or information representation for linking search data to zero or more data objects controlled by a group-based communication system. For example, in some embodiments, a search index includes information for linking search terms to zero or more group-based messages, such that group-based messages stored by a particular geographic data residency local repository may be easily searched using the search index. In some embodiments, a search index is locally stored in a geographic data residency local repository based on one or more policies associated with the author and/or recipient user account for a group-based message. In some embodiments, the search index is encrypted within a geographic data residency local repository, which is referred to as an "encrypted search index."

The term "entity search key" refers to electronically managed data, corresponding to a particular entity, used to decrypt an encrypted search index associated with the entity. In this regard, in some embodiments, a geographic data residency local repository stores an entity search key associated with an entity set including each entity associated with a data residency policy data object that corresponds to the geographic area within which the geographic data residency local repository is located. The term "organization search key," for example, refers to a particular entity search key stored by a geographic data residency local repository, where the organization search key corresponds to a particular organization of the group-based communication system, and where the organization is associated with a data residency policy data object linked to the geographic boundary in which the geographic data residency local repository storing the organization search key is located.

The term "message decryption key" refers to electronically managed data, corresponding to a particular entity, for use in decrypting one or more group-based message(s), or a portion thereof, associated with the entity. In some embodiments, for example, a message decryption key is stored associated with an organization of the group-based communication system, such that the message decryption key can be used to decrypt group-based messages associated with user accounts within the organization. In other embodiments, a message decryption key is associated with a particular group-based communication workspace, such that the message decryption key can be used to decrypt group-based messages associated with the group-based communication workspace. In other embodiments, a message decryption key is associated with a particular user account, such that the message decryption key can be used to decrypt group-based messages associated with the corresponding user account. In some embodiments, a decryption key may be a word, a number, a phrase, or a random string of data bits designed for scrambling and unscrambling message data using a decryption algorithm. In some embodiments, a message decryption key may be the same as a message encryption key used to encrypt the group-based communication message.

The term "message encryption key" refers to electronically managed data, corresponding to a particular entity, for use in encrypting one or more group-based message(s), or a portion thereof, associated with the entity. In some embodiments, for example, a message encryption key is stored associated with an organization of the group-based communication system, such that the message encryption key can be used to encrypt group-based messages associated with user accounts within the organization. In other embodiments, a message encryption key is associated with a particular group-based communication workspace, such that the message encryption key can be used to encrypt group-based messages associated with the group-based communication workspace. In other embodiments, a message encryption key is associated with a particular user account, such that the message encryption key can be used to encrypt group-based messages associated with the corresponding user account. In some embodiments, a message encryption key may be a word, a number, a phrase, or a random string of data bits designed for scrambling and unscrambling message data using an encryption algorithm. In some embodiments, the message encryption key may be the same as the message decryption key. In some embodiments, the message encryption key may be different from the message decryption key.

The term "requestor system" refers to a sub-device, system, and/or computing hardware of a group-based communication system that transmits a request to a geographic data residency server associated with a particular geographic area for processing. In some embodiments, a requestor system is configured to communicate with one or more geographic data residency server(s) and/or geographic data residency local repositories in response to receiving one or more requests from a client device.

The term "search request" refers to electronically managed data representing a query for group-based messages (or associated identifiers) or corresponding message data, that includes or is associated with particular content. A search request includes search request data that represents the content to be searched for. In some embodiments, the search request data is used by a group-based communication system to in retrieving stored message data and/or message metadata (e.g., one or more message identifiers) from the group-based communications system. In some embodiments, a search request is processed by a group-based communication system utilizing one or more search indexes stored by a geographic data residency local repository for a particular geographic area corresponding to an entity associated with the search request. In some embodiments, a search request is provided to and/or processed by a geographic data residency server associated with a particular geographic data residency local repository. The term "search results data" refers to electronically managed data retrieved from one or more geographic data residency local repositories in response to a search request. Examples of search results data include, without limitation, a group-based message set, a message data set, one or more data object identifiers, a user identifier set, and/or any combination thereof.

The term "short-term memory" refers to a database or a memory that is used for temporarily storing and managing information or data for a short period of time for the purpose of storing, transmitting, or accessing message data in the group-based communication system. For instance, a short-term memory may be a cache memory, a Random Access Memory (RAM), a Static Random Access Memory (SRAM), etc., that is used to retain or store message data or decryption key in a data wipe period for processing the data. In such an example, the data wipe period may be a short period of time no longer than is necessary for the purposes for which the message or decryption key was processed. For instance, the data wipe period may be a defined number of seconds. One example of a short-term memory is a geographic data residency local cache.

System Architecture and Example Apparatus

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 105 via a communications network 104 using client devices 101A-101N.

Communications network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 104 may include a cellular telephone, an 802.11, 802.16, 802.20, and/or WiMax network. Further, the communications network 104 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The group-based communication servers 106A may be embodied as a computer or computers. The group-based communication servers 106A may provide for receiving of electronic data from various sources, including but not necessarily limited to the client devices 101A-101N. For example, the group-based communication server 106A may be operable to receive and post or transmit group-based messaging communications provided by the client devices 101A-101N. In some embodiments, the group-based communication server 106A may be in communication with one or more other group-based communication servers 106B-106C that serve as geographic data residency servers located in geographic regions that are different from the geographic region where the group-based communication server 106A is located in.

The group-based communication repository 107A may be embodied as a data storage device such as a Network Attached Storage (NAS) device or devices, or as a separate repository server or servers. The group-based communication repository 107A includes information accessed and stored by the group-based communication server 106A to facilitate the operations of the group-based communication system 105. For example, the group-based communication repository 107A may include, without limitation, a plurality of messaging communications organized among a plurality of group-based communication channels, and/or the like. In some embodiments, each of the group-based communication servers 106B-106C that serve as geographic data residency servers may be associated with their own group-based communication repository 107B-107C that serve as geographic data residency local repositories.

The client devices 101A-101N may be any computing device as defined above. Electronic data received by the group-based communication server 106A from the client devices 101A-101N may be provided in various forms and via various methods. For example, the client devices 101A-101N may include desktop computers, laptop computers, smartphones, netbooks, tablet computers, wearables, and the like.

In some embodiments where a client device 101A-101N is a mobile device, such as a smart phone or tablet, the client device 101A-101N may execute an "app" to interact with the group-based communication system 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via APIs provided by the mobile device operating system.

Additionally or alternatively, the client device 101A-101N may interact with the group-based communication system 105 via a web browser. As yet another example, the client device 101A-101N may include various hardware or firmware designed to interface with the group-based communication system 105.

In some embodiments of an exemplary group-based communication system 105, a message or messaging communication may be sent from a client device 101A-101N to a group-based communication system 105. In various implementations, the message may be sent to the group-based communication system 105 over communications network 104 directly by a client device 101A-101N, the message may be sent to the group-based communication system 105 via an intermediary such as a message server, and/or the like. For example, the client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXS1S1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXS1S1XXXX</client_serial_number>
        <client_UDID>3XXXXXXXXXXXXXXXXXXXXXXXXD</client_UDID>
```

```
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPrK5,1</client_product_type>
        <client_serial_number>YXXXXXXXXXZ</client_serial_number>
        <client_UDID>FXXXXXXXXX-XXXX-XXXX-XXXX-
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <contents>That is an interesting invention. I have attached a copy our
patent policy.</contents>
        <attachments>patent_policy.pdf</attachments>
    </message>
</auth_request>
```

The group-based communication system 105 comprises at least one group-based communication server 106A that may create a storage message based upon the received message to facilitate message indexing and storage in a group-based communication repository 107A. In one implementation, the storage message may include data such as a message identifier, a group identifier, a group-based communication channel identifier, a sending user identifier, topics, responses, message contents, attachments, message hierarchy data, third party metadata, conversation primitive data, and/or the like. For example, the group based communication server 106A may provide the following example storage message, substantially in the form of a HTTP(S) POST message including XML-formatted data, as provided below:

```
POST /storage_message.php HTTP/1.1
Host: www.server.com
Content-Type: Application/XML
Content-Length: 667
<?XML version = "1.0" encoding = "UTF-8"?>
<storage_message>
        <message_identifier>ID_message_10</message_identifier>
        <team_identifier>ID_team_1</team_identifier>
        <channel_identifier>ID_channel_1</channel_identifier>
        <sending_user_identifier>ID_user_1</sending_user_identifier>
        <topics>
            <topic>inventions</topic>
            <topic>patents</topic>
            <topic>policies</topic>
        </topics>
        <responses>
            <response>liked by ID_user_2</response>
            <response>starred by ID_user_3</response>
        </responses>
        <contents>That is an interesting invention. I have attached a copy our patent
policy.</contents>
```

```
    <attachments>patent_policy.pdf</attachments>
    <conversation_primitive>
        conversation includes messages: ID_message_8, ID_message_9,
ID_message_10,
        ID_message_11, ID_message_12
    </conversation_primitive>
</storage_message>
```

In some embodiments, the group-based communication server 106A may determine that an entity identifier associated with a group-based communication message is associated with a geographic data storage policy and transmit a geographic data residency message package comprising message data to one of the group-based communication servers 106B-106C that serve as geographic data residency servers. The group-based communication servers 106B-106C that serve as geographic data residency servers may store the message data in the group-based communication repositories 107B-107C that serve as geographic data residency local repositories. The group-based communication servers 106B-106C that serve as geographic data residency servers may generate residency token data in accordance with the message data and transmit the residency token data back to the group-based communication server 106A. The group-based communication server 106A may store the residency token data in the group-based communication repository 107A.

In some embodiments, a group identifier as defined above may be associated with the message.

In some embodiments, a group-based communication channel identifier as defined above may be associated with the message.

In some embodiments, a sending user identifier as defined above may be associated with the message. In one implementation, the message may be parsed (e.g., using PHP commands) to determine a sending user identifier of the user who sent the message.

In some embodiments, topics may be associated with the message. In one implementation, the message contents may be parsed (e.g., using PHP commands) to determine topics discussed in the message. For example, hashtags in the message may channels associated with the message. In another example, the message may be analyzed (e.g., by itself, with other messages in a conversation primitive) or parsed using a machine learning technique, such as topic modeling, to determine topics associated with the message.

In some embodiments, data indicating responses may be associated with the message. For example, responses to the message by other users may include reactions (e.g., selection of an emoji associated with the message, selection of a "like" button associated with the message), clicking on a hyperlink embedded in the message, replying to the message (e.g., posting a message to the group-based communication channel in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a repository. For example, data regarding responses to the message may be retrieved via a MySQL repository command similar to the following:

```
SELECT messageResponses
    FROM MSM_Message
    WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic).

In some embodiments, attachments may be included with the message. If there are attachments, files may be associated with the message. In one implementation, the message may be parsed (e.g., using PHP commands) to determine file names of the attachments. For example, file contents may be analyzed to determine context for the message (e.g., a patent policy document may indicate that the message is associated with the topic "patents").

In some embodiments, third party metadata may be associated with the message. For example, third party metadata may provide additional context regarding the message or the user that is specific to a company, group, group-based communication channel, and/or the like. In one implementation, the message may be parsed (e.g., using PHP commands) to determine third party metadata. For example, third party metadata may indicate whether the user who sent the message is an authorized representative of the group-based communication channel (e.g., an authorized representative may be authorized by the company to respond to questions in the group-based communication channel).

In some embodiments, a conversation primitive may be associated with the message. In one implementation, a conversation primitive is an element used to analyze, index, store, and/or the like messages. For example, the message may be analyzed by itself, and may form its own conversation primitive. In another example, the message may be analyzed along with other messages that make up a conversation, and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages.

In some embodiments, various metadata, determined as described above, and/or the contents of the message may be used to index the message (e.g., using the conversation primitive) to facilitate various facets of searching (i.e., search queries that return results from group-based communication repository 107A). In one implementation, a storage message may be sent from group-based communication server 106A to facilitate indexing in group-based communication repository 107A. In another implementation, metadata associated with the message may be determined and the message may be indexed in group-based communication repository 107A. In one embodiment, the message may be indexed such that a company's or a group's messages are indexed separately (e.g., in a separate index associated with the group and/or company that is not shared with other groups and/or companies). In one implementation, messages may be indexed at a separate distributed repository (e.g., to facilitate data isolation for security purposes). In some embodiments, search requests may be originated from the group-based communication server 106A and the group-based communication servers 106B-106C that serve as geographic data residency servers may perform searching accordingly, as described in more detail in conjunction with other figures.

If there are attachments associated with the message, file contents of the associated files may be used to index such files in group-based communication repository 107A to facilitate searching. In one embodiment, the files may be indexed such that a company's or a group's files are indexed at a separate distributed repository.

Example Apparatus for Implementing Embodiments of the Present Disclosure

The group-based communication servers 106A-106C may be embodied by one or more computing systems, such as apparatus 200 shown in FIG. 2. The apparatus 200 may include a processor 202, a memory 201, input/output circuitry 203, communications circuitry 205, group-based communication circuitry 204, local search module 206, and search management module 207. The apparatus 200 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the terms "circuitry" and "module" as used herein with respect to components of the apparatus should therefore be understood to include particular hardware configured to perform the functions associated with the particular circuitry as described herein.

The terms "circuitry" and "module" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium). The memory 201 may be configured to store information, data, content, applications, instructions, or the like, for enabling the apparatus to carry out various functions in accordance with example embodiments of the present disclosure.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 203 that may, in turn, be in communication with processor 202 to provide output to the user and, in some embodiments, to receive an indication of a user input. The input/output circuitry 203 may comprise a user interface and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 201, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The group-based communication circuitry 204 includes hardware configured to support group-based communication and access in a group-based communication system. The group-based communication circuitry 204 may utilize processing circuitry, such as the processor 202, to perform actions including receiving message request from client devices 101A-101N or transmitting a group-based communication message to client devices 101A-101N. The group-based communication circuitry 204 may store and/or access message data from group-based communication repository 107A. The group-based communication circuitry 204 may assign and/or fetch message data from a group-based communication repository that serve as a geographic data residency local repository 107B/C. In some implementations, the sent and/or received data may include message content that is restricted to be permanently stored to a group-based communication repository that serve as a geographic data residency local repository 107B/C located within a defined geographic boundary or be temporarily stored to a group-based communication repository 107A located outside the defined geographic boundary. It should also be appreciated that, in some embodiments, the group-based communication circuitry 204 may include a separate processor, specially configured field programmable gate array (FPGA), or application-specific integrated circuit (ASIC).

The search management module 207 includes hardware, software, or a combination thereof, configured to support search index generation and management associated with group-based messages distributed throughout various geographic data residency local repositories. The search management module 207, for example in some embodiments, is configured to identify a message metadata set for at least one group-based message stored in a different geographic area. For example, the search management module 207 may communicate with a message database in the same geographic area as the apparatus 200 to retrieve stored data that indicates message data and/or other content for a group-based message is stored in a geographic data residency local repository located within a different geographic area. Additionally or alternatively, the search management module 207 may include hardware, software, or a combination thereof, configured to generate and/or transmit one or more requests, data, information, and/or the like, to at least one geographic data residency server to retrieve message data for the group-based messages stored in a geographic data residency local repository that is communicable with the geographic data residency server. In some such embodiments, the stored data retrieved earlier may be used to identify the one or more geographic data residency server (s) with which to communicate. For example, the stored data may comprise a residency token data set, where each residency token data object identifies a particular geographic data residency server and/or geographic area with where the corresponding message data for the group-based message is stored and can be accessed. Additionally or alternatively, the search management module 207 may be configured to cause generation and/or storage of a search index based on one or more portions of the retrieved information.

In some embodiments, the search management module 207 is configured, using hardware, software, or a combination thereof, to retrieve a search index to be used for processing a search request. In some embodiments, for example, the search management module 207 includes hardware, software, or a combination thereof, to receive a search request associated with a particular entity identifier, where the entity identifier is associated with a particular geographic area (for example, based on one or more data residency policies linked to the entity identifier). The search management module 207, in some embodiments, is configured to identify a geographic area and/or geographic data residency server based on the entity identifier and/or linked information. The search management module 207 may be configured to retrieve a search index from a geographic data residency local repository associated with the geographic data residency server, for example through transmission of a search index retrieval request to the geographic data residency server. The search management module 207 may, additionally or alternatively, may include hardware, software, or a combination thereof configured to identify search results data based on a retrieved search index and/or the search request, for example using search request data therein. The search management module 207 may additionally or alternatively include hardware, software, or a combination thereof, to provide the search results data to a system, device, or other computing hardware that originated, or otherwise transmitted, the search request.

In some embodiments, the search management module 207 may be configured to identify, retrieve, and/or utilize key data for unencrypting one or more types of stored data. In some embodiments, for example, the search management module 207 may identify one or more entity search key(s) or message decryption key(s), each of which may be used to decrypt certain data and/or retrieve decrypted data, such as from a geographic data residency server located within another geographic area. For example, in some embodiments, the search management module 207 may be configured via hardware, software, or a combination thereof, to identify and/or retrieve a message decryption key for use in retrieving a decrypted message data set, and/or an entity search key for use in retrieving a decrypted search index.

It should be appreciated that, in some embodiments, the search management module 207 may utilize one or more of the other modules described with respect to apparatus 200 to perform some or all of the actions described above. For example, in some embodiments, the search management module 207 utilizes processing circuitry, such as the processor 202, to perform at least one of the actions described above. It should also be appreciated that, in some embodiments, the search management module 207 may include a separate processor, specially configured field programmable gate array (FPGA), or specially configured application-specific integrated circuit (ASIC).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Client Device/Remote Apparatus for Implementing Embodiments of the Present Disclosure Some client devices/remote apparatuses among client devices 101A-101N positioned outside a defined geographic boundary may be embodied by one or more computing systems, such as apparatus 320 shown in FIG. 3. The remote apparatus 320 may include a processor 322, a memory 321, input/output circuitry 323, and communications circuitry 325. The remote apparatus 320 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the remote apparatus 320 may provide or supplement the functionality of particular circuitry. For example, the processor 322 may provide processing functionality, the memory 321 may provide storage functionality, the communications circuitry 325 may provide network interface functionality, and the like.

In some embodiments, the processor 322 (and/or co-processor or any other processing circuitry assisting or otherwise associated with the processor) may be in communication with the memory 321 via a bus for passing information among components of the apparatus. The memory 321 may be non-transitory and may include, for example, one or more volatile and/or non-volatile memories. In other words, for example, the memory may be an electronic storage device (e.g., a computer readable storage medium). The memory 321 may be configured to store information, data, content, applications, instructions, or the like, for enabling the apparatus to carry out various functions in accordance with example embodiments of the present disclosure.

The processor 322 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" and "processing module" may be understood to include a single core processor, a multi-core processor, multiple processors internal to the apparatus, and/or remote or "cloud" processors.

In an example embodiment, the processor 322 may be configured to execute instructions stored in the memory 321 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the remote apparatus 320 may include input/output circuitry 323 that may, in turn, be in communication with processor 322 to provide output to the user and, in some embodiments, to receive an indication of a user input. The input/output circuitry 323 may comprise a user interface and may include a display and may comprise a web user interface, a mobile application, a client device, a kiosk, or the like. In some embodiments, the input/output circuitry 323 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 321, and/or the like).

The communications circuitry 325 may be any means such as a device or circuitry embodied in either hardware or a combination of hardware and software that is configured to receive and/or transmit data from/to a network and/or any other device, circuitry, or module in communication with the remote apparatus 320. In this regard, the communications circuitry 325 may include, for example, a network interface for enabling communications with a wired or wireless communication network. For example, the communications circuitry 325 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Managing Transmission, Storage, and Retrieval of Message Data FIGS. 4A and 4B illustrate exemplary data flows 400 for managing geographically distributed data storage, according to embodiments of the present disclosure. In some embodiments, an apparatus is configured for managing geographically distributed data storage in a group-based communication system. In some embodiments, the apparatus is physically located in a first geographic area (e.g., Geographic Area 1) defined by a first geographic boundary. The apparatus comprises at least one processor and at least one non-transitory memory including computer program code that, with the at least one processor, cause the apparatus to perform various functions including those of data flow 400. In some embodiments, the apparatus is the group-based communication system 106A. In some embodiments, the first geographic boundary is defined by a first plurality of latitude and longitude coordinates.

In some embodiments, data flow 400 comprises receiving 401, by a group-based communication server and from a first client device, a message comprising message data, message metadata, and a message identifier.

In some embodiments, data flow 400 comprises extracting 402 an entity identifier from the message metadata and determining that the entity identifier is associated with a geographic data storage policy. In some embodiments, a recipient identifier associated with the message is associated with a different geographic data storage policy from that with which the entity identifier is associated. In some embodiments, the apparatus may be configured to extract an organization identifier from the message metadata and use the organization identifier as the entity identifier. In some embodiments, the apparatus may be configured to extract a sending user identifier from the message metadata and use the extracted sending user identifier to query the group-based communication repository to identify an organization identifier associated with the sending user identifier and utilize the organization identifier identified as an extracted entity identifier.

In some embodiments, data flow 400 continues with, upon determining that the entity identifier is associated with a geographic data storage policy, transmitting 403 a geographic data residency message package comprising the message data to geographic data residency server physically located within a second geographic area defined by a second geographic boundary (e.g., Geographic Area 2) associated with the geographic data storage policy. In some embodiments, the geographic data residency server generates 403A residency token data, the residency token data referencing a geographic data residency local repository address associated with the message data. In some embodiments, the geographic data residency server provides 403B the message data and optionally the residency token data to a geographic data residency local repository physically located within the second geographic boundary associated with the geographic data storage policy for storage. In some embodiments, the second geographic boundary is defined by a second plurality of latitude and longitude coordinates. In some embodiments, the first geographic boundary is subject to a first geographic data storage policy and the second geographic boundary is subject to a second geographic data storage policy. In some embodiments, the geographic data residency message package further comprises a subset of the message metadata and the subset of the message metadata is also replaced with the data residency data in the updated message. In some embodiments, a recipient identifier associated with the message is associated with a different geographic data storage policy from that with which the entity identifier is associated.

In some embodiments, data flow 400 continues with receiving 404, from the geographic data residency server, the residency token data referencing the geographic data residency local repository address associated with the message data. In some embodiments, the geographic data residency local repository address is associated with a geographic data residency local repository physically located within the second geographic boundary associated with the geographic data storage policy. In some embodiments, the residency token data comprises a message identifier, a storage location identifier, and a message encryption key. In some embodiments, the message encryption key may be a message encryption key unique to a subset of messages grouped according to one or more of: an entity identifier, a recipient identifier, a sending user identifier, or the like. In some embodiments, the message encryption key may be used as a standalone message decryption key. In some embodiments, the message encryption key may be used in conjunction with another centrally managed message encryption key managed by group-based communication server 106A for encryption or decryption. In some embodiments, the message encryption key may be managed by a group-based communication encryption key management server, discussed in more detail in U.S. patent application Ser. No. 16/434,097, entitled "METHOD, APPARATUS, AND COMPUTER PROGRAM PRODUCT FOR ENCRYPTION KEY MANAGEMENT WITHIN A GROUP-BASED COMMUNICATION SYSTEM," filed Jun. 6, 2019, the contents of which are incorporated herein by reference in their entirety. In some embodiments, the residency token data may be transmitted from the geographic data residency server to the group-based communication encryption key management server before operation 404.

By receiving the residency token data, for example at 404, the group-based communication server is configured to enable retrieval of the corresponding message data through communicating with the geographic data residency server. Similarly, in some embodiments where the message is associated with a common group-based communication channel associated with a plurality of data residency policies, the message metadata, for example including the residency token data, may be copied to any number of other geographic data residency local repositories in the other geographic areas via geographic data residency servers in other geographic areas for the data residency policies. In this regard, if the common group-based communication channel is accessible by a plurality of entities, each assigned a data retention policy indicating that data should be stored in different geographic areas, the message content may be stored in the geographic area associated with the author user account that originated the message, and the remaining geographic areas may be configured to store the message metadata associated with the message. By storing the message metadata in each geographic area, for example within a geographic data residency local repository communicable with a geographic data residency server in another geographic area, the message metadata may be used to retrieve the message content from the geographic area where the message content is stored. In this regard, the message content may be retrieved for displaying to one or more users, and/or for processing, for example to create and/or store one or more search indices as described herein. In an example context, a common-group based communication channel is associated with at least 3 organization identifiers, each organization identifier associated with a different geographic data storage policy identifying a different geographic area (or in at least some embodiments, a different primary geographic area) for storing data. In this regard, the common group-based communication channel is associated with each of the geographic data storage policies, such that when a message is posted to the common group-based communication channel, the message content and/or message metadata is copied to each geographic data residency local repository in each applicable geographic area based on the various geographic data storage policies. For example, the message content may be copied to the geographic area identified by the geographic data storage policy associated with the organization for the authenticated user account that posted the message, and corresponding message metadata may be stored to each other geographic area identified by the remaining geographic data storage policies associated with the other organizations within the common group-based communication channel.

In some embodiments, at least one organization identifier associated with a group-based communication channel identifier associated with the message is different from the organization identifier associated with the entity identifier. In such embodiments, the message encryption key includes a first message encryption key associated with the organization identifier and a second message encryption key associated with the at least one organization identifier.

In some embodiments, data flow 400 continues with updating 405 an updated message by replacing the message data from the message with the residency token data, wherein the updated message comprises the residency token data, the message metadata, and the message identifier.

In some embodiments, data flow 400 continues with storing 406/407 the updated message in a local repository physically located in the first geographic area defined by the first geographic boundary.

In some embodiments, data flow 400 may optionally transmit 408 an acknowledgement to the client device that the message was successfully delivered and processed.

It will be appreciated that the geographic data residency server may be located in any geographic area, and is not tied to either of, for example, geographic area 1 or geographic area 2 as shown in FIG. 4A.

In some embodiments, the geographic data residency message package comprises a subset of the message data, and the subset of the message data is replaced with the residency token data in the updated message.

FIGS. 5A and 5B illustrate exemplary data flows 500 for retrieving geographically distributed data storage, according to embodiments of the present disclosure. In some embodiments, an apparatus is configured for managing geographically distributed data storage in a group-based communication system. In some embodiments, the apparatus is physically located in a first geographic area (e.g., Geographic Area 1) defined by a first geographic boundary. The apparatus comprises at least one processor and at least one non-transitory memory including computer program code that, with the at least one processor, cause the apparatus to perform various functions including those of data flow 500.

In some embodiments, data flow 500 comprises receiving 501, from a second client device, a message retrieval request, the message retrieval request comprising the message identifier.

In some embodiments, data flow 500 comprises retrieving 502, from the local repository, the updated message associated with the message identifier.

In some embodiments, data flow 500 comprises, upon determining that the updated message comprises residency token data, transmitting 503 a geographic data residency data retrieval request to a geographic data residency server associated with the residency token data, the geographic data residency retrieval request comprising the residency token data. In some embodiments, the geographic data residency server retrieves 503A the message data from a geographic data residency local repository physically located within the second geographic boundary associated with the geographic data storage policy. In some embodiments, the message data is stored in short term memory such that persistence of the message data only exists at the geographic data residency local repository. In some embodiments, the geographic data residency retrieval request may be transmitted to a group-based communication encryption key management server in instances where the geographic data residency server cannot retrieve the residency token data.

In some embodiments, data flow 500 comprises receiving 504, from the geographic data residency server, the message data stored in the geographic data residency local repository at a geographic data residency local repository address associated with the residency token data.

In some embodiments, data flow 500 comprises transmitting 505 the message data to the client device.

In some embodiments, the first geographic boundary is defined by a first plurality of latitude and longitude coordinates and the second geographic boundary is defined by a second plurality of latitude and longitude coordinates.

In some embodiments, the first geographic boundary is subject to a first data storage policy and the second geographic boundary is subject to a second data storage policy.

In some embodiments, the geographic data residency message package further comprises a subset of the message metadata, and the subset of the message metadata is also replaced with the residency token data in the updated message.

In some embodiments, the geographic data residency server is physically located within a third geographic area defined by a third geographic boundary.

In some embodiments, the message data is stored in short term memory such that persistence of the message data only exists at the geographic data residency local repository.

In some embodiments, the residency token data comprises a token.

In some embodiments, the geographic data storage policy is associated with legal data storage requirements associated with a particular geographic boundary.

In some embodiments, a geographic boundary is one or more of Asia, western Europe, North America, United States, Germany, India, China, Japan, Europe, and France.

Example Data Flow for Search Index Generation

FIG. 6 illustrates an example data flow diagram for generating and/or maintaining a search index associated with a particular geographic area. The data flow diagram includes example operations performed by various computing devices of an example computing architecture. Specifically, the computing architecture includes geographic data residency server 604A in communication with geographic data residency local repository 606A, and geographic data residency server 604B in communication with geographic data residency local repository 606B. The geographic data residency server 604A and geographic data residency local repository 606A are physically located within a first geographic area 608A, while the geographic data residency server 604B and geographic data residency local repository 606B are physically located within a second geographic area 608B. Optionally, in some embodiments, the example computing architecture may include a requestor system 602 communicable with one of the geographic data residency servers (for example, geographic data residency server 604A), or both geographic data residency servers. The requestor system 602 may communicate with a geographic data residency server to initiate generation and/or updating of a search index stored locally (e.g., within the same geographic area) to the geographic data residency server. In some such embodiments, the requestor system 602 may be embodied by a group-based communication server, such as the group-based communication server 106A, or a client device, such as one of the client devices 101A-101N. In other embodiments, a geographic data residency server may embody the requestor system 602, or otherwise function without communicating with any such system (for example, each geographic data residency server may be configured to update automatically, such as based on a predetermined schedule).

The particular data flow illustrated includes steps that may be performed entirely by a single device, or performed via one or more actions executed by a plurality of devices (e.g., a transmitting device and a receiving device). It should be appreciated that, in some embodiments, each step may include one or more sub-steps. Additionally or alternatively, in some embodiments, a step may be performed by another computing device in whole or in part. Optional steps are illustrated in broken lines (or "dashed" lines). It should be appreciated that, in some embodiments, one or more of the optional operations may be performed, or a corresponding computing device may be configured for performance of such optional operation, while in other embodiments, no operations may be performed, or one or more computing devices may not be configured for such performance.

At optional step 652, the requestor system 602 may transmit a search index generation request to the geographic data residency server 604A. In this regard, the requestor system may be configured to prompt generation and/or update of a search index stored by one or more geographic data residency server(s). For example, the requestor system 602 may be configured to coordinate updating of search indices stored associated with a plurality of geographic data residency servers, for example by correlated geographic data residency local repositories and distributed across various geographic areas. The requestor system 602 may be configured to generate and/or transmit a search index generation request upon a certain action or event, such as particular user interaction identified by the requestor system. Alternatively or additionally, in some embodiments, the requestor system 602 may be configured to generate and/or transmit a search index generation request at one or more predetermined times (e.g., hourly, daily, weekly, monthly, or the like) by tracking and/or analyzing one or more timestamps to determine when a search index requires updating.

In some embodiments, the transmission from the requestor system 602, such as a search index generation request and/or one or more other transmissions, may cause the geographic data residency server 604A to initiate and/or otherwise perform one or more actions. For example, the geographic data residency server 604A may initiate one or more of the steps described below in response to receiving the transmission. The transmission may include data and/or information for use in retrieving data used for subsequent steps, decrypting such data, and/or identifying one or more computing devices from which data should be retrieved. For example, a search index generation request may include a message metadata set, residency token data set, message data set, entity search key(s) (or a set thereof), message decryption key(s) (or a set thereof), or the like, and/or any combination thereof.

At step 654, the geographic data residency server 604A is configured to query the geographic data residency local repository 606A for a message data set associated with one or more locally-stored (e.g., stored within the same geographic area) group-based messages. In some embodiments, the geographic data residency server 604A may generate and/or transmit one or more requests to the geographic data residency local repository 606A. For example, the geographic data residency server 604A may generate a geographic data residency data retrieval request and/or transmit the geographic data residency data retrieval request the geographic data residency local repository 606A. In some embodiments, the geographic data residency data retrieval request may be configured to request all message data stored within the geographic data residency local repository 606A. In some embodiments, the geographic data residency data retrieval request may be configured based on information identified and/or received by the geographic data residency server 604A. In some such embodiments, the geographic data residency data retrieval request may be configured to retrieve a subset of the message data stored within geographic data residency local repository 606A. For example, the geographic data residency data retrieval request may be specially configured to retrieve message data associated with a particular entity identifier.

At step 656, the geographic data residency local repository 606A may retrieve a message data set and provide it to the geographic data residency server 604A, for example in response to an earlier request (e.g., at step 654). To retrieve the message data set, the geographic data residency local repository 606A may execute one or more queries represented by, or otherwise associated with, the transmission at step 654. For example, the geographic data residency local repository 606A may execute a query for all message data, or for a subset of message data associated with a particular entity identifier (for example, associated with a particular organization). In some embodiments, the geographic data residency server 604A initiates the query (e.g., using a request), the geographic data residency local repository 606A executes the query, and the geographic data residency server 604A receives the message data set as results data in response to the executed query. The retrieved message data set may embody message contents for one or more group-based messages stored within the first geographic area 608A based on one or more geographic data storage policies.

At optional step 658, the geographic data residency server 604A may decrypt the retrieved message data set. In some embodiments, for example, the geographic data residency server 604A may identify one or more message decryption keys for use in decrypting the retrieved message data set. In some embodiments, the geographic data residency server 604A may include, or communicate with, a key management system that stores the message decryption keys in a secure environment. The geographic data residency server 604A may retrieve the one or more message decryption keys based on information retrieved from the geographic data residency local repository 606A, for example the message data set itself and/or associated metadata. Additionally or alternatively, the geographic data residency server 604A may retrieve the one or more message decryption keys based on information received and/or identified at an earlier step. For example, the geographic data residency server 604A may utilize an entity identifier and/or other information identified from, or in response to, the transmission received at step 652.

In some embodiments, the message data set may include only locally-stored group-based messages (e.g., messages only stored within the first geographic area 608A). In some such embodiments, the data flow may continue to step 672, without execution of one or more intermediate steps.

In other embodiments, at step 660, the geographic data residency server 604A may identify a second message data set should be retrieved from a geographic data residency server associated with a different geographic area. For example, the geographic data residency server 604A may determine that the message data set retrieved from the geographic data residency local repository 606A includes a residency token data set (e.g., one or more residency token data objects) for use in identifying and/or retrieving non-local message data. In this regard, in some such embodiments, the geographic data residency server 604A may identify a second message data set should be retrieved by determining the retrieved message data set, and/or an associated metadata set, includes a residency token data set, for example by using one or more searching methodologies. Alternatively or additionally, in some embodiments, the geographic data residency server 604A may identify a second message data set should be retrieved from a second geographic data residency server based on one or more earlier-identified indicators and/or data, such as a portion of the data included in the received request (for example, one or more entity identifiers).

At optional step 662, the geographic data residency server 604A transmits a message metadata set comprising at least a data residency token data set to the geographic data residency server 604B for use in retrieving a second message data set. In some embodiments, the message metadata set, data residency token data set, and/or the like, may be transmitted as part of one or more requests, such as a geographic data residency data retrieval request, configured to cause the geographic data residency server 604B to initiate one or more actions for retrieving the second message data set. In some embodiments, the geographic data residency server 604A identifies a server for which to transmit at least the residency token data set based on one or more residency token data objects within the set. For example, each residency token data object may include a geographic area identifier, correlated to a second geographic area, which may be used to identify the geographic data residency server within the second geographic area associated with the geographic identifier. Alternatively or additionally, in some embodiments, the geographic data residency server 604A may identify the geographic data residency server 604B using data received and/or identified at an earlier step, such as included in an earlier received request.

The geographic data residency server 604B may be located in a different geographic area than the geographic data residency server 604A. For example, as illustrated, the geographic data residency server 604B is located in the second geographic area 608B. The geographic data residency servers 604A and 604B may be separated by any distance. For example, in some embodiments, the first geographic area 608A may be a first country and the second geographic area 608B may be a second country. The geographic areas are not restricted to any particular continent or other location requirement, for example, the first geographic area 608A may define the North America and the second geographic area 608B may define Europe. To facilitate communications, the geographic data residency server 604A and the geographic data residency server 604B may be configured to communicate via one or more networks, for example over the Internet. In some embodiments, the network may be configured for transmission over large physical distances (e.g., tens, hundreds, thousands of miles, or greater). Such networks may include one or more sub-networks to facilitate such transmissions.

At optional step 664, the geographic data residency server 604B is configured to query the geographic data residency local repository 606B for the second message data set. In some embodiments, the geographic data residency server 604B is configured to query the geographic data residency local repository 606B using the residency token data set and/or other information included in or otherwise associated with a message metadata set received by the geographic data residency server 604A. In some embodiments, the geographic data residency server 604B may generate a geographic data residency data retrieval request and/or transmit the geographic data residency data retrieval request to the geographic data residency local repository 606A. The geographic data residency data retrieval request may be specially configured, based on the residency token data set, to initiate querying for and retrieval of the second message data set. The second message data set may include a message data object for each group-based message having a corresponding residency token data object in the residency token data set. In this regard, the geographic data residency data retrieval request may be configured to prompt retrieval of the second message data subset stored within the geographic data residency local repository 606B.

At step 666, the geographic data residency local repository 606B may retrieve the second message data set and provide it to the geographic data residency server 604B. To retrieve the second message data set, the geographic data residency local repository 606B may execute one or more queries represented by, or initiated by, the transmission at step 664. In some such embodiments, the geographic data residency server 604B may receive the second message data set as result data in response to the earlier query.

At optional step 668, the geographic data residency server 604B may decrypt the retrieved second message data set. In some embodiments, for example, the geographic data residency server 604B may identify one or more message decryption keys for use in decrypting the second message data set. For example, in some embodiments, the geographic data residency server 604B may include, or communicate with, a second key management system that stores the message decryption keys in a secure environment within the second geographic area 608B. The geographic data residency server 604B may retrieve the one or more message decryption keys based on information retrieved from the geographic data residency local repository 606B, for example the second message data set and/or an associated metadata set. In yet some embodiments, the message decryption keys may be identified based on received information from a geographic data residency server 604A, and/or may be received as data transmitted from the geographic data residency server 604A.

At optional step 670, the geographic data residency server 604B may transmit the second message data set to the geographic data residency server 604A. For example, the geographic data residency server 604B may include the second message data set as part of a response transmission. The transmission may be provided in response to an earlier received transmission, for example a request received at step 662. The response may similarly be transmitted over one or more networks and/or sub-networks that include one or more network devices connected between the second geographic region 608B and the first geographic region 608A.

At step 672, the geographic data residency server 604A may generate a search index based on the retrieved and/or received information. In some embodiments, the geographic data residency server 604A generates the search index based on at least the retrieved message data. Additionally or alternatively, in some embodiments, the search index is generated based on the retrieved message data and at least a portion of a message metadata set. In some example contexts, the message data is retrieved from the geographic data residency local repository 606A. In other example contexts, the message data set includes a combination of a first, local message data set retrieved from the geographic data residency server 604A, and a second, distributed message data set retrieved from the geographic data residency server 604B. In some such examples, the message data set may include all data objects from the first and second message data sets.

The search index may be generated by applying the message data set, or combined message data set and at least portion of the message metadata set, to a search index generation algorithm. The search index generation algorithm may be generated using one or more search index methodologies. For example, the search index may be generated based on the various message data objects of the message data set. In an example context, the search index may be generated based on text content within each message data object of the message data set. For example, the search index may identify particular locations of specific text data (e.g., certain words, phrases, and/or the like) within each message data object. The search index may be configured to enable efficient and accurate searching for message data object identification information for message data object(s) that include text content identified in a search request.

In some embodiments, the geographic data residency server 604A may encrypt the generated search index. For example, in some embodiments, the geographic data residency server 604A may receive, retrieve, or otherwise identify an entity search key for use in encrypting the search index. In some embodiments, the entity search key is retrieved based on information received for initiating generation of the search index. For example, the geographic data residency server 604A may identify an entity search key based on an entity data object identifier linked or otherwise associated with the search index. In an example context, a search index may be generated associated with a particular organization data object having a corresponding organization data object identifier, such that the search index may be used for searching for particular content within message data of group-based messages associated with the organization data object identifier.

At step 674, the geographic data residency server 604A is configured to store the generated search index. In some embodiments, for example as illustrated, the geographic data residency server 604A may be configured to store the search index to a geographic data residency local repository 606A. The search index may be stored associated with an entity data object identifier, for example associated with a particular entity data object linked to a data residency policy for the first geographic area 608A. In some such embodiments, the geographic data residency server 604A is configured to generate a search index storage request comprising the search index for storage. It should be appreciated that the search index may be stored in an unencrypted format and/or an encrypted format.

At optional step 676, the geographic data residency server 604A is configured to transmit a response to the requestor system 602. In some embodiments, the transmission includes the response to the earlier received request, for example received at step 652. The response transmission may include information indicating the search index was successfully created and/or stored. Alternatively or additionally, in some embodiments, the response transmission may include the search index, search index identification information, and/or other information associated with the generated search index. The requestor system 602 may be configured to store the received information, and/or utilize the information in generating one or more interfaces, response messages, and/or the like. For example, the requestor system 602 may render a confirmation interface including one or more interface components that indicate whether generation of the search index was processed successfully.

Example Data Flow for Search Index Utilization

FIG. 7 illustrates an example data flow diagram for utilizing a stored search index to respond to a search request. The data flow diagram includes example operations performed by various computing devices of another example computing architecture. Specifically, the computing architecture includes a client device 702 in communication with the group-based communication server 704. The group-based communication server 704 is in communication with at least the geographic data residency server 604A in communication with geographic data residency local repository 606A. The group-based communication server 704 is physically located within a third geographic area 508C, and the geographic data residency server 604A and geographic data residency local repository 606A are physically located in the first geographic area 608A.

It should be appreciated that the third geographic area 508C may be any physical region. In this regard, in some such embodiments, the third geographic area 508C may be the same region as the first geographic area 608A. In other embodiments, the third geographic area 508C defines a different physical region than the first geographic area 608A. In this regard, the group-based communication server 704 may be configured to communicate with geographic data residency server 604A over one or more network(s) that include network device(s) for connecting such geographic areas. It should be appreciated that the client device 702 may also be located in a particular geographic area, such as the first, second, or third geographic area(s) as illustrated, or a different geographic area (not shown).

The particular data flow illustrated includes steps that may be performed entirely by a single device, or performed via one or more actions executed by a plurality of devices (e.g., a transmitting device and a receiving device). It should be appreciated that, in some embodiments, each step may include one or more sub-steps. Additionally or alternatively, in some embodiments, a step may be performed by another computing device in whole or in part. Optional steps are illustrated in broken lines (or "dashed" lines). It should be appreciated that, in some embodiments, one or more of the optional operations may be performed, or a corresponding computing device may be configured for performance of such optional operation, while in other embodiments, no operations may be performed, or one or more computing devices may not be configured for such performance.

At step 752, the client device 702 transmits a search request to the group-based communication server 704. The search request may include search request data to be used in performing a search and identifying search results data. For example, in an example context, the search request data may include text data for use in analyzing a search to identify search results data. The search request may be received in response to user interaction with one or more interfaces rendered via the client device. For example, the search request may be received in response to user interaction that input and submit the search data for processing by the group-based communication server 704.

In some embodiments, the client device 702 may be associated with a particular authenticated user account. For example, a user of the client device 702 may have, at an earlier time, provided authentication credentials (e.g., a username and password), or otherwise completed an authentication process to grant access to services provided by the group-based communication server 704 during an authenticated session. In this regard, during the authenticated session, the client device 702 may be configured to transmit each request associated with the authenticated user account. In this regard, for example, the received search request may include at least a requestor user account identifier, and/or other information associated with or derived using the requestor user account identifier. In an example context, the search request includes at least an organization identifier with which the authenticated user account is linked.

At step 754, the group-based communication server 704 is configured to transmit a search index retrieval request to the geographic data residency server 604A. The search index retrieval request may be used to cause the geographic data residency server 604A to initiate one or more operations for retrieving a stored search index and/or providing the retrieved search index for processing.

In some embodiments, information associated with the authenticated user account may be identified and/or used by the group-based communication server 704 in transmitting the search index retrieval request. For example, in some embodiments the group-based communication server 704 may identify an entity identifier linked to, included in, or otherwise associated with the authenticated user account. For example, the entity identifier may comprise an organization identifier that uniquely identifies an organization data object under which the authenticated user account was registered. Alternatively, the entity identifier may comprise one or more workspace identifier(s) accessible to the authenticated user account. Alternatively, in yet other embodiments, the entity identifier comprises the authenticated user account identifier itself.

The group-based communication server 704 may utilize the entity identifier, for example the organization identifier in some embodiments, to identify at least one data residency policy data object associated with the search request. In this regard, the data residency policy data object may indicate a physical geographic area where data and/or information associated with the authenticated user account is to be stored. In some embodiments, the user configures the authenticated user account at an earlier time to select the data residency policy data object the user would like to have applied to all or some data transmitted by the group-based communication server 704. Alternatively or additionally, in some embodiments, each entity identifier, such as an organization identifier or workspace identifier, is provisioned by an administrative user associated with the organization data object or group-based workspace. In this regard, for example, all such data linked to a particular organization identifier or workspace identifier may be stored based on the selected data residency policy data object.

In some embodiments, the identified data residency policy data object may be used to identify a computing device from which a stored search index can be retrieved. In some embodiments, the data residency policy data object include or otherwise indicate a particular geographic region where stored message data and/or search index(es) associated with the corresponding entity data object identifier are stored. For example, the data residency policy data object may include a geographic area identifier that represents the geographic area where such data should be stored. The geographic data residency server 604A and/or group-based communication server 704 may be include data and/or information, such as a lookup table, for identifying data used to communicate with a particular computing device in the geographic area represented by the geographic area identifier. In an example embodiment, the geographic data residency server 604A and/or group-based communication server 704 may be configured to utilize a lookup table, or other means, to correlate a geographic area identifier to an IP address or other computing device identifier for a computing device located in the geographic area. Alternatively or additionally, in some embodiments, the data residency policy data object may include data that uniquely enables communication with a particular computing device (e.g., an IP address associated with the computing device in the geographic area, or other identifier that may be used to identify such an IP address or other network identifier for the computing device). As illustrated, for example, the data residency policy data object may be used to identify the geographic data residency server 604A to communicate with for retrieving the search index, and/or data, from the first geographic area 608A.

At step 756, the geographic data residency server 604A is configured to query for a stored search index from the geographic data residency local repository 606A. The geographic data residency server 604A may query the geographic data residency local repository 606A based on entity data object identification information transmitted from the group-based communication server 704. In an example context, for example, the geographic data residency server 604A may identify an organization identifier transmitted from the group-based communication server 704, and utilize such an organization identifier to perform the query.

At step 758, the geographic data residency local repository 606A may retrieve a stored search index and provide the retrieved search index to the geographic data residency server 604A. In some embodiments, the geographic data residency local repository 606A is configured to retrieve the search index in response by executing the query initiated at an earlier step, for example at step 756. The retrieved search index may be provided in response to the executed query.

At optional step 760, the geographic data residency server 604A is configured to decrypt the search index retrieved from the geographic data residency local repository 606A. In some embodiments, the geographic data residency server 604A may identify one or more entity search key(s) for use in decrypting the search index. The geographic data residency server 604A may communicate with one or more key management system to retrieve the entity search key(s), for example by providing one or more entity identifier(s) transmitted to the geographic data residency local server 604A from the group-based communication server 704. Alternatively, in some embodiments, an entity search key set, for example comprising one or more entity search key(s), may be transmitted from the group-based communication server 704 to the geographic data residency server 604A, for example at an earlier step, for use in decrypting the search index. In an example context, the entity search key set comprising one or more entity search key(s) is identified using one or more selected from the group of an authenticated user account identifier, an organization identifier associated with the authenticated user account identifier, and at least one group-based workspace identifier associated with the authenticated user account.

At step 762, the geographic data residency server 604A transmits the search index to the group-based communication server 704. In some embodiments, the geographic data residency server 604A transmits the search index to the group-based communication server 504 in response to an earlier transmitted request, such as in response to the search index retrieval request transmitted at step 754. In some embodiments, the search index is provided to initiate one or more actions by the group-based communications server 504. For example, the geographic data residency server 604A may suspend processing a received search request until the corresponding search index is retrieved, and only proceed to subsequent search request processing steps upon receiving the response from the geographic data residency server 604A.

At step 764, the group-based communication server 704 identifies search results data, in response to the search request, based on the search index. In some embodiments, the group-based communication server 704 identifies search results data based on the search index and an earlier-received search request. For example, in some embodiments, the group-based communication server 704 may identify, parse, or extract search request data from the received search request, and identify search request data from the search index based on the search request data. In an example context, the search index may be used to identify search results data that represents, or identifies, message data objects including or associated with the search request data. For example, the search index may be used to identify a message data object identifier set including all message data object identifiers including or otherwise associated with the search request data. It should be appreciated that, to identify the search results data based on the search index and/or search request data, the group-based communications server 704 may utilize any of a variety of search index result identification algorithms and/or methodologies.

In yet some embodiments, the search index is decrypted by the group-based communication server 704 before being used to identify the search results data. In this regard the group-based communication server 704 may be configured to identify one or more entity search key(s) for use in decrypting the search index received from the geographic data residency server 604A. In some embodiments, the group-based communication server 704 may communicate with a key management system to retrieve an entity search key set, for example using an authenticated user account identifier, associated organization data object identifier, and/or one or more associated group-based workspace identifiers. The data used to identify such an entity search key set may be received at an earlier step, for example included as part of a search request transmitted from the client device at step 752, or derived from information provided at an earlier step.

At step 766, the group-based communication server 704 transmits the search results data to the client device 702. In some embodiments, the search results data is transmitted within a search response data object transmitted to the client device 504. The search results data may include a message data object identifier set, or message data object set, associated with each message data object that includes message data that comprise or is associated with the search request data.

In some embodiments, the response may be configured to cause the client device 702 to perform one or more actions in response to receiving the search results data. In some embodiments, the client device 702 may be caused to render a search results interface comprising the search results data, such that a user of the client device 702 may analyze the message data object(s) including the search request data. In some such embodiments, the search results interface may be configured to receive user interaction representing a selection of one or more message data object(s) (or corresponding identifiers) provided in the search results data. In response to the user interaction representing such a selection, the client device 702 may request retrieval of one or more group-based messages from the group-based communication server 704, and/or other devices of a group-based communication system. In some embodiments, the client device 702 may request one or more group-based messages for a particular group-based communication channel associated with the selected message data, such that the client device 702 may use the group-based messages for rendering a group-based communication interface comprising at least a group-based communication channel interface for viewing the group-based messages stored associated with the group-based communication channel. For example, the group-based communication channel interface may be rendered including the retrieved group-based messages, which may include the group-based message corresponding to the selected message data from the search results data, and/or one or more group-based messages stored temporally located within a time threshold before and/or after the selected group-based message, and stored associated with the same group-based communication channel identifier as the selected group-based message.

It should be appreciated that, in other embodiments, alternative data flows may be performed between a system architecture including one or more other devices not illustrated in FIGS. 6 and 7. Similarly, in other embodiments, alternative data flows may include one or more additional steps, alternative steps, or one or more steps performed in a different order from the steps illustrated with respect to FIGS. 6 and 7. In this regard, it should be appreciated that the particular data flows depicted are for example purposes only, and not to limit the scope and spirit of the disclosure herein.

Example Flowcharts for Search Index Generation by an Example Apparatus

FIGS. 8-13 illustrate flowcharts depicting example operations for search index generation in accordance with embodiments of the present disclosure. Optional blocks are depicted in broken, or "dashed" lines throughout. It should be appreciated that one or more of the depicted blocks may occur in an alternative order, simultaneously, or otherwise execute in an order alternative from the particular order depicted. It should be appreciated that the specific depictions are not to limit the scope and spirit of the disclosure herein.

Figure 8:
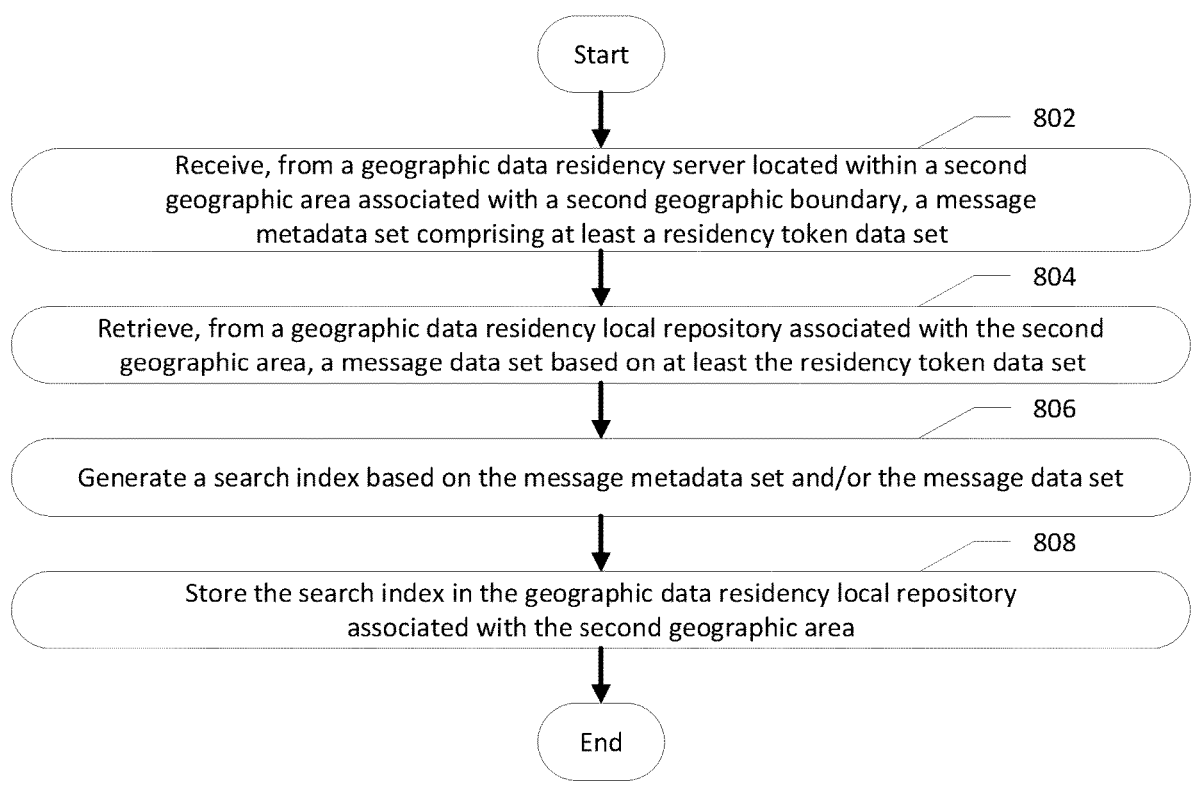

FIG. 8 illustrates example operations performed for search index generation. In some embodiments, the operations are performed by a geographic data residency server, for example embodied by apparatus 200. The apparatus 200 may be physically located in a first geographic area defined by a first geographic boundary.

At block 802, the apparatus 200 includes means, such as local search module 206, search management module 207, communications circuitry 205, processor 202, and/or the like, or a combination thereof, configured to receive a message metadata set comprising at least a residency token data set. In some embodiments, the message metadata set comprising the residency token data set is received from a geographic data residency server located within a second geographic area defined by a second geographic boundary. The message metadata set may be received upon transmission of a new group-based message by an authenticated user account associated with a data residency policy data object that is correlated to the second geographic area. In this regard, the content of the group-based message (for example, message data) is physically stored in a particular geographic area in accordance with the data residency policy data object, while the message metadata set may be stored in one or more other physical geographic areas (for example, the first geographic area) to enable retrieval of the message data stored in another physical area.

In some embodiments, the message metadata set is associated with message data transmitted within a common group-based communication channel associated with two entities managed via different data residency policies. For example, in some embodiments, the apparatus 200 is associated with a first geographic area, such that a first entity is associated with a data residency policy indicating storage of message data within the first geographic area while the second entity is associated with a data residency policy indicating storage of message data within the second geographic area. In a one example context, the first entity may be a first organization managed by a first data residency policy, for example where message data transmitted within the common group-based communication channel by authenticated user accounts linked to the first organization are stored in the first geographic area. Similarly in this example context, the second entity may be a second organization managed by a second data residency policy, for example where message data transmitted within the common group-based communication channel by authenticated user accounts linked to the second organization are stored in the second geographic area. In this regard, the message metadata corresponding to each message may be transmitted to the other geographic area for storing, such that the geographic data residency server in the other geographic area is capable of utilizing such message metadata set to retrieve the message content when generating a search index for the messages associated with at least the common group-based communication channel.

In yet another example, the two entities may be embodied by a first group-based workspace and a second group-based workspace, each associated with the same organization identifier. In this regard, the organization may have assigned data within the first group-based communication workspace to be managed by a first data retention policy and data within the second group-based communication workspace to be managed by a second data retention policy. In a circumstance where the common group-based communication channel is accessible via the first and second group-based workspaces, an administrator user account for the organization may configure the message metadata for the common group-based communication channel to be stored in both regions, such that the messages may be retrieved and/or a search index created for such group-based workspaces in both geographic areas. In this respect, the message metadata for each message to be stored in the first geographic area may be copied to a geographic data residency local repository in the second geographic area, and similarly the message metadata for each message to be stored in the second geographic area may be copied to a geographic data residency local repository in the first geographic area.

At block 804, the apparatus 200 includes means, such as local search module 206, search management module 207, communications circuitry 205, processor 202, and/or the like, or a combination thereof, configured to retrieve, from a geographic data residency local repository associated with the second geographic area, a message data set based on at least the residency token data set. In some embodiments, to retrieve the message data set, the apparatus 200 may be configured to generate and transmit a geographic data residency data retrieval request to the geographic data residency server associated with the second geographic area. The geographic data residency data retrieval request may include at least the residency token data set, and in some embodiments may include one or more other portions of the message metadata set. The geographic data residency data retrieval request may represent a query of the geographic data residency server for the message data set associated with the residency token data set. In this regard, the geographic data residency data retrieval request may cause the geographic data residency server to query the associated geographic data residency repository for such message data set based on the residency token data set and provide (e.g., by transmitting) the corresponding results data to the apparatus 200.

In some embodiments, the apparatus 200 is configured to retrieve data from a geographic data residency local cache where the geographic data residency local cache has stored the data being requested from a previous request. For example, in some embodiments, the apparatus 200 may have retrieved a message data set associated with at least the residency token data set from the geographic data residency local repository at an earlier block, and stored the message data set in a geographic data residency local cache for future retrieval. The geographic data residency local cache may be in the same geographic area as the apparatus 200, and be accessible without utilizing networking resources required for communicating with the geographic data residency local repository in the second geographic area.

At block 806, the apparatus 200 includes means, such as local search module 206, search management module 207, communications circuitry 205, processor 202, and/or the like, or a combination thereof, configured to generate a search index based on one or more selected from the group of the message metadata set and the message data set. In this regard, the search index may embody a data object configured and/or organized to be efficiently searched to identify a group-based message set, or corresponding group-based message identifier set, for group-based messages associated with message data that include particular search request data. It should be appreciated that the search index may be generated using any of a variety of search indexing algorithms and/or methodologies. For example, in some embodiments, the search index comprises a tree structure for linking text data (e.g., words, phrases, or the like) to one or more group-based messages. It should be appreciated that, in some embodiments, a search index may provide further information and/or more detailed information regarding search request data within one or more associated group-based messages. For example, in some embodiments a search index may provide position data regarding the location of particular text data within a group-based message that includes the search request data.

At block 808, the apparatus 200 includes means, such as local search module 206, search management module 207, communications circuitry 205, processor 202, and/or the like, or a combination thereof, configured to store the search index in the geographic data residency local repository associated with the second geographic area. In some embodiments, the apparatus 200 may transmit the search index to the geographic data residency server located within the second geographic area to cause the geographic data residency server to store the search index to the second geographic data residency local repository within the second geographic area. For example, the apparatus 200 may generate and transmit a search index storage request to the geographic data residency server associated with the second geographic area, where the search index storage request comprises the search index for storage to the second geographic area.

Figure 9:
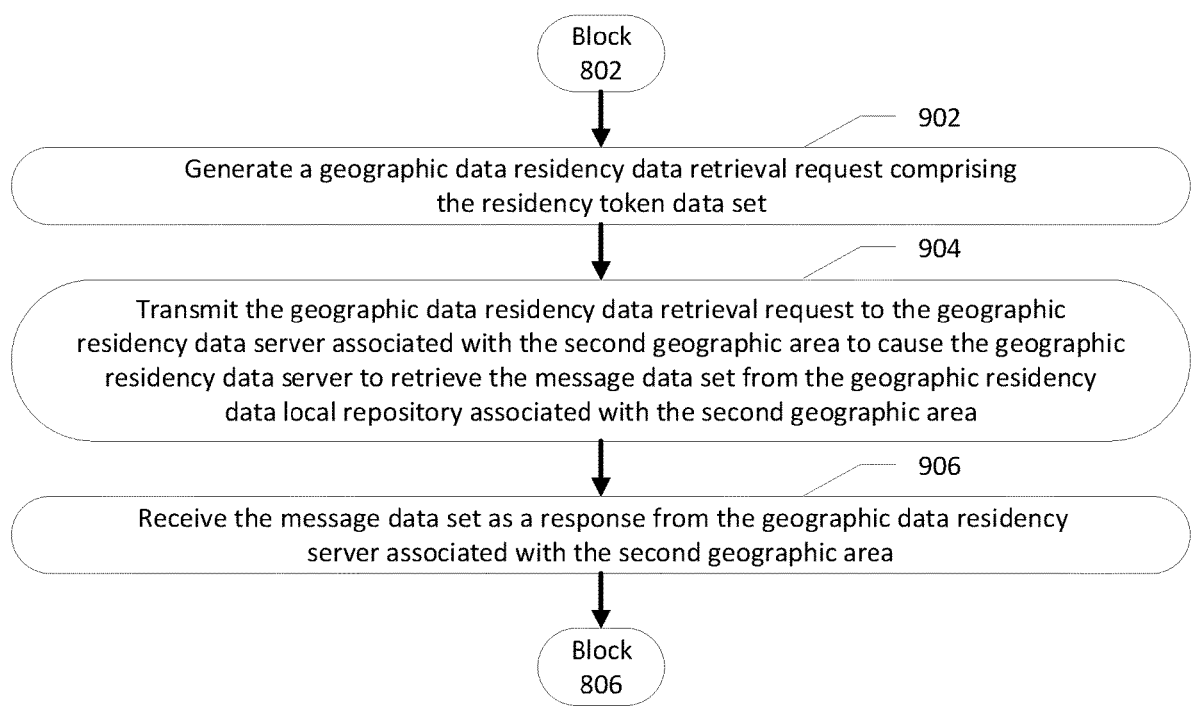

FIG. 9 illustrates example operations performed for search index generation, specifically for retrieving a message data set based on at least a residency token data set from a geographic data residency local repository associated with a second geographic area. In some embodiments, the operations are performed by a geographic data residency server, for example embodied by apparatus 200. The apparatus 200 may be physically located in a first geographic area defined by a first geographic boundary.

At block 902, the apparatus 200 includes means, such as local search module 206, search management module 207, communications circuitry 205, processor 202, and/or the like, or a combination thereof, configured to generate a geographic data residency data retrieval request comprising the residency token data set. The geographic data residency data retrieval request may represent a query for the message data set associated with the residency token data set. In this regard, each residency token data object in the residency token data set may correspond to a particular message row of a geographic data residency local repository physically located in another geographic area, for example the second geographic area. In this regard, each residency token data object may be utilized by a geographic data residency server and/or corresponding geographic data residency local repository to retrieve message data for a group-based message correlated with the residency token data object.

At block 904, the apparatus 200 includes means, such as local search module 206, search management module 207, communications circuitry 205, processor 202, and/or the like, or a combination thereof, configured to transmit the geographic data residency data retrieval request to the geographic data residency server associated with the second geographic area. The geographic data residency data retrieval request may be configured to cause the geographic data residency server to retrieve the message data set from a correlated geographic data residency local repository associated with the second geographic area. In some embodiments, the geographic data residency server and/or geographic data residency local repository may be identified based on at least a portion of the residency token data set. For example, the residency token data set may comprise one or more residency token data objects, each residency token data object including device identification information associated with the geographic data residency server and/or geographic data residency local repository to be used to retrieve the message data correlated to the particular residency token data object. In some such embodiments, upon receiving the request, the geographic data residency server may retrieve the message data set by querying the geographic data residency local repository based on the residency token data set.

At block 906, the apparatus 200 includes means, such as local search module 206, search management module 207, communications circuitry 205, processor 202, and/or the like, or a combination thereof, configured to receive the message data set as a response from the geographic data residency server associated with the second geographic area. In some embodiments, the message data set comprises content for one or more associated group-based messages. The message data set may be provided for use in generating one or more search indexes associated with various entity data objects and/or geographic areas. For example, in some such embodiments, the residency token data set comprises residency token data object(s) associated with a particular entity data object identifier, such that the message data set includes message data object(s) for all group-based messages associated with the particular entity data object identifier. In this regard, the message data set may be used to generate a search index particularly associated with the entity data object identifier.

Figure 10:
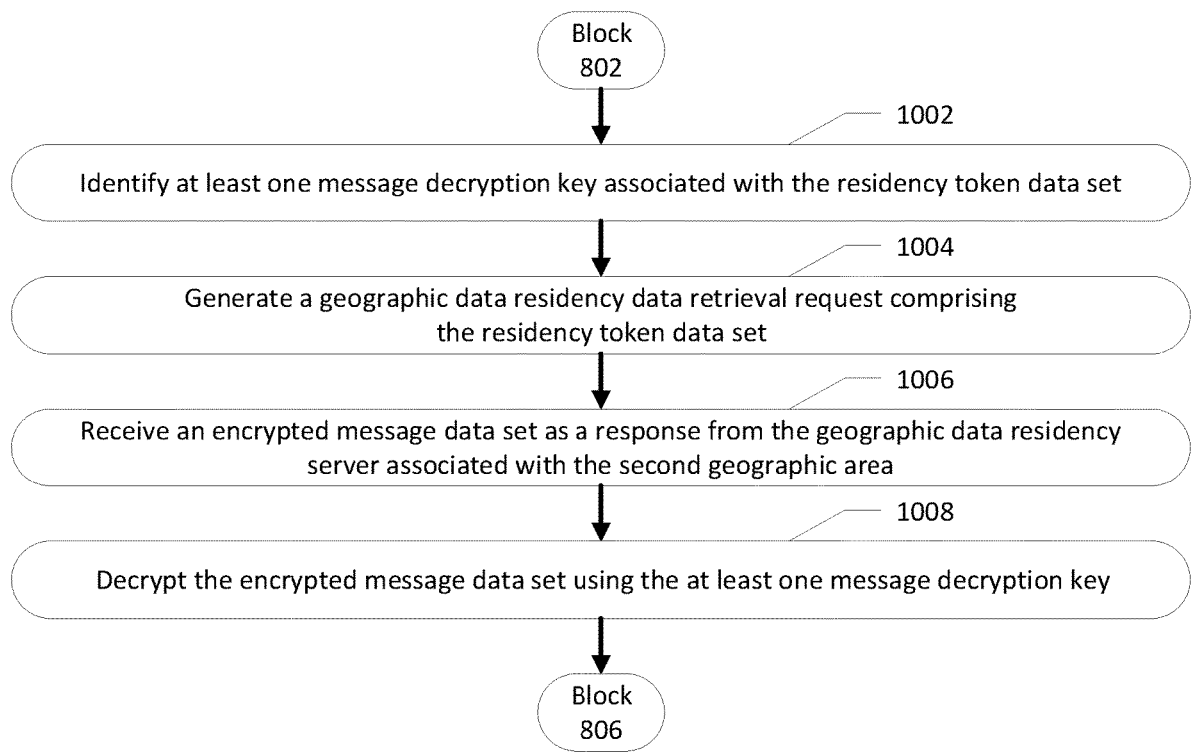

FIG. 10 illustrates an example operations performed for search index generation, specifically for retrieving a message data set in an encrypted environment. In some embodiments, the operations are performed by a geographic data residency server, for example embodied by apparatus 200. The apparatus 200 may be physically located in a first geographic area defined by a first geographic boundary.

At block 1002, the apparatus 200 includes means, such as local search module 206, search management module 207, communications circuitry 205, processor 202, and/or the like, or a combination thereof, configured to identify at least one message decryption key associated with the residency token data set. In some embodiments, the apparatus 200 is configured to communicate with a key management system that is configured to store at least message decryption keys in a secure environment within the same geographic area as the apparatus 200. In some embodiments, the key management system may store message decryption keys associated with one or more entity data object identifier(s). In some embodiments, for example, the residency token data set is associated with a particular entity data object identifier, and the at least one message decryption key may be similarly associated with the particular entity data object identifier. In this regard, the one or more message decryption keys may be utilized to decrypt encrypted message data object(s) that are associated with the corresponding entity data object identifier. In some embodiments, one or more message decryption key(s) similarly functions as an encryption key for encrypting message data objects. In other embodiments, a different message encryption key is paired to one or more message decryption key(s) to enable encryption of message data object(s).

At block 1004, the apparatus 200 includes means, such as local search module 206, search management module 207, communications circuitry 205, processor 202, and/or the like, or a combination thereof, configured to generate a geographic data residency data retrieval request comprising the residency token data set. The geographic data residency data retrieval request may represent a query for the message data set associated with the residency token data set. In this regard, each residency token data object in the residency token data set may correspond to a particular message row of a geographic data residency local repository physically located in another geographic area, for example the second geographic area. In this regard, each residency token data object may be utilized by a geographic data residency server and/or corresponding geographic data residency local repository to retrieve message data for a group-based message correlated with the residency token data object. In some embodiments, the geographic data residency data retrieval request additionally comprises the at least one message decryption key for use by the geographic data residency server and/or geographic data residency local repository.

At block 1006, the apparatus 200 includes means, such as local search module 206, search management module 207, communications circuitry 205, processor 202, and/or the like, or a combination thereof, configured to transmit the geographic data residency data retrieval request to the geographic data residency server associated with the second geographic area. The geographic data residency data retrieval request may be configured to cause the geographic data residency server to retrieve encrypted message data set from a correlated geographic data residency local repository associated with the second geographic area. In some embodiments, the geographic data residency server and/or geographic data residency local repository may be identified based on at least a portion of the residency token data set. For example, the residency token data set may comprise one or more residency token data objects, each residency token data object including device identification information associated with the geographic data residency server and/or geographic data residency local repository to be used to retrieve the message data correlated to the particular residency token data object. In some such embodiments, upon receiving the request, the geographic data residency server may retrieve the encrypted message data set by querying the geographic data residency local repository based on the residency token data set. For example, each encrypted message data object may be stored as a message row in the geographic data residency local repository, each message row corresponding to a particular residency token data object of the residency token data set.

In some embodiments where the geographic data residency data retrieval request additionally comprises the at least one message decryption key, the geographic data residency server and/or geographic data residency local repository may utilize the at least one message decryption key to retrieve the message data set. For example, in some embodiments, the geographic data residency local repository may utilize the at least one message decryption key to retrieve message data and/or decrypt an encrypted message data set. In some such embodiments, the geographic data residency local repository is configured to utilize the at least one message decryption key to retrieve the message data set, and/or decrypt retrieved encrypted data. Alternatively, in some embodiments, the geographic data residency server is configured to utilize the at least one message decryption key to decrypt the message data set retrieved from a corresponding geographic data residency local repository.

In some embodiments, the apparatus 200 is configured to retrieve the encrypted data from a geographic data residency local cache where the geographic data residency local cache has stored the encrypted data in response to a previously completed request. For example, in some embodiments, the apparatus 200 may have retrieved the encrypted message data set from the geographic data residency local repository at an earlier block, and stored the encrypted message data set in a geographic data residency local cache for future retrieval. The geographic data residency local cache may be in the same geographic area as the apparatus 200, and be accessible without utilizing networking resources required for communicating with the geographic data residency local repository in the second geographic area.

At block 1008, the apparatus 200 includes means, such as local search module 206, search management module 207, communications circuitry 205, processor 202, and/or the like, or a combination thereof, configured to decrypt the encrypted message data set using the at least one message decryption key. The encrypted message data set may be decrypted to identify the message data set. In some such embodiments, encrypting the message data may improve overall system security by preventing decrypting of the encrypted message data by other servers and/or unauthorized computing devices that do not have access to the message decryption key. Further, in some embodiments, an authenticated user account may manage one or more message decryption keys associated with one or more entity data objects for which the authenticated user account is an administrator. In this regard, a user may, via an authenticated user account, revoke access to a particular message decryption key and/or delete a message decryption key to prevent accessing the corresponding encrypted message data.

Figure 11:
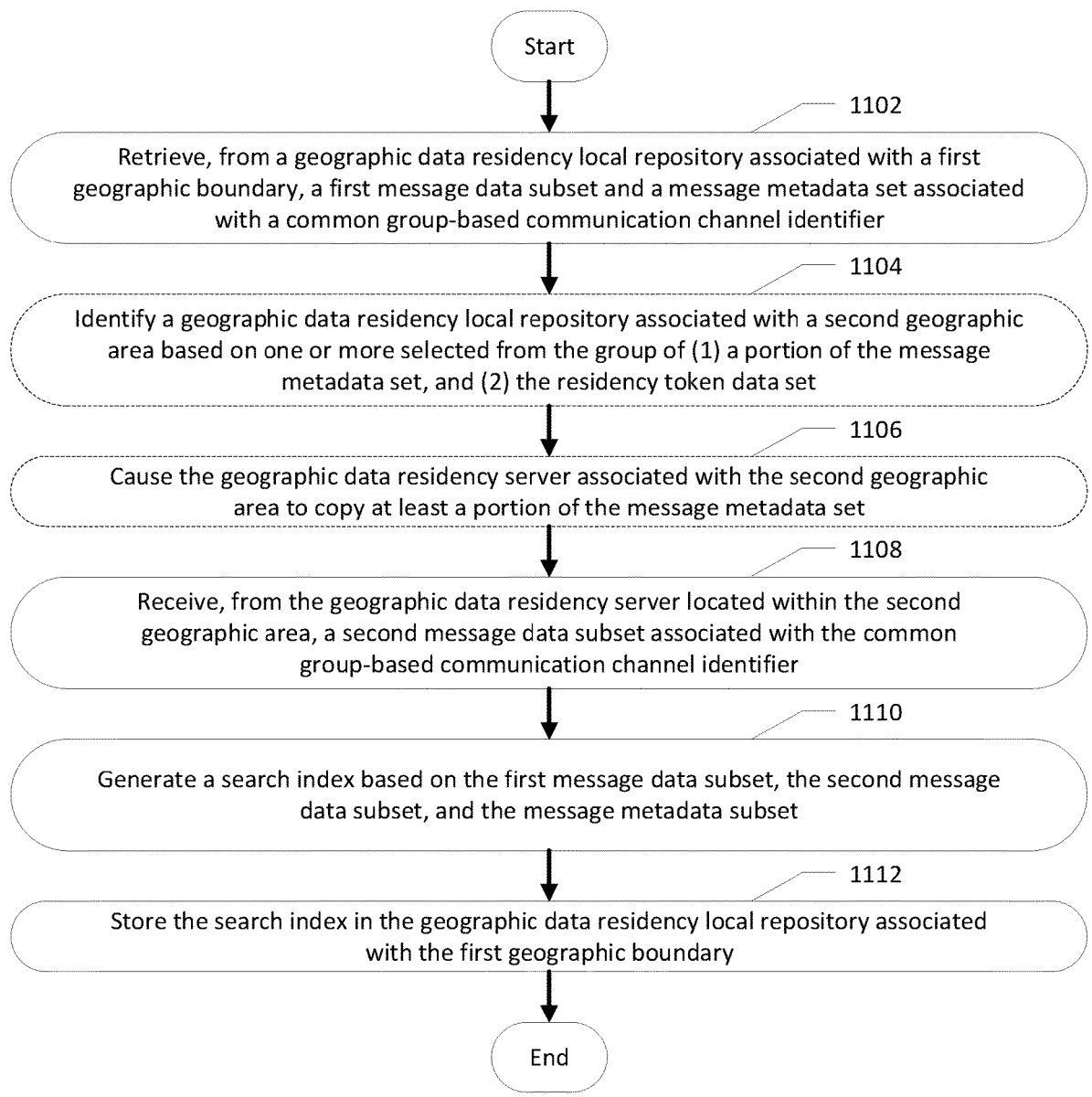

FIG. 11 illustrates an example operations performed for search index generation, specifically for generating a search index for group-based messages associated with at least a common group-based communication channel identifier. In some embodiments, the operations are performed by a geographic data residency server, for example embodied by apparatus 200. The apparatus 200 may be physically located in a first geographic area defined by a first geographic boundary.

At block 1102, the apparatus 200 includes means, such as local search module 206, search management module 207, communications circuitry 205, processor 202, and/or the like, or a combination thereof, to retrieve, from a geographic data residency local repository associated with a first geographic boundary, a first message data subset and a message metadata set associated with a common group-based communication channel identifier. In this regard, the first message data subset may comprise message data for group-based messages stored within a geographic data residency repository located the first area. The message metadata set may identify one or more group-based messages having message data stored by one or more computing device(s) physically located in another geographic area, for example a geographic data residency local repository within a particular second geographic area. The message metadata set may, additionally or alternatively, include a residency token data set for user in retrieving a corresponding first message data subset.

In some such embodiments, the message metadata set includes a data residency token data object for each group-based message having stored message data associated with the common group-based communication channel identifier. The common group-based channel identifier may be associated with a plurality of entity data objects (e.g., two or more organization data objects). In this regard, a portion of the group-based messages may be associated with a first data residency policy data object, a second portion of the group-based messages may be associated with a second data residency policy data object. At least one of the data residency policy data object(s) may be associated with storage of message data in the first geographic area, and the second may be associated with storage of message data in a second geographic area. The residency token data set may query the geographic data residency local repository associated with the first geographic boundary for all message rows associated with the common group-based communication channel identifier, and parse the message rows into the first message data subset (e.g., for message rows that do not include a residency token data set), and a message metadata set (e.g., including at least a residency token data object for each message row that includes a residency token data object).

At optional block 1104, the apparatus 200 includes means, such as local search module 206, search management module 207, communications circuitry 205, processor 202, and/or the like, or a combination thereof, configured to identify a geographic data residency server associated with a second geographic area based on at least a portion of the message metadata set. In some embodiments, the geographic data residency server is identified using one or more from the group of (1) the residency token data set and (2) a second portion of the message metadata set. In one example context, the residency token data set includes residency token data object(s) that each include information identifying a device to be communicated with for retrieving the message data set. For example, one or more residency token data object(s) may include at least an IP address or other identifier that may be used to communicate with, or used to derive other information that may be used to communicate with, the geographic data residency server and/or a corresponding geographic data residency local repository. In another example context, a geographic data residency server is identified based on an entity data object identifier included in the message metadata set.

At optional block 1106, the apparatus 200 includes means, such as local search module 206, search management module 207, communications circuitry 205, processor 202, and/or the like, or a combination thereof, configured to cause the geographic data residency server associated with the second geographic area to copy at least a portion of the message metadata set. For example, in some embodiments, the geographic data residency server may copy at least group-based message identification information to the geographic data residency local repository associated with the second geographic area, such that the copied metadata may be used for identifying which message data corresponds to a particular group-based message row. In some embodiments, the geographic data residency server is caused to copy at least the portion of the message metadata set for use in identifying search results data based on a search index (e.g., such that the message data associated with the portion of the message metadata set may be retrieved, either locally or from another geographic data residency server). Additionally or alternatively, in some embodiments, the geographic data residency server is caused to copy at least a portion of the message metadata set for storage to a geographic data residency local cache, such that the geographic data residency server may retrieve the message metadata set without communication back with the apparatus 200.

At block 1108, the apparatus 200 includes means, such as local search module 206, search management module 207, communications circuitry 205, processor 202, and/or the like, or a combination thereof, configured to receive from the geographic data residency server located within the second geographic area a second message data subset associated with the common group-based communication channel identifier. In some embodiments, the apparatus 200 is configured to communicate with the geographic data residency server located within the second geographic area to retrieve the second message data subset based on a residency token data set included in the retrieved message metadata set. The residency token data set may include one or more residency token data objects each associated with message data for a group-based message that is associated with the common group-based communication channel identifier. For example, the second message data subset may include group-based messages transmitted associated with a second organization data object identifier, where the second organization data object identifier is associated with a data residency policy data object that is configured for storing group-based messages associated with authenticated user accounts of the organization data object in the second geographic area.

In this regard, the apparatus 200 may generate and transmit a geographic data residency data retrieval request comprising at least the residency token data set and, additionally in some embodiments, the common group-based communication channel identifier. The geographic data residency data retrieval request may represent a query for the second message data set based on the residency token data set. The message retrieval set may be configured to cause the geographic data residency server located in the second geographic area to retrieve the second message data subset from a second geographic data residency local repository associated with the second geographic area. For example, the geographic data residency data retrieval request may cause the geographic data residency server located in the second geographic area to initiate one or more queries to the second geographic data residency local repository for retrieving the second message data set. The geographic data residency server may then provide the retrieved second message data subset to the apparatus 200, for example as response data to the transmitted geographic data residency data retrieval request.

In some embodiments, the apparatus 200 is configured to retrieve the second message data subset from a geographic data residency local cache where the geographic data residency local cache has stored the second message data subset in response to a previously completed request. For example, in some embodiments, the apparatus 200 may have retrieved the second message data subset from the geographic data residency local repository at an earlier block, and stored the second message data subset in a geographic data residency local cache for future retrieval. The geographic data residency local cache may be in the same geographic area as the apparatus 200, and be accessible without utilizing networking resources required for communicating with the geographic data residency local repository in the second geographic area.

At block 1110, the apparatus 200 includes means, such as local search module 206, search management module 207, communications circuitry 205, processor 202, and/or the like, or a combination thereof, configured to generate a search index based on the first message data subset, the second message data subset, and the message metadata subset. In this regard, the search index may embody a data object configured and/or organized to be efficiently searched to identify a group-based message set, or corresponding group-based message identifier set, for group-based messages associated with message data, from the first or second message data subset, that includes particular search request data. It should be appreciated that the search index may be generated using any of a variety of search indexing algorithms and/or methodologies. For example, in some embodiments, the search index comprises a tree structure for linking text data (e.g., words, phrases, or the like) to one or more group-based messages. It should be appreciated that, in some embodiments, a search index may provide further information and/or more detailed information regarding search request data within one or more associated group-based messages. For example, in some embodiments a search index may provide position data regarding the location of particular text data within a group-based message that includes the search request data. Instances of particular message data may be stored associated with a message data object identifier from the message metadata subset, and/or a residency token data object, that may be used to retrieve all information required for reconstructing and providing a group-based message identified in search results data.

At block 1112, the apparatus 200 includes means, such as local search module 206, search management module 207, communications circuitry 205, processor 202, and/or the like, or a combination thereof, configured to store the search index in the geographic data residency local repository associated with the first geographic area. In some embodiments, the apparatus 200 transmits the newly generated search index to the geographic data residency local repository for storing. In some embodiments, the apparatus 200 is configured to store the search index in the geographic data residency local repository associated with the first geographic boundary such that the search index is retrievable based on at least a portion of the information from the message metadata set. For example, in some embodiments, the newly generated search index is stored associated with a particular entity data object identifier. In this regard, searches may be performed using search indices each associated with a particular entity data object. In an example context, for example, a search index may be generated associated with an organization data object identifier, such that the search index may be retrieved and utilized to process a search request associated with the particular organization data object identifier. In this regard, such searches may identify group-based messages associated with the organization data object identifier (e.g., sent or received by an authenticated user account associated with the organization data object identifier, stored associated with a group-based communication channel and/or common group-based communication channel associated with the organization data object identifier, sent within a group-based workspace associated with the organization data object identifier, and/or the like).

FIG. 12 illustrates example operations performed for search index generation, specifically for retrieving a second message data subset, from a geographic data residency local repository associated with a second geographic area, based on at least a residency token data set. In some embodiments, the operations are performed by a geographic data residency server, for example embodied by apparatus 200. The apparatus 200 may be physically located in a first geographic area defined by a first geographic boundary.

At block 1202, the apparatus 200 includes means, such as local search module 206, search management module 207, communications circuitry 205, processor 202, and/or the like, or a combination thereof, configured to transmit at least a residency token data set to the geographic data residency server located within the second geographic area to retrieve the second message data subset. In some embodiments, the residency token data set is parsed, extracted, or otherwise identified from a previously received message metadata set. In some embodiments, the apparatus 200 is configured to generate a geographic data residency data retrieval request comprising the residency token data set and transmit the geographic data residency data retrieval request to the geographic data residency server located within the second geographic area to cause the geographic data residency server to retrieve the second message data subset from a correlated geographic data residency local repository. For example, the apparatus 200 may cause the geographic data residency server to initiate and/or otherwise execute a query of the message data stored in a correlated geographic data residency local repository located within the second geographic area based on the residency token data set included in the geographic data residency data retrieval request.

At block 1204, the apparatus 200 includes means, such as local search module 206, search management module 207, communications circuitry 205, processor 202, and/or the like, or a combination thereof, configured to receive the second message data subset from the geographic data residency server within the second geographic area in response to the transmission. In some embodiments, the second message data subset comprises message content for one or more associated group-based messages. The second message data subset may be provided for use in generating one or more search indexes associated with a plurality of entity data objects and/or associated geographic areas. For example, in some such embodiments, the second message data subset includes message data for group-based messages transmitted by authenticated user accounts associated with a particular second entity data object identifier, such as a second organization data object identifier. The second message data subset may be used to generate a search index particularly associated with a different entity data object identifier in communication with the second entity data object identifier within a common group-based communication channel.

The transmission may occur over one or more communication networks. In some embodiments, one or more communication networks includes a plurality of network sub-devices for propagating the transmission across a large distance (e.g., between countries across the world). In some embodiments, the communication networks enable communication directly between the apparatus 200 and one or more geographic data residency server(s) located in distinct geographic areas. Alternatively or additionally, the communication networks may enable communication indirectly between the apparatus 200 and the geographic data residency server to access one or more geographic data residency local repositories located in distinct geographic areas. In some such embodiments, the apparatus 200 may be configured such that direct manipulation of a geographic data residency local repository by a geographic data residency server from a different geographic area is not performable. By doing so, overall system security and/or user privacy may be enhanced by ensuring that data residency requirements in accordance with one or more geographic data residency policy data object(s) are maintained.

FIG. 13 illustrates example operations performed for search index generation, specifically for retrieving a message data subset associated with a common group-based communication channel identifier in an encrypted environment. In some embodiments, the operations are performed by a geographic data residency server, for example embodied by apparatus 200. The apparatus 200 may be physically located in a first geographic area defined by a first geographic boundary. In other embodiments, the operations are performed by a group-based communication server, such as a group-based communication server embodied by the apparatus 200. The apparatus 200 may similarly be physically located in a first geographic area defined by a first geographic boundary.

At block 1302, the apparatus 200 includes means, such as local search module 206, search management module 207, communications circuitry 205, processor 202, and/or the like, or a combination thereof, configured to identify at least one message decryption key for an entity data object identifier associated with the at least one common group-based communication channel identifier. In some embodiments, the apparatus 200 is configured to communicate with a key management system that is configured to store at least message decryption keys in a secure environment within the same geographic area as the apparatus 200. In some embodiments, the key management system may store message decryption keys associated with one or more entity data object identifier(s) and/or residency token data object(s). In some such embodiments, the apparatus 200 identifies one or more message decryption keys from the key management system by querying for message decryption key(s) stored associated with an entity data object identifier associated with each residency token data object in the residency token data set. In this regard, the retrieved message decryption key set, including zero or more message decryption key(s), may be used to decrypt a set of encrypted message data stored to a geographic data residency local repository that may be located in a second geographic area.

At block 1304, the apparatus 200 includes means, such as local search module 206, search management module 207, communications circuitry 205, processor 202, and/or the like, or a combination thereof, configured to transmit at least the residency token data set to the geographic data residency server within the second geographic area to cause the geographic data residency server within the second geographic area to retrieve a second encrypted message data subset from a second local geographic data residency repository. In some embodiments, the second geographic data residency local repository is also located with the second geographic area. In some embodiments, the apparatus 200 is configured to generate a geographic data residency data retrieval request comprising the residency token data set, which is then transmitted to the geographic data residency server. The geographic data residency data retrieval request may represent a query for the encrypted message data set associated with the residency token data set. For example, each residency token data set may include information that uniquely corresponds to a particular message row of the geographic data residency local repository within the second geographic area.

At block 1306, the apparatus 200 includes means, such as local search module 206, search management module 207, communications circuitry 205, processor 202, and/or the like, or a combination thereof, configured to receive the second encrypted metadata subset from the geographic data residency server within the second geographic area in response to the previous transmission. In some such embodiments, the transmission of the residency token data set, for example within a geographic data residency data retrieval request, may cause the geographic data residency server within the second geographic area to initiate the correlated geographic data residency local repository to execute a query for the encrypted message data subset based on the received residency token data set. For example, in some such embodiments, each residency token data object in the set may be associated with a particular message row to be returned as result data by the query.

At block 1308, the apparatus 200 includes means, such as local search module 206, search management module 207, communications circuitry 205, processor 202, and/or the like, or a combination thereof, configured to decrypt the second encrypted message data subset using the at least one message decryption key. The second encrypted message data subset may be decrypted to identify the second message data subset for use in generating a corresponding search index. By decrypting the second message data subset, the first and second message data subset may be combined to form a complete message data set associated with one or more particular entity data object(s) communicating via a common group-based communication channel. In this regard, the message data for each entity data object may be stored in accordance with the data residency policy associated with each entity data object to enhance data privacy as desired by a particular group of users. Further, encrypting the second message data subset improves system security and data privacy associated with group-based messages transmitted within a common group-based communication channel. For example, in this regard, if the access to a group-based message should be removed, or otherwise access to a group-based message becomes no longer available, access to a particular message decryption key enables revocation of access to the group-based message without subsequent alterations to the storage of the group-based message, or particular to associated message data, itself. By revoking such access to one or more message decryption keys, or deleting the keys, the message data may become inaccessible to one or more other authenticated user accounts (e.g., authenticated user accounts associated with an organization data object identifier for which access was revoked) and no new search indices may be created based on the corresponding message data.

It should be appreciated that, in other embodiments, the blocks depicted herein may include additional and/or alternative blocks, or a different orientation of one or more of the blocks depicted. Additionally or alternatively, in some embodiments, the operations described with respect to two or more flows may be combined to form a single flow. In this regard, it should be understood that the specific flows and operations depicted with respect to FIGS. 6-11 are not to limit the scope and spirit of the disclosure herein.

Example Flowcharts for Search Index Utilization by an Example Apparatus

FIGS. 14 and 15 illustrate flowcharts depicting example operations for search index utilization in accordance with embodiments of the present disclosure. Optional blocks are depicted in broken, or "dashed" lines throughout. It should be appreciated that one or more of the depicted blocks may occur in an alternative order, simultaneously, or otherwise execute in an order alternative from the particular order depicted. It should be appreciated that the specific depictions are not to limit the scope and spirit of the disclosure herein.

FIG. 14 illustrates example operations performed for search index utilization. In some embodiments, the operations are performed by a geographic data residency server, for example embodied by apparatus 200. The apparatus 200 may be physically located in a first geographic area defined by a first geographic boundary.

At block 1402, the apparatus 200 includes means, such as local search module 206, search management module 207, communications circuitry 205, processor 202, and/or the like, or a combination thereof, configured to receive, from a requestor system, search request associated with a searching entity identifier. In some embodiments, the requestor system is embodied by a client device, for example accessed by a user associated with an authenticated user account during an authenticated session. In other embodiments, the requestor system is embodied by a group-based communication server, for example a group-based communication server configured for forwarding a search request received from a client device to the appropriate computing device for processing. In yet other embodiments, the requestor device is embodied by a geographic data residency server configured to transmit the search request for processing.

The search request may be originated by a user associated with an authenticated user account that accesses the group-based communication system via a client device, for example during an authenticated session. In some such embodiments, the search request may include a user account identifier associated with the authenticated user account used to access the group-based communication system. In some such embodiments, the authenticated user account identifier may be used to identify an associated searching entity identifier. The searching entity identifier may comprise, or otherwise be associated with, a particular organization data object identifier linked to a particular geographic data residency policy data object. Additionally or alternatively, in some embodiments, the search request may include a searching entity identifier associated with the entity data object for which the search was initiated.

In some embodiments, the searching entity identifier comprises an organization data object identifier that is determined by the apparatus 200 as associated with the search request. For example, the organization data object identifier may be linked to the authenticated user account data object that initiated the search request, for example, where the user is a member of the organization. In some such embodiments, for example, the organization data object identifier may be used to search all group-based messages associated with the organization data object identifier. In another context, the searching entity identifier comprises a group-based workspace identifier. In some such embodiments, the group-based workspace identifier may be input and/or selected by a user that originated the search request. In this regard, in some embodiments for example, the user may select to search only for search results data that are associated with the particular group-based workspace identifier (e.g., group-based messages transmitted within group-based communication channels associated with the corresponding group-based workspace identifier, such that group-based messages were transmitted within the group-based workspace). The group-based workspace identifier may be associated with a particular organization data object identifier, such that the group-based workspace identifier may be used to search group-based messages particularly associated with the organization data object identifier and located within the group-based workspace identified by the group-based workspace identifier. In yet another context, the searching entity identifier comprises an authenticated user account identifier. The apparatus 200 may be configured to automatically determine the authenticated user account identifier associated with a search request, for example based on the authenticated session for a client device used to originate and/or transmit the search request. In some embodiments, the search request includes the authenticated user account identifier, or data that may be used to identify the authenticated user account identifier. The authenticated user account identifier may be associated with a data residency policy data object that indicates a geographic area where message data associated with the authenticated user account identifier (e.g., authored by the authenticated user account identifier and/or, in other embodiments, received by the authenticated user account identifier) is to be stored. Additionally or alternatively, in some embodiments, the authenticated user account identifier is associated with a particular organization data object identifier (e.g., where the authenticated user account is a member of the organization data object), such that the authenticated user account identifier may be used to perform searches for group-based messages particularly associated with the organization data object identifier.

At optional block 1404, the apparatus 200 includes means, such as local search module 206, search management module 207, communications circuitry 205, processor 202, and/or the like, or a combination thereof, configured to retrieve an entity search key based on the searching entity identifier. In some embodiments, the apparatus 200 is configured to retrieve the entity search key from a key management system physically located within the first geographic area. In some such embodiments, the key management system may be configured for storing at least entity search key(s). In other embodiments, the key management system is configured for storing at least entity search key(s) and message decryption key(s). In an example context, the key management system may generate and/or store an entity search key linked to each searching entity identifier, where the entity search key may be utilized to decrypt a search index associated with the searching entity identifier.

In an example embodiment, an entity search key is stored associated with each organization data object identifier. Similarly, a search index may be generated and stored associated with the organization data object identifier, for example using one or more of the search index generation processes described herein. The search index may be configured for efficiently searching a corpus of message data associated with group-based messages linked to the organization data object identifier. The search index may be encrypted before storage, for example using the entity search key or a corresponding entity search encryption key cryptographically paired with the entity search key to enable encryption and decryption. It should be appreciated that the entity search key may be designed and/or configured for encryption and/or decryption using a myriad of cryptographic key management methodologies.

At block 1406, the apparatus 200 includes means, such as local search module 206, search management module 207, communications circuitry 205, processor 202, and/or the like, or a combination thereof, configured to retrieve, from a geographic data residency local repository associated with the first geographic area, a search index associated with the searching entity identifier. For example, in some embodiments, the apparatus 200 is configured to query, or initiate querying of, the geographic data residency local repository based on the searching entity identifier. In some such embodiments, the search index retrieved may represent the most recently generated search index associated with a particular searching entity identifier.

In some embodiments, an encrypted search index is retrieved from the geographic data residency local repository. In some such embodiments, the apparatus 200 includes means, such as local search module 206, search management module 207, communications circuitry 205, processor 202, and/or the like, or a combination thereof, configured to decrypt the encrypted search index using the entity search key to identify the search index. In this regard, access to the search index may be controlled and protected against accidental exposure. For example, in the case of a data breach of only the encrypted search index, such an encrypted search index remains unusable without access to the corresponding entity search key.

In some embodiments, the apparatus 200 is configured to retrieve the search index from a geographic data residency local cache where the geographic data residency local cache has stored the search index in response to a previously completed request. For example, in some embodiments, the apparatus 200 may have retrieved the search index from the geographic data residency local repository at an earlier block, and stored the search index (or an encrypted form) in a geographic data residency local cache for future retrieval. The geographic data residency local cache may be in the same geographic area as the apparatus 200, and be accessible without utilizing networking resources required for communicating with the geographic data residency local repository in the second geographic area.

At block 1408, the apparatus 200 includes means, such as local search module 206, search management module 207, communications circuitry 205, processor 202, and/or the like, or a combination thereof, configured to identify search results data based on the search index. The search results data may be identified from the search index based on search request data included in the search request. For example, the search request data may comprise text data to be searched for within message data of various group-based messages. Alternatively or additionally, the search request data may include file data to be searched for associated with various file data objects accessible to the apparatus 200. In some such embodiments, the search results data may be identified based on the search index and/or search request data using any of a myriad of search index traversal algorithms and/or methodologies. For example, in some embodiments, a tree-traversal algorithm may be applied to identify the search results data from the search index.

The search results data may comprise a message metadata set and/or message data set associated with group-based messages that are associated with the search request. For example, the search results data may comprise data associated with group-based messages having message data that contains the search request data. In some embodiments, the search results data may include a message metadata set comprising at least a residency token data set associated with one or more group-based messages linked identified as associated with the search request.

At block 1410, the apparatus 200 includes means, such as local search module 206, search management module 207, communications circuitry 205, processor 202, and/or the like, or a combination thereof, configured to provide the search results data to the requestor system. In some embodiments, the search results data is provided in response to the received search request. The search results data may be provided to the requestor system over one or more communication networks that may be connected between two or more geographic areas, for example over the Internet.

The search results data may be configured to cause the requestor system to perform one or more actions in response to receiving the search results data. For example, in some embodiments, the requestor system is configured to render one or more interfaces comprising the search results data for viewing by a user associated with the requestor system. Alternatively, the requestor system may forward the search results data to another device, for example a client device, for rendering. It should be appreciated that the search results data may be rendered, for example by the requestor system and/or an associated client device, to receive user interaction by a user. For example, in some embodiments, an interface may be rendered that includes the search results data for a selection by the user to view the message data associated with the selected group-based message, and/or to render a corresponding group-based communication channel interface for viewing the group-based message.

In some embodiments, it should be appreciated that a search index may be generated based on the combination of two or more search indices. For example, in the context of a common group-based communication channel, each group-based message may be associated with one or more organization data objects, each associated with a data residency policy data object indicating a geographic region where a portion of a group-based message (e.g., message data) is to be stored. Each organization data object may be associated with message data storage in various different areas based on each corresponding data residency policy data object, for example message data associated with a first organization data object is stored in a first geographic area, a message data associated with a second organization data object is stored in a second geographic area, and so on. In some embodiments, in such a context, each organization data object may be associated with a search index stored in a geographic data residency local repository physically within each of the geographic areas. The apparatus 200 may retrieve a search index set comprising such search indexes, the search index set retrieved by retrieving each sub-search index within the set from a geographic data residency local repository associated with a different geographic region. The search index set may then be combined to generate a complete search index that may then be used to identify the search results data. In this regard, the apparatus 200 maintains compliance with data residency requirements represented by each data residency policy data object, yet continues to enable search functionality associated with such message data.

FIG. 15 illustrates other example operations performed for search index utilization, specifically for utilizing a search index to identify and provide message data in an encrypted environment. In some embodiments, the operations are performed by a geographic data residency server, for example embodied by apparatus 200. The apparatus 200 may be physically located in a first geographic area defined by a first geographic boundary.

At block 1502, the apparatus 200 includes means, such as local search module 206, search management module 207, communications circuitry 205, processor 202, and/or the like, or a combination thereof, configured to identify, based on the search index and the search request, a residency token data set associated with search results data. In this regard, the search index may be linked to residency token data set stored by a geographic data residency local repository within the geographic area of the apparatus 200. The residency token data set may be used to retrieve a corresponding message data set maintained by one or more other system within another geographic area.

At block 1504, the apparatus 200 includes means, such as local search module 206, search management module 207, communications circuitry 205, processor 202, and/or the like, or a combination thereof, configured to retrieve, from a geographic data residency server associated with the second geographic area, search results comprising a message data set based on at least the residency token data set. For example, in some embodiments, the apparatus 200 may be configured to generate and/or transmit a geographic data residency data retrieval request to the geographic data residency server, where the geographic data residency data retrieval request is configured to cause the geographic data residency server to retrieve the message data set from a second geographic data residency server associated with the second geographic area, and provide the message data set as a response to the apparatus 200. In some such embodiments, the geographic data residency data retrieval request may comprise the residency token data set. Additionally or alternatively, in some embodiments, the geographic data residency server may be identified using the residency token data set, or a portion thereof.

At optional block 1506, the apparatus 200 includes means, such as local search module 206, search management module 207, communications circuitry 205, processor 202, and/or the like, or a combination thereof, configured to identify at least one message decryption key associated with the residency token data set. For example, the at least one message decryption key may form a message decryption key set. The message decryption key(s) may, in some embodiments, be associated with the residency token data set. Additionally or alternatively, in some embodiments, the message decryption key(s) may be identified based on the searching entity identifier, and/or associated data. For example, in some embodiments, the at least one message decryption key may be stored associated with an authenticated user account identifier, such that the at least one message decryption key may be used to decrypt data associated with the authenticated user account identifier, or may be stored associated with an organization data object identifier, such that the at least one message decryption key may be used to decrypt data associated with the authenticated user account identifier. In some embodiments, the apparatus 200 may include, or communicate with, a key management system that stores the message decryption keys in a secure environment. The apparatus may query the key management system based on the residency token data set, and/or associated data (e.g., an entity data object identifier such as an organization data object identifier) to retrieve the one or more message decryption keys.

At optional block 1508, the apparatus 200 includes means, such as local search module 206, search management module 207, communications circuitry 205, processor 202, and/or the like, or a combination thereof, configured to decrypt the message data set based on the at least one message decryption key. In some such embodiments, a single message decryption key may be utilized to decrypt the entirety of the message data set. In other embodiments, a single message decryption key may be utilized to decrypt one or more message data objects, comprising a portion of the message data set. The message data set may have been encrypted, for example upon storage, using a message decryption key or an associated message encryption key. It should be appreciated that various cryptographic key encryption methodologies may be utilized to encrypt and/or decrypt the message data. It should further be appreciated that such encryption enables a user, for example associated with an authenticated user account linked to a particular organization data object, to revoke one or more message decryption keys and/or delete the one or more decryption keys to prevent previously authorized users from unencrypting and accessing the message data.

At block 1510, the apparatus 200 includes means, such as local search module 206, search management module 207, communications circuitry 205, processor 202, and/or the like, or a combination thereof, configured to provide the search results data comprising at least the message data set to the requestor system. In some embodiments, the search results data additionally or alternatively includes a message metadata set associated with the retrieve message data set. The search results data is provided in response to the received search request. The search results data may be provided to the requestor system over one or more communication networks that may be connected between two or more geographic areas, for example over the Internet.

The search results data may be configured to cause the requestor system to perform one or more actions in response to receiving the search results data. For example, in some embodiments, the requestor system is configured to render one or more interfaces comprising the search results data for viewing by a user associated with the requestor system. Alternatively, the requestor system may forward the search results data to another device, for example a client device, for rendering. It should be appreciated that the search results data may be rendered, for example by the requestor system and/or an associated client device, to receive user interaction by a user. For example, in some embodiments, an interface may be rendered that includes the search results data for selection by the user to view the message data associated with the selected group-based message, and/or to render a corresponding group-based communication channel interface for viewing the group-based message.

It should be appreciated that, in some such embodiments, providing the message data set upon search may reduce overall processing time associated with completely processing a search request. For example, providing the search results data may reduce the number of transmissions required between devices that are located at significant distances from one another (e.g., transmissions between a group-based communication server and one or more geographic data residency servers). Such embodiments may conserve networking resources and reduce the total time the computing hardware is idle while waiting to send a transmission and/or awaiting a response.

As described above, in some embodiments a data retention policy identifies a particular geographic area within which data associated with a particular entity is to be stored. In some example contexts, the geographic area is associated with a citizenship, residency, or other location preference of the organization embodying and/or associated with the entity. In this respect, the geographic data residency local repository that physically stores the message data and/or metadata for that geographic area may be physically located within the geographic area.

Reliance on physical computing devices located in a single geographic area may expose the group-based communication system to risk with respect to data access and permanency. For example, in an example context, the computing device(s) such as the geographic data residency server and/or geographic data residency local repository within the geographic may become unavailable for purposes of communication with one or more other computing devices in the network. For example, in some embodiments, networking interruptions or computing device failure may cause such computing devices to become temporarily inaccessible. Additionally or alternatively, in another example context, the computing devices may become physically unavailable or completely destroyed, for example due to a natural disaster that physically affects the computing devices. If the computing devices for storing the data are limited to a single geographic area, such a natural disaster or other catastrophic event that physically affects the computing devices could permanently affect access to the data stored by such computing devices.

Accordingly, in some embodiments, one or more data retention policies may provide a backup geographic area defined by a backup geographic boundary in addition to a primary geographic area used for the data retention policy. The backup geographic area may include a backup geographic data residency server and/or backup geographic data residency local repository. These devices may be configured to store a backup version of data stored to the primary for the primary geographic area represented within the data retention policy. In this regard, in a circumstance where the geographic data residency server and/or geographic data residency local repository associated with the primary geographic area become inaccessible, whether temporarily or permanently, the data from the backup geographic data residency server and/or geographic data residency local repository may be accessed to minimize risk of data loss.

Additionally or alternatively, in some embodiments, the backup geographic data residency server and/or geographic data residency local server may be used for facilitating storage of newly received message data and/or message metadata in accordance with the data retention policy. For example, if a newly received message is to have message content stored within a primary geographic area, but the geographic data residency local repository and/or corresponding geographic data residency server cannot be reached for any of a myriad of reasons, the message content may instead be stored using the backup geographic data residency server and backup data residency local repository. In a circumstance where the primary geographic data residency server and/or primary geographic data residency local repository become accessible (e.g., after some length of time), the newly stored data within the backup data residency local repository may be copied to the primary geographic data residency local repository within the primary geographic area. In this regard, in some such example embodiments, including a backup geographic area within a data residency policy limits the risk of data loss and/or inconsistency with minimal impact to the user experience.

The backup geographic area may be selected by an administrator associated with a given entity, for example where the administrator is permissioned for creating, editing, and/or assigning one or more data residency policies for one or more entities. For example, in some embodiments an administrator selects a backup geographic area during creation of the data residency policy, or during subsequent editing of an existing data residency policy.

In some embodiments, the group-based communication system provides a predetermined set of backup geographic locations for each primary geographic area associated with a data retention policy, where the predetermined set of backup geographic locations includes one or more backup geographic locations that may be selected, for example by an administrator. In some such embodiments, each primary geographic area may be linked to any number of backup geographic areas determined to be suitable options for a backup geographic area. The predetermined set of backup geographic areas may be predetermined based on the primary geographic area for the data retention policy. In this regard, the group-based communication system may store each primary geographic area associated with one or more associated backup geographic areas. In some embodiments, the backup geographic areas associated with a particular primary geographic area may depend on one or more aspects of information associated with each geographic area. For example, in some embodiments, the backup geographic areas for a particular primary geographic area may have the same data privacy restrictions applicable within the geographic areas, or may be determined to have similar data privacy restrictions applicable within the geographic areas, based on a comparison between legal frameworks for the geographic areas. For example, in an example context where Frankfurt is provided as a primary geographic area, Paris may be provided as a selectable backup geographic area, and/or Munich may be provided as another selectable backup geographic area. Alternatively or additionally, in an example context where Tokyo is provided as a primary geographic area, Kyoto may be provided as a backup geographic area.

Additionally or alternatively, in at least some embodiments, one or more backup geographic areas may be within a greater geographic boundary associated with the primary geographic area. For example, the primary geographic area may be a state, province, city, or other defined boundary within a particular country, and one or more of the predefined set of backup geographic areas may include other states, provinces, cities, or other geographic defined boundaries within the country. In some embodiments, the predetermined set of backup geographic regions is limited by a desired backup threshold range. In this regard, the predetermined set of backup geographic regions may each be within the desired backup threshold range from the primary geographic region (e.g., distances between the primary geographic area and each backup geographic area is less than or equal to the desired backup threshold range). In other embodiments, the group-based communication system is configured to enable an administrator user to select a backup geographic area from a complete list of geographic areas available for selection. The complete list of geographic areas may include all geographic areas other than the primary geographic area, in which the group-based communication system include backup computing devices for use.

In some embodiments, the group-based communication system is configured for moving and/or copying data from the backup devices in the backup geographic area to the primary computing devices in the primary geographic area within a predetermined update timestamp threshold. In some embodiments, the predetermined update timestamp threshold applies to all data residency policies maintained by the group-based communication system. In this regard, after writing new message metadata and/or content to a backup computing device, may be written from the backup computing device to permanent storage in the primary computing devices in the primary geographic area within the predetermined update timestamp threshold. In other embodiments, a predetermined update timestamp threshold may be configured when creating a new data retention policy and/or editing an existing data retention policy.

In this regard, in some embodiments, the group-based communication system is configured to attempt to communicate with computing devices in a geographic area that have become inaccessible at a predefined timestamp interval. If the computing devices in the geographic area become accessible again, the group-based communication system may initiate writing of data previously written to the backup computing devices in the backup geographic area. In this regard, the group-based communication system may cause the backup computing device to transmit, to the primary computing devices, data not already written to the primary computing devices (e.g., data received and/or written after an identified timestamp associated with the interrupted access. In a circumstance where the primary computing devices do not become accessible again within the predetermined update timestamp threshold, the group-based communication system may generate and/or provide an error notification to one or more administrators associated with the group-based communication system indicating the primary computing devices remain inaccessible, and/or to one or more entity administrators associated with one or more data residency policies maintained within the primary geographic area.

Various embodiments may be configured to perform one or more operations to enable storing such information to for storage to a backup geographical data residency local repository within a backup geographic area. For example, embodiments described herein may be configured for determining a geographic data residency server physically located in a second geographic area is inaccessible. Some such embodiments may determine the geographic data residency server is inaccessible during an attempt to transmit to the geographic data residency server for storing new message data and/or metadata. For example, the geographic data residency server in the second geographic area may be a primary geographic data residency server associated with a geographic data storage policy, but the transmission may fail and/or return an error in a circumstance where the geographic data residency server in the second geographic area is inaccessible. Some such embodiments may determine the geographic data residency server in the second geographic area is inaccessible upon receiving and/or processing the transmission error.

Additionally or alternatively, embodiments described herein may be configured to transmit a received and/or identified geographic data residency message package comprising the message data of the message to a geographic data residency server physically located within the backup geographic area defined by a backup geographic boundary. In this regard, some such embodiments may identify the backup geographic area from the geographic data storage policy. In one example context, the geographic data storage policy includes a data value for a parameter representing the backup geographic area. In some such contexts, such example embodiments may identify the backup geographic data residency server based on the backup geographic area, for example based on one or more known network addresses associated with each geographic area. In this regard, the backup geographic area is associated with the geographic data storage policy, for example upon assigning of the backup geographic area to the geographic data storage policy by an administrator user account associated with the entity. In other embodiments, the backup geographic data residency server physically located within the backup geographic area is identified within the geographic data storage policy, for example based on one or more networking identifiers, such that the backup geographic data residency server may be immediately communicated with based on data within the geographic data storage policy.

The backup geographic data residency server may be configured to cause storage of some or all of the received geographic data residency message packet. For example, the backup geographic data residency server may communicate with a backup geographic data residency local repository physically located within the backup geographic area to cause the backup geographic data residency local repository to store at least a portion of the geographic data residency message packet. The geographic data residency server, alone or in conjunction with the geographic data residency local repository, may generate corresponding backup residency token data for use in identifying the stored data. Such data may be transmitted to one or more other devices, apparatuses, and/or systems for use in retrieving the stored data from the geographic data residency local repository.

Additionally or alternatively, embodiments described herein may be configured to update the message data of the message with backup residency token data received from the backup geographic data residency server. In this regard, the backup residency token data may be received in response to the transmission to the backup geographic data residency server. The backup residency token data may represent residency token data specifically for storage within the backup geographic data residency local repository associated with the backup geographic area. In this regard, while the data remains stored in the backup geographic data residency local repository, the backup residency token data may be used to enable fetching the information from the backup geographic data residency local repository through communication with the corresponding backup geographic data residency server. Additionally or alternatively still, such embodiments may be configured to store the updated message data in the geographic data residency local repository physically located in the first geographic area defined by the first geographic boundary.

In this regard, when the corresponding message data is requested, for example by a client device or another geographic data residency server, the backup residency token data may be retrieved and utilized to access the message data. In this regard, the backup residency token data may identify the backup geographic data residency server to use for requesting the corresponding message data. Thus, while the message data remains in the backup geographic data residency local repository, the backup residency token data may provide both identification of the appropriate geographic data residency server to communicate with and access via the appropriate geographic data residency server.

Further, some embodiments are configured to attempt to copy the data stored to a backup geographic data residency local repository to the primary geographic data residency local repository if the primary geographic data residency server and/or primary geographic data residency local repository return to being accessible. Such circumstances may occur when temporary interruptions, such as networking interruption, are repaired to once again enable communication between the computing devices.

In this regard, additionally or alternatively, some embodiments are configured to determine the geographic data residency server physically located in the second geographic area (e.g., a primary geographic data residency server in a primary geographic area for the purposes of this example) has become accessible. For example, some embodiments are configured to attempt communications with the geographic data residency server in the second geographic area at a predetermined timestamp interval. In an example context, some embodiments are configured to attempt communications with the geographic data residency server every minute, every hour, every day, and/or the like. To attempt communications, some such embodiments may transmit a request and/or other data transmission to the geographic data residency server. If a predetermined and/or non-error response is received, the geographic data residency server may be determined accessible, whereas an error response and/or incomplete transmission may be used to determine the geographic data residency server remains inaccessible.

Upon determining a previously inaccessible geographic data residency server has become accessible, some such embodiments may perform one or more actions to copy and/or otherwise move data from storage within the backup geographic area to storage within the primary geographic area. For example, additionally or alternatively to the above, some embodiments are configured to identify the geographic data residency message package from the backup geographic data residency server physically located in the backup geographic area. In some embodiments, one or more geographic data residency message package(s) stored in the backup geographic area is/are identified based on the stored backup residency token data for each message identifier and the corresponding geographic data storage policy. For example, the embodiments may be configured to determine, based on the backup residency token data, the geographic area where the corresponding message data is stored, and determine from the geographic data storage policy whether the determined geographic area where the data is stored is a backup geographic area. In a circumstance where such embodiments determine the geographic area is a backup geographic area, such embodiments may be configured to identify the stored geographic data residency message package via communication with the backup geographic data residency server in communication with the backup geographic data residency local repository. After identifying the geographic data residency message package, the geographic data residency message packet may be transmitted to the geographic data residency server physically located in the second geographic area (e.g., the primary geographic area) to copy and/or move such information to the second geographic area. In this regard, the transmission may cause storage of some or all such information via the geographic data residency server and/or geographic data residency local repository within the second geographic area, in accordance with the geographic data storage policy. In this regard, new residency token data may be generated by the geographic data residency server and/or corresponding geographic data residency local repository in the second geographic area, and stored in the first geographic area associated with the message to enable future retrieval from the second geographic area. In some embodiments, such data may then be deleted and/or otherwise removed from storage in the backup geographic area.

Example Operations for Servicing Deletion Requests

FIGS. 16A-16B illustrate example operations performed for servicing message deletion requests, according to embodiments of the present disclosure. In embodiments, a message deletion request is received 1601, from a client device. In embodiments, the message deletion request comprises a message identifier. In embodiments, upon locating, in a local repository, a first repository row comprising message metadata and residency token data associated with the message identifier, a local repository row erasure operation is initiated 1602 by which contents of the first repository row are erased from the local repository.

In embodiments, upon completion of the local repository row erasure operation, a data residency data deletion request is transmitted 1603 to a geographic data residency server associated with the residency token data. In embodiments, the data residency deletion request comprises the residency token data. In embodiments, the data residency data deletion request is a request to initiate a data residency repository row erasure operation by which contents of a data residency row associated with the residency token data are erased from a geographic data residency local repository comprising the data residency row.

In embodiments, the data residency data deletion request is a request to initiate a data residency repository row erasure operation by which a data residency row associated with the residency token data, in a geographic data residency local repository, is designated as expired and assigned an expiration window. In embodiments, upon completion of the expiration window, contents of the data residency row associated with the residency token data are erased from the geographic data residency local repository. In embodiments, the expiration window is one of more of 14 days, 21 days, or 30 days from a timestamp associated with the data residency data deletion request.

In embodiments, in an instance where a data residency deletion confirmation is not received within a deletion confirmation window, a subsequent data residency deletion request comprising the residency token data is enqueued 1604 to be transmitted to the geographic data residency server.

In embodiments, the geographic data residency server is physically located in a second geographic area defined by a second geographic boundary. In embodiments, the second geographic area is distinct from the first geographic area. In embodiments, each of the first geographic boundary and the second geographic boundary comprises one or more of Asia, western Europe, or North America. In embodiments, the residency token data comprises one or more of a message identifier, a storage location identifier, or a message encryption key. In embodiments, the message encryption key includes a first message encryption key associated with an organization identifier and a second message encryption key associated with the organization identifier.

In embodiments, the message encryption key is used for decryption in conjunction with a centrally managed message encryption key managed by a group-based communication server. In embodiments, the residency token data is transmitted to a group-based communication encryption key management server by the geographic residency server before the geographic residency data server completes the data residency repository row erasure operation. In embodiments, prior to expiration of the deletion confirmation window, a plurality of subsequent data residency deletion requests is enqueued sequentially. In embodiments, a retry duration of time occurs between each subsequent data residency deletion requests until either the deletion confirmation window expires or a maximum number of subsequent data residency deletion requests has been transmitted.

In embodiments, the retry duration between subsequent data residency deletion requests increases as a number of subsequent data residency requests that have been transmitted increases. In embodiments, the maximum number of subsequent data residency deletion requests is 10. In embodiments, the deletion confirmation window is one of 1 minute, 10 minutes, 20 minutes, 30 minutes, 60 minutes, or 24 hours. In embodiments, the first geographic boundary is subject to a first data storage policy and the second geographic boundary is subject to a second data storage policy.

FIGS. 17A-17B illustrate example operations performed for servicing message deletion requests, according to embodiments of the present disclosure. In embodiments, a message deletion request is received 1701 from a client device. In embodiments, the message deletion request comprises a message identifier, the message identifier associated with message metadata and residency token data. In embodiments, a data residency data deletion request is transmitted 1702 to a geographic data residency server associated with the residency token data. In embodiments, the data residency deletion request comprises the residency token data.

In embodiments, the data residency data deletion request is a request to initiate a data residency repository row erasure operation 1703 by which contents of a data residency row associated with the residency token data are erased from a geographic data residency local repository comprising the data residency row.

In embodiments, the data residency data deletion request is a request to initiate a data residency repository row erasure operation by which a data residency row associated with the residency token data, in a geographic data residency local repository, is designated as expired and assigned an expiration window. In embodiments, upon completion of the expiration window, contents of the data residency row associated with the residency token data are erased from the geographic data residency local repository. In embodiments, the expiration window is one of more of 14 days, 21 days, or 30 days from a timestamp associated with the data residency data deletion request.

In embodiments, upon receiving a data residency deletion confirmation 1704, a local repository row erasure operation is initiated 1705 by which contents of a first repository row associated with the message identifier are erased from the local repository. In embodiments, in an instance where a data residency deletion confirmation is not received within a deletion confirmation window, a subsequent data residency deletion request comprising the residency token data is enqueued 1706 to be transmitted to the geographic data residency server.

In embodiments, the geographic data residency server is physically located in a second geographic area defined by a second geographic boundary, and wherein the second geographic area is distinct from the first geographic area. In embodiments, each of the first geographic boundary and the second geographic boundary comprises one or more of Asia, western Europe, or North America. In embodiments, the residency token data comprises one or more of a message identifier, a storage location identifier, or a message encryption key. In embodiments, the message encryption key includes a first message encryption key associated with an organization identifier and a second message encryption key associated with the organization identifier.

In embodiments, the message encryption key is used for decryption in conjunction with a centrally managed message encryption key managed by a group-based communication server. In embodiments, the residency token data is transmitted to a group-based communication encryption key management server by the geographic residency server before the geographic residency data server completes the data residency repository row erasure operation. In embodiments, prior to expiration of the deletion confirmation window, a plurality of subsequent data residency deletion requests is enqueued sequentially. In embodiments, a retry duration of time occurs between each subsequent data residency deletion requests until either the deletion confirmation window expires or a maximum number of subsequent data residency deletion requests has been transmitted.

In embodiments, the retry duration between subsequent data residency deletion requests increases as a number of subsequent data residency requests that have been transmitted increases. In embodiments, the maximum number of subsequent data residency deletion requests is 10. In embodiments, the deletion confirmation window is one of 1 minute, 10 minutes, 20 minutes, 30 minutes, 60 minutes, or 24 hours. In embodiments, the first geographic boundary is subject to a first data storage policy and the second geographic boundary is subject to a second data storage policy.

FIGS. 18A-18B illustrate example operations performed for servicing message deletion requests, according to embodiments of the present disclosure. In embodiments, a plurality of first local repository rows is copied 1801 to a plurality of second local repository rows. In embodiments, each first local repository row of the first local repository is traversed 1802 to identify first local repository rows for exclusion from a plurality of second local repository rows. In embodiments, each identified first local repository row is associated with a message identifier associated with an application deletion request. In embodiments, the identified first local repository rows are eliminated 1803 from the plurality of second local repository rows.

In embodiments, the plurality of first local repository rows is erased 1804. In embodiments, contents of the plurality of first local repository rows is erased from a local repository. In embodiments, an application deletion request comprises a message identifier and is a request to erase contents of a local repository row associated with the message identifier from a local repository.

FIGS. 19A-19B illustrate example operations performed for servicing message deletion requests, according to embodiments of the present disclosure. In embodiments, a message deletion request is received 1901 from a client device. In embodiments, the message deletion request comprises a message identifier. In embodiments, a message deletion request identifier associated with the message deletion request is appended 1902 to a message deletion request ledger. In embodiments, upon locating, in a local repository, a first repository row comprising message metadata and residency token data associated with the message identifier, a local repository row erasure operation is initiated 1903 by which contents of the first repository row are erased from the local repository.

In embodiments, upon completion 1904 of the local repository row erasure operation, a data residency data deletion request is transmitted 1905 to a geographic data residency server associated with the residency token data. In embodiments, the data residency deletion request comprises the residency token data. In embodiments, the data residency data deletion request is a request to initiate a data residency repository row erasure operation by which contents of a data residency row associated with the residency token data are erased from a geographic data residency local repository comprising the data residency row.

In embodiments, the message deletion request ledger is periodically traversed 1906A to identify message deletion request identifiers associated with failed message deletion request operations. In embodiments, subsequent message deletion requests are enqueued. In embodiments, the subsequent message deletion requests comprise the identified message deletion request identifiers.

In embodiments, the data residency data deletion request is a request to initiate a data residency repository row erasure operation by which a data residency row associated with the residency token data, in a geographic data residency local repository, is designated as expired and assigned an expiration window. In embodiments, upon completion of the expiration window, contents of the data residency row associated with the residency token data are erased from the geographic data residency local repository. In embodiments, the expiration window is one of more of 14 days, 21 days, or 30 days from a timestamp associated with the data residency data deletion request.

FIGS. 20A-20B illustrate example operations performed for servicing message deletion requests, according to embodiments of the present disclosure. In embodiments, a message deletion request is received 2001 from a client device. In embodiments, the message deletion request comprises a message identifier. In embodiments, upon locating, in a local repository, a first repository row comprising message metadata and residency token data associated with the message identifier, a local repository row erasure operation is initiated 2002 by which contents of the first repository row are erased from the local repository.

In embodiments, upon completion of the local repository row erasure operation, a data residency data deletion request is transmitted 2003 to a geographic data residency server associated with the residency token data. In embodiments, the data residency deletion request comprises the residency token data.

In embodiments, the data residency data deletion request is a request to initiate a data residency repository row erasure operation by which a data residency row associated with the residency token data, in a geographic data residency local repository, is designated as expired and assigned an expiration window. In embodiments, upon completion of the expiration window, contents of the data residency row associated with the residency token data are erased from the geographic data residency local repository. In embodiments, the expiration window is one of more of 14 days, 21 days, or 30 days from a timestamp associated with the data residency data deletion request.

FIGS. 21A-21B illustrate example operations performed for managing distributed data, according to embodiments of the present disclosure. In embodiments, a message comprising message data, message metadata, and a message identifier is received 2101 from a first client device. In embodiments, an entity identifier is extracted 2102 from the message metadata. In embodiments, upon determining that the entity identifier is associated with a geographic data storage policy, a geographic data residency message package comprising message data of the message is transmitted 2103 to a geographic data residency server physically located within a second geographic area defined by a second geographic boundary. In embodiments, the second geographic area is associated with the geographic data storage policy.

In embodiments, residency token data is received 2104 from the geographic data residency server, the residency token data referencing a geographic data residency local repository address associated with the message data. In embodiments, the geographic data residency local repository address is associated with a geographic data residency local repository physically located within the second geographic boundary associated with the geographic data storage policy.

In embodiments, a residency token data acknowledgement is transmitted 2105 to the geographic data residency server. In embodiments, the geographic data residency server associates the residency token data acknowledgement with the geographic data residency message package in a data residency message package journal comprising a plurality of entries, each entry comprising a first record for storing a geographic data residency message package identifier and a second record for storing an associated residency token data acknowledgement. In embodiments, periodically, the geographic data residency server traverses 2106 the data residency message package journal to identify entries of the plurality of entries that store a geographic data residency package identifier in its first record but do not store an associated residency token data acknowledgement in its second record. In embodiments, the geographic data residency server transmits deletion confirmations for each of the identified entries before erasing data residency rows associated with the identified entries.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

It should be appreciated that descriptions in the one or more of the above flows is/are described with respect to a limited number of entities and/or associated geographic data storage policies merely for purposes of illustration and explanation. As described throughout, a common group-based communication channel may be associated with any number of entities, and thus be associated with any number of geographic data storage policies associated with such entities. For example, in some embodiments, a common group-based communication channel is associated with any number of organization identifiers, where each organization identifier is permissioned to access the common group-based communication channel and/or is associated with at least one authenticated user account having access to the common group-based communication channel. Further, each organization identifier may be associated with a geographic data storage policy such that the geographic data residency storage policies identify any number of associated geographic areas. Additionally or alternatively, in some embodiments, a common group-based communication channel is associated with any number of group-based workspace identifiers, where each group-based workspace identifier is associated with a geographic data storage policy such that the geographic data residency storage policies each identify any number of associated geographic areas. Thus, while operations are described for storing message content and/or message metadata may be described with respect to one or two geographic data storage policies associated with one or two geographic areas, one or more such operations may be similarly repeated for any number of data residency storage policies associated with any number of geographic areas as necessary based on the entities configured for accessing a common group-based communication channel.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Some examples of computer-implemented methods, apparatuses, and computer program products that are described herein are as follows:

I1. There is provided an apparatus for managing geographically distributed data storage in a group-based communication system, the apparatus physically located in a first geographic area defined by a first geographic boundary, the apparatus comprising at least one processor and at least one non-transitory memory including computer program code, the at least one non-transitory memory and the computer program code configured to, with the at least one processor, cause the apparatus to, upon determining that an entity identifier associated with a message is associated with a geographic data storage policy, transmit a geographic data residency message package comprising message data of the message to a geographic data residency server physically located within a second geographic area defined by a second geographic boundary, wherein the second geographic area is associated with the geographic data storage policy; update the message data of the message with residency token data received from the geographic data residency server; and store the updated message in a geographic data residency local repository physically located in the first geographic area defined by the first geographic boundary.

I2. There is also provided the apparatus of (I1), wherein the updated message comprises the residency token data, the message metadata, and the message identifier.

I3. There is also provided the apparatus of (I1), wherein the geographic data residency local repository address is associated with a geographic data residency local repository physically located within the second geographic boundary associated with the geographic data storage policy.

I4. There is also provided the apparatus of (I1), wherein a recipient identifier associated with the message is associated with a different geographic data storage policy from that with which an author identifier is associated.

J1. In addition, there is provided yet another apparatus for managing geographically distributed data storage in a group-based communication system, the apparatus physically located in a first geographic area defined by a first geographic boundary, the apparatus comprising at least one processor and at least one non-transitory memory including computer program code, the at least one non-transitory memory and the computer program code configured to, with the at least one processor, cause the apparatus to receive, from an apparatus physically located in a first geographic area defined by a first geographic boundary, a message comprising at least message data; upon determining that an entity identifier associated with the message is associated with a geographic data storage policy, transmit a geographic data residency message package comprising message data of the message to a geographic data residency server physically located within a second geographic area defined by a second geographic boundary, wherein the second geographic area is associated with the geographic data storage policy; receive, from the geographic data residency server, residency token data associated with the message data; update the message data of the message with residency token data received from the geographic data residency server; and store the updated message in a geographic data residency local repository physically located in the first geographic area defined by the first geographic boundary.

J2. There is also provided the apparatus of (J1), wherein the updated message comprises the residency token data, the message metadata, and the message identifier.

J3. There is also provided the apparatus of (J1), wherein the geographic data residency local repository address is associated with a geographic data residency local repository physically located within the second geographic boundary associated with the geographic data storage policy.

J4. There is also provided the apparatus of (J1), wherein the message is further associated with a recipient identifier and an author identifier, wherein the recipient identifier is associated with a first geographic data storage policy that is different from a second geographic data storage policy associated with the author identifier.

J5. There is also provided the apparatus of (J1), the apparatus further caused to determine the geographic data residency server physically located in the second geographic area is inaccessible; transmit the geographic data residency message package comprising the message data of the message to a geographic data residency server physically located within a backup geographic area defined by a backup geographic boundary, the backup geographic area associated with the geographic data storage policy; update the message data of the message with backup residency token data received from the backup geographic data residency server; and store the updated message data in the geographic data residency local repository physically located in the first geographic area defined by the first geographic boundary.

J6. There is also provided the apparatus of (J5), the apparatus further caused to determine the geographic data residency server physically located in the second geographic area has become accessible; and identify the geographic data residency message package from the backup geographic data residency server physically located in the backup geographic area; wherein transmitting the geographic data residency message package to the geographic data residency server physically located in the second geographic area occurs in response to determining the geographic data residency server located in the second geographic area has become accessible.

J7. There is also provided the apparatus of (J1), wherein the geographic data residency message package comprises a subset of the message data, and wherein the subset of the message data is replaced with the residency token data in the updated message.

J8. There is also provided the apparatus of (J1), wherein the at least one non-transitory memory and the computer program code configured to, with the at least one processor, further cause the apparatus to receive, from a second client device, a message retrieval request, the message retrieval request comprising the message identifier; retrieve, from the local repository, the updated message; upon determining that the updated message comprises residency token data, transmit a geographic data residency data retrieval request to a geographic data residency server associated with the residency token data, the geographic data residency retrieval request comprising the residency token data; receive, from the geographic data residency server, the message data stored in the geographic data residency local repository at a geographic data residency local repository address associated with the residency token data; and transmit the message data to the client device.

J9. There is also provided the apparatus of (J1), wherein the first geographic boundary is defined by a first plurality of latitude and longitude coordinates and the second geographic boundary is defined by a second plurality of latitude and longitude coordinates.

J10. There is also provided the apparatus of (J1), wherein the first geographic boundary is subject to a first data storage policy and the second geographic boundary is subject to a second data storage policy.

J11. There is also provided the apparatus of (J1), wherein the geographic data residency server is physically located within a third geographic area defined by a third geographic boundary.

J12. There is also provided the apparatus of (J8), wherein the message data is stored in short term memory such that persistence of the message data only exists at the geographic data residency local repository.

J13. There is also provided the apparatus of (J1), wherein the geographic data storage policy is associated with legal data storage requirements associated with a particular geographic boundary.

J14. There is also provided the apparatus of (J13), wherein each of the first geographic boundary, the second geographic boundary, and the particular geographic boundary is one or more of Asia, western Europe, or North America.

J15. There is also provided the apparatus of (J1), wherein the residency token data comprises one or more of a message identifier, a storage location identifier, or a message encryption key.

J16. There is also provided the apparatus of (J15), wherein the message encryption key includes a first message encryption key associated with the organization identifier and a second message encryption key associated with the at least one organization identifier.

J17. There is also provided the apparatus of (J15), wherein the message encryption key is used for decryption in conjunction with a centrally managed message encryption key managed by a group-based communication server.

J18. There is also provided the apparatus of (J1), wherein the residency token data is transmitted to a group-based communication encryption key management server by the geographic data residency server before received by the apparatus.

J19. There is also provided the apparatus of (J8), wherein the message retrieval request is forwarded to a geographic data residency server in an instance where the geographic data residency server cannot locate the residency token data.

K1. In addition, there is provided a computer-implemented method for managing geographically distributed data storage in a group-based communication system, the computer-implemented method including upon determining that an entity identifier associated with a message is associated with a geographic data storage policy, transmitting a geographic data residency message package comprising message data of the message to a geographic data residency server physically located within a second geographic area defined by a second geographic boundary, wherein the second geographic area is associated with the geographic data storage policy; updating the message data of the message with residency token data received from the geographic data residency server; and storing the updated message in a geographic data residency local repository physically located in a first geographic area defined by a first geographic boundary.

K2. There is also provided the computer-implemented method of (K1), wherein the updated message comprises the residency token data, the message metadata, and the message identifier.

K3. There is also provided the computer-implemented method of (K1), wherein the geographic data residency local repository address is associated with a geographic data residency local repository physically located within the second geographic boundary associated with the geographic data storage policy.

K4. There is also provided the computer-implemented method of (K1), wherein a recipient identifier associated with the message is associated with a different geographic data storage policy from that with which an author identifier is associated.

L1. In addition, there is provided yet another computer-implemented method for managing geographically distributed data storage in a group-based communication system, the computer-implemented method including receiving, from an apparatus physically located in a first geographic area defined by a first geographic boundary, a message comprising at least message data; upon determining that an entity identifier associated with the message is associated with a geographic data storage policy, transmitting a geographic data residency message package comprising message data of the message to a geographic data residency server physically located within a second geographic area defined by a second geographic boundary, wherein the second geographic area is associated with the geographic data storage policy; receiving, from the geographic data residency server, residency token data associated with the message data; updating the message data of the message with residency token data received from the geographic data residency server; and storing the updated message in a geographic data residency local repository physically located in the first geographic area defined by the first geographic boundary.

L2. There is also provided the computer-implemented method of (L1), wherein the updated message comprises the residency token data, the message metadata, and the message identifier.

L3. There is also provided the computer-implemented method of (L1), wherein the geographic data residency local repository address is associated with a geographic data residency local repository physically located within the second geographic boundary associated with the geographic data storage policy.

L4. There is also provided the computer-implemented method of (L1), wherein the message is further associated with a recipient identifier and an author identifier, wherein the recipient identifier is associated with a first geographic data storage policy that is different from a second geographic data storage policy associated with the author identifier.

L5. There is also provided the computer-implemented method of (L1), the computer-implemented method further including determining the geographic data residency server physically located in the second geographic area is inaccessible; transmitting the geographic data residency message package comprising the message data of the message to a geographic data residency server physically located within a backup geographic area defined by a backup geographic boundary, the backup geographic area associated with the geographic data storage policy; updating the message data of the message with backup residency token data received from the backup geographic data residency server; and storing the updated message data in the geographic data residency local repository physically located in the first geographic area defined by the first geographic boundary.

L6. There is also provided the computer-implemented method of (L5), the computer-implemented method further including determining the geographic data residency server physically located in the second geographic area has become accessible; and identifying the geographic data residency message package from the backup geographic data residency server physically located in the backup geographic area; wherein transmitting the geographic data residency message package to the geographic data residency server physically located in the second geographic area occurs in response to determining the geographic data residency server located in the second geographic area has become accessible.

L7. There is also provided the computer-implemented method of (L1), wherein the geographic data residency message package comprises a subset of the message data, and wherein the subset of the message data is replaced with the residency token data in the updated message.

L8. There is also provided the computer-implemented method of (L1), the computer-implemented method further including receiving, from a second client device, a message retrieval request, the message retrieval request comprising the message identifier; retrieving, from the local repository, the updated message; upon determining that the updated message comprises residency token data, transmitting a geographic data residency data retrieval request to a geographic data residency server associated with the residency token data, the geographic data residency retrieval request comprising the residency token data; receiving, from the geographic data residency server, the message data stored in the geographic data residency local repository at a geographic data residency local repository address associated with the residency token data; and transmitting the message data to the client device.

L9. There is also provided the computer-implemented method of (L1), wherein the first geographic boundary is defined by a first plurality of latitude and longitude coordinates and the second geographic boundary is defined by a second plurality of latitude and longitude coordinates.

L10. There is also provided the computer-implemented method of (L1), wherein the first geographic boundary is subject to a first data storage policy and the second geographic boundary is subject to a second data storage policy.

L11. There is also provided the computer-implemented method of (L1), wherein the geographic data residency server is physically located within a third geographic area defined by a third geographic boundary.

L12. There is also provided the computer-implemented method of (L11), wherein the message data is stored in short term memory such that persistence of the message data only exists at the geographic data residency local repository.

L13. There is also provided the computer-implemented method of (L1), wherein the geographic data storage policy is associated with legal data storage requirements associated with a particular geographic boundary.

L14. There is also provided the computer-implemented method of (L13), wherein each of the first geographic boundary, the second geographic boundary, and the particular geographic boundary is one or more of Asia, western Europe, or North America.

L15. There is also provided the computer-implemented method of (L1), wherein the residency token data comprises one or more of a message identifier, a storage location identifier, or a message encryption key.

L16. There is also provided the computer-implemented method of (L1), wherein the message encryption key includes a first message encryption key associated with the organization identifier and a second message encryption key associated with the at least one organization identifier.

L17. There is also provided the computer-implemented method of (L16), wherein the message encryption key is used for decryption in conjunction with a centrally managed message encryption key managed by a group-based communication server.

L18. There is also provided the computer-implemented method of (L1), wherein the residency token data is transmitted to a group-based communication encryption key management server by the geographic data residency server before received.

L19. There is also provided the computer-implemented method of (L8), wherein the message retrieval request is forwarded to a geographic data residency server in an instance where the geographic data residency server cannot locate the residency token data.

M1. In addition, there is provided a computer program product for managing geographically distributed data storage in a group-based communication system, the computer program product comprising at least one non-transitory computer-readable storage medium having computer-executable program code instructions stored therein, the computer-executable program code instructions, in execution with a processor, configured to upon determining that an entity identifier associated with a message is associated with a geographic data storage policy, transmit a geographic data residency message package comprising message data of the message to a geographic data residency server physically located within a second geographic area defined by a second geographic boundary, wherein the second geographic area is associated with the geographic data storage policy; update the message data of the message with residency token data received from the geographic data residency server; and store the updated message in a geographic data residency local repository physically located in a first geographic area defined by a first geographic boundary.

M2. There is also provided the computer program product of (M1), wherein the updated message comprises the residency token data, the message metadata, and the message identifier.

M3. There is also provided the computer program product of (M1), wherein the geographic data residency local repository address is associated with a geographic data residency local repository physically located within the second geographic boundary associated with the geographic data storage policy.

M4. There is also provided the computer program product of (M1), wherein a recipient identifier associated with the message is associated with a different geographic data storage policy from that with which an author identifier is associated.

N1. In addition, there is provided yet another computer program product for managing geographically distributed data storage in a group-based communication system, the computer program product comprising at least one non-transitory computer-readable storage medium having computer-executable program code instructions stored therein, the computer-executable program code instructions, in execution with a processor, configured to receive, from an apparatus physically located in a first geographic area defined by a first geographic boundary, a message comprising at least message data; upon determining that an entity identifier associated with the message is associated with a geographic data storage policy, transmit a geographic data residency message package comprising message data of the message to a geographic data residency server physically located within a second geographic area defined by a second geographic boundary, wherein the second geographic area is associated with the geographic data storage policy; receive, from the geographic data residency server, residency token data associated with the message data; update the message data of the message with residency token data received from the geographic data residency server; and store the updated message in a geographic data residency local repository physically located in the first geographic area defined by the first geographic boundary.

N2. There is also provided the computer program product of (N1), wherein the updated message comprises the residency token data, the message metadata, and the message identifier.

N3. There is also provided the computer program product of (N1), wherein the geographic data residency local repository address is associated with a geographic data residency local repository physically located within the second geographic boundary associated with the geographic data storage policy.

N4. There is also provided the computer program product of (N1), wherein the message is further associated with a recipient identifier and an author identifier, wherein the recipient identifier is associated with a first geographic data storage policy that is different from a second geographic data storage policy associated with the author identifier.

N5. There is also provided the computer program product of (N1), the computer program product further configured to determine the geographic data residency server physically located in the second geographic area is inaccessible; transmit the geographic data residency message package comprising the message data of the message to a geographic data residency server physically located within a backup geographic area defined by a backup geographic boundary, the backup geographic area associated with the geographic data storage policy; update the message data of the message with backup residency token data received from the backup geographic data residency server; and store the updated message data in the geographic data residency local repository physically located in the first geographic area defined by the first geographic boundary.

N6. There is also provided the computer program product of (N5), the computer program product further configured to determine the geographic data residency server physically located in the second geographic area has become accessible; and identify the geographic data residency message package from the backup geographic data residency server physically located in the backup geographic area; wherein transmitting the geographic data residency message package to the geographic data residency server physically located in the second geographic area occurs in response to determining the geographic data residency server located in the second geographic area has become accessible.

N7. There is also provided the computer program product of (N1), wherein the geographic data residency message package comprises a subset of the message data, and wherein the subset of the message data is replaced with the residency token data in the updated message.

N8. There is also provided the computer program product of (N1), the computer program product further configured to receive, from a second client device, a message retrieval request, the message retrieval request comprising the message identifier; retrieve, from the local repository, the updated message; upon determining that the updated message comprises residency token data, transmit a geographic data residency data retrieval request to a geographic data residency server associated with the residency token data, the geographic data residency retrieval request comprising the residency token data; receive, from the geographic data residency server, the message data stored in the geographic data residency local repository at a geographic data residency local repository address associated with the residency token data; and transmit the message data to the client device.

N9. There is also provided the computer program product of (N1), wherein the first geographic boundary is defined by a first plurality of latitude and longitude coordinates and the second geographic boundary is defined by a second plurality of latitude and longitude coordinates.

N10. There is also provided the computer program product of (N1), wherein the first geographic boundary is subject to a first data storage policy and the second geographic boundary is subject to a second data storage policy.

N11. There is also provided the computer program product of (N1), wherein the geographic data residency server is physically located within a third geographic area defined by a third geographic boundary.

N12. There is also provided the computer program product of (N9), wherein the message data is stored in short term memory such that persistence of the message data only exists at the geographic data residency local repository.

N13. There is also provided the computer program product of (N1), wherein the geographic data storage policy is associated with legal data storage requirements associated with a particular geographic boundary.

N14. There is also provided the computer program product of (N13), wherein each of the first geographic boundary, the second geographic boundary, and the particular geographic boundary is one or more of Asia, western Europe, or North America.

N15. There is also provided the computer program product of (N1), wherein the residency token data comprises one or more of a message identifier, a storage location identifier, or a message encryption key.

N16. There is also provided the computer program product of (N15), wherein the message encryption key includes a first message encryption key associated with the organization identifier and a second message encryption key associated with the at least one organization identifier.

N17. There is also provided the computer program product of (N15), wherein the message encryption key is used for decryption in conjunction with a centrally managed message encryption key managed by a group-based communication server.

N18. There is also provided the computer program product of (N1), wherein the residency token data is transmitted to a group-based communication encryption key management server by the geographic data residency server before received.

N19. There is also provided the computer program product of (N18), wherein the message retrieval request is forwarded to a geographic data residency server in an instance where the geographic data residency server cannot locate the residency token data.

O1. In addition, there is provided a computer-implemented method for generating search results data using a distributed search index in a group-based communication system, the computer-implemented method including receiving, from a requestor system and at an apparatus physically located in a first geographic area defined by a first geographic boundary, a search request associated with a searching entity identifier, wherein the searching entity identifier is associated with a second geographic area defined by a second geographic boundary; retrieving, from a geographic data residency server associated with the second geographic area, a search index for the searching entity identifier; identifying search results data based on the search index; and providing the search results data to the requestor system.

O2. There is also provided the computer-implemented method of (O1), wherein the search results data comprises at least a message data set, and identifying the search results data based on the search index includes identifying, based on the search request and the search index, a residency token data set associated with search results data; receiving, from a geographic data residency server associated with the second geographic area, search result data comprising a message data set based on at least the residency token data set; and providing, to the requestor system, the search result data comprising at least the message data set.

O3. There is also provided the computer-implemented method of (O2), wherein the message data set comprises an encrypted message data set, and the method further includes identifying a message decryption key set based on the residency token data set; decrypting the encrypted message data set based on the message decryption key set to identify an unencrypted message data set; and including the unencrypted message data set in the search results data.

O4. There is also provided the computer-implemented method of (O1), the method further including retrieving the search index from the geographic data residency server associated with the second geographic boundary based an entity search key, wherein the entity search key is retrievable based on the searching entity identifier.

P1. In addition, there is provided yet another computer-implemented method for generating a search index based on geographically distributed data storage in a group-based communication system, the computer-implemented method including retrieving, by an apparatus physically located in a first geographic area defined by a first geographic boundary and from a geographic data residency local repository associated with the first geographic boundary, a first message data subset and a message metadata set associated with a common group-based communication channel identifier;

receiving, from a geographic data residency server located within a second geographic area defined by a second geographic boundary, a second message data subset based on at least a residency token data set of the message metadata set, the second message data subset associated with the common group-based communication channel identifier; generating a search index based on the first message data subset, the second message data subset, and the message metadata set; and storing the search index in the geographic data residency local repository associated with the first geographic boundary.

P2. There is also provided the computer-implemented method of (P1), wherein retrieving the second message data subset includes transmitting at least the residency token data set to the geographic data residency server located within the second geographic area, wherein the geographic data residency server within the second geographic area retrieves, based on the residency token data set, the second message data subset from a second geographic data residency local repository within the second geographic area; and receiving the first message data subset from the geographic data residency server within the second geographic area in response to the transmission.

P3. There is also provided the computer-implemented method of (P1), the computer-implemented method further including identifying at least one message decryption key for a second entity data object identifier associated with the common group-based communication channel identifier.

P4. There is also provided the computer-implemented method of (P1), wherein the second entity data object identifier is associated with a data residency policy data object corresponding to the second geographic area.

P5. There is also provided the computer-implemented method of (P4), wherein retrieving the second message data subset includes transmitting the residency token data set to the geographic data residency server located within the second geographic area, wherein the geographic data residency server within the second geographic area retrieves a second encrypted message data subset from a second geographic data residency local repository within the second geographic area based on the residency token data set; receiving the second encrypted message data subset from the geographic data residency server within the second geographic area; and decrypting the second encrypted message data subset utilizing the at least one message decryption key.

P6. There is also provided the computer-implemented method of (P1), the computer-implemented method further including identifying the geographic data residency server associated with the second geographic area based on one or more of a portion of the message metadata set or the residency token data set.

P7. There is also provided the computer-implemented method of (P1), the computer-implemented method further including causing the geographic data residency server associated with the second geographic boundary to copy the message metadata set.

Q1. In addition, there is provided a computer program product for generating a search index based on geographically distributed data storage in a group-based communication system, the computer program product comprising at least one non-transitory computer-readable storage medium having computer-executable program code instructions stored therein, the computer-executable program code instructions, in execution with a processor, configured to receive, at an apparatus located within a first from a geographic area defined by a first geographic boundary and from geographic data residency server located within a second geographic area defined by a second geographic boundary, a message metadata set comprising at least a residency token data set; retrieve, from a geographic data residency local repository associated with the second geographic boundary, a message data set based on at least the residency token data set; generate a search index based on the message metadata set and the message data set; and store the search index in the geographic data residency local repository within the second geographic area.

Q2. There is also provided the computer program product of (Q1), wherein the computer-executable program code instructions, in execution with the processor, are further configured to retrieve, from the geographic data residency local repository associated with the second geographic boundary, the message data set based on at least the residency token data set by generating a geographic data residency data retrieval request comprising the residency token data set; transmitting the geographic data residency data retrieval request to the geographic residency data server associated with the second geographic area to cause the geographic residency data server to retrieve the message data from the geographic residency data local repository associated with the second geographic area; and receiving the message data set as a response from the geographic data residency server associated with the second geographic area.

Q3. There is also provided the computer program product of (Q1), wherein the computer-executable program code instructions, in execution with the processor, are further configured to retrieve, from the geographic data residency local repository associated with the second geographic boundary, the message data set based on at least the residency token data set by identifying at least one message decryption key associated with the residency token data set; generating a geographic data residency data retrieval request comprising the residency token data set; receiving an encrypted message data set as a response from the geographic data residency server associated with the second geographic area; and decrypting the encrypted message set using the at least one message decryption key to identify the message data set.

Q4. There is also provided the computer program product of (Q1), wherein the computer-executable program code instructions, in execution with the processor, are further configured to retrieve the message data set based on one or more of the residency token data set or a message identification set.

Q5. There is also provided the computer program product of (Q1), wherein the geographic data residency local repository comprises a geographic data residency local cache.

R1. In addition, there is provided an apparatus for generating a search index based on geographically distributed data storage in a group-based communication system, the apparatus physically located in a first geographic area defined by a first geographic boundary, the apparatus comprising at least one processor and at least one non-transitory memory including computer program code, the at least one non-transitory memory and the computer program code configured to, with the at least one processor, configure the apparatus to receive, from geographic data residency server located within a second geographic area defined by a second geographic boundary, a message metadata set comprising at least a residency token data set; retrieve, from a geographic data residency local repository associated with the second geographic boundary, a message data set based on at least the residency token data set; generate a search index based on the message metadata set and the message data set; and store the search index in the geographic data residency local repository within the second geographic area.

R2. There is also provided the apparatus of (R1), wherein the apparatus is further configured to retrieve, from the geographic data residency local repository associated with the second geographic boundary, the message data set based on at least the residency token data set by generating a geographic data residency data retrieval request comprising the residency token data set; transmitting the geographic data residency data retrieval request to the geographic residency data server associated with the second geographic area to cause the geographic residency data server to retrieve the message data from the geographic residency data local repository associated with the second geographic area; and receiving the message data set as a response from the geographic data residency server associated with the second geographic area.

R3. There is also provided the apparatus of (R1), wherein the apparatus is further configured to retrieve, from the geographic data residency local repository associated with the second geographic boundary, the message data set based on at least the residency token data set by identifying at least one message decryption key associated with the residency token data set; generating a geographic data residency data retrieval request comprising the residency token data set; receiving an encrypted message data set as a response from the geographic data residency server associated with the second geographic area; and decrypting the encrypted message set using the at least one message decryption key to identify the message data set.

R4. There is also provided the apparatus of (R1), wherein the apparatus is further configured to retrieve the message data set based on one or more of the residency token data set or a message identification set.

R5. There is also provided the apparatus of (R1), wherein the geographic data residency local repository comprises a geographic data residency local cache.

S1. In addition, there is provided a computer program product for generating search results data using a distributed search index in a group-based communication system in a group-based communication system, the computer program product comprising at least one non-transitory computer-readable storage medium having computer-executable program code instructions stored therein, the computer-executable program code instructions, in execution with a processor, configured to receive, at an apparatus located within a first from a geographic area defined by a first geographic boundary and from a requestor system, a search request associated with a searching entity identifier, wherein the searching entity identifier is associated with a second geographic area defined by a second geographic boundary; retrieve, from a geographic data residency server associated with the second geographic area, a search index for the searching entity identifier; identify search results data based on the search index; and provide the search results data to the requestor system.

S2. There is also provided the computer program product of (S1), wherein the search results data comprises at least a message data set, and to identify the search results data based on the search index, the computer-executable program code instructions, in execution with the processor, are further configured to identify, based on the search request and the search index, a residency token data set associated with search results data; receive, from a geographic data residency server associated with the second geographic area, search result data comprising a message data set based on at least the residency token data set; and provide, to the requestor system, the search result data comprising at least the message data set.

S3. There is also provided the computer program product of (S2), wherein the message data set comprises an encrypted message data set, and the computer-executable program code instructions, in execution with the processor, are further configured to identify a message decryption key set based on the residency token data set; decrypt the encrypted message data set based on the message decryption key set to identify an unencrypted message data set; and include the unencrypted message data set in the search results data.

S4. There is also provided the computer program product of (S1), wherein the computer-executable program code instructions, in execution with the processor, are further configured to retrieve the search index from the geographic data residency server associated with the second geographic boundary based an entity search key, wherein the entity search key is retrievable based on the searching entity identifier.

T1. In addition, there is provided an apparatus for generating search results data using a distributed search index in a group-based communication system in a group-based communication system, the apparatus physically located in a first geographic area defined by a first geographic boundary, the apparatus comprising at least one processor and at least one non-transitory memory including computer program code, the at least one non-transitory memory and the computer program code configured to, with the at least one processor, configure the apparatus to receive, from a requestor system, a search request associated with a searching entity identifier, wherein the searching entity identifier is associated with a second geographic area defined by a second geographic boundary; retrieve, from a geographic data residency server associated with the second geographic area, a search index for the searching entity identifier; identify search results data based on the search index; and provide the search results data to the requestor system.

T2. There is also provided the apparatus of (T1), wherein the search results data comprises at least a message data set, and to identify the search results data based on the search index, the apparatus further configured to identify, based on the search request and the search index, a residency token data set associated with search results data; receive, from a geographic data residency server associated with the second geographic area, search result data comprising a message data set based on at least the residency token data set; and provide, to the requestor system, the search result data comprising at least the message data set.

T3. There is also provided the computer program product of (T2), wherein the message data set comprises an encrypted message data set, and the apparatus further configured to identify a message decryption key set based on the residency token data set; decrypt the encrypted message data set based on the message decryption key set to identify an unencrypted message data set; and include the unencrypted message data set in the search results data.

T4. There is also provided the apparatus of (T1), the apparatus further configured to retrieve the search index from the geographic data residency server associated with the second geographic boundary based an entity search key, wherein the entity search key is retrievable based on the searching entity identifier.

U1. In addition, there is provided a computer-implemented method generating search results data using a distributed search index in a group-based communication system in a group-based communication system, the computer-implemented method including receiving, at an apparatus located within a first from a geographic area defined by a first geographic boundary and from a requestor system, a search request associated with a searching entity identifier, wherein the searching entity identifier is associated with a second geographic area defined by a second geographic boundary; retrieving, from a geographic data residency server associated with the second geographic area, a search index for the searching entity identifier; identifying search results data based on the search index; and providing the search results data to the requestor system.

U2. There is also provided the computer-implemented method of (U1), wherein the search results data comprises at least a message data set, and identifying the search results data based on the search index includes identifying, based on the search request and the search index, a residency token data set associated with search results data; receiving, from a geographic data residency server associated with the second geographic area, search result data comprising a message data set based on at least the residency token data set; and providing, to the requestor system, the search result data comprising at least the message data set.

U3. There is also provided the computer-implemented method of (U2), wherein the message data set comprises an encrypted message data set, and the computer-implemented method further including identifying a message decryption key set based on the residency token data set; decrypting the encrypted message data set based on the message decryption key set to identify an unencrypted message data set; and including the unencrypted message data set in the search results data.

U4. There is also provided the computer-implemented method of (U1), the computer-implemented method further comprising retrieving the search index from the geographic data residency server associated with the second geographic boundary based an entity search key, wherein the entity search key is retrievable based on the searching entity identifier.

V1. In addition, there is provided yet another computer program product for generating a search index based on geographically distributed data storage in a group-based communication system, the computer program product comprising at least one non-transitory computer-readable storage medium having computer-executable program code instructions stored therein, the computer-executable program code instructions, in execution with a processor, configured to retrieve, at an apparatus located within a first from a geographic area defined by a first geographic boundary and from a geographic data residency local repository associated with the first geographic boundary, a first message data subset and a message metadata set associated with a common group-based communication channel identifier; receive, from a geographic data residency server located within a second geographic area defined by a second geographic boundary, a second message data subset based on at least a residency token data set of the message metadata set, the second message data subset associated with the common group-based communication channel identifier; generate a search index based on the first message data subset, the second message data subset, and the message metadata set; and store the search index in the geographic data residency local repository associated with the first geographic boundary.

V2. There is also provided the computer program product of (V1), wherein to retrieve the second message data subset, the computer-executable program code instructions, in execution with the processor, are further configured to transmit at least the residency token data set to the geographic data residency server located within the second geographic area, wherein the geographic data residency server within the second geographic area retrieves, based on the residency token data set, the second message data subset from a second geographic data residency local repository within the second geographic area; and receive the first message data subset from the geographic data residency server within the second geographic area in response to the transmission.

V3. There is also provided the computer program product of (V1), wherein the computer-executable program code instructions, in execution with the processor, are further configured to identify at least one message decryption key for a second entity data object identifier associated with the common group-based communication channel identifier.

V4. There is also provided the computer program product of (V3), wherein the second entity data object identifier is associated with a data residency policy data object corresponding to the second geographic area.

V5. There is also provided the computer program product of (V4), wherein to retrieve the second message data subset, the computer-executable program code instructions, in execution with the processor, are further configured to transmit the residency token data set to the geographic data residency server located within the second geographic area, wherein the geographic data residency server within the second geographic area retrieves a second encrypted message data subset from a second geographic data residency local repository within the second geographic area based on the residency token data set; receive the second encrypted message data subset from the geographic data residency server within the second geographic area; and decrypt the second encrypted message data subset utilizing the at least one message decryption key.

V6. There is also provided the computer program product of (V1), wherein the computer-executable program code instructions, in execution with the processor, are further configured to identify the geographic data residency server associated with the second geographic area based on one or more of a portion of the message metadata set or the residency token data set.

V7. There is also provided the computer program product of (V1), wherein the computer-executable program code instructions, in execution with the processor, are further configured to cause the geographic data residency server associated with the second geographic boundary to copy the message metadata set.

W1. In addition, there is provided yet another apparatus for generating a search index based on geographically distributed data storage in a group-based communication system, the apparatus physically located in a first geographic area defined by a first geographic boundary, the apparatus comprising at least one processor and at least one non-transitory memory including computer program code, the at least one non-transitory memory and the computer program code configured to, with the at least one processor, configure the apparatus to retrieve, from a geographic area defined by a first geographic boundary and from a geographic data residency local repository associated with the first geographic boundary, a first message data subset and a message metadata set associated with a common group-based communication channel identifier; receive, from a geographic data residency server located within a second geographic area defined by a second geographic boundary, a second message data subset based on at least a residency token data set of the message metadata set, the second message data subset associated with the common group-based communication channel identifier; generate a search index based on the first message data subset, the second message data subset, and the message metadata set; and store the search index in the geographic data residency local repository associated with the first geographic boundary.

W2. There is also provided the apparatus of (W1), wherein to retrieve the second message data subset, the apparatus is configured to transmit at least the residency token data set to the geographic data residency server located within the second geographic area, wherein the geographic data residency server within the second geographic area retrieves, based on the residency token data set, the second message data subset from a second geographic data residency local repository within the second geographic area; and receive the first message data subset from the geographic data residency server within the second geographic area in response to the transmission.

W3. There is also provided the apparatus of (W1), the apparatus further configured to identify at least one message decryption key for a second entity data object identifier associated with the common group-based communication channel identifier.

W4. There is also provided the apparatus of (W3), wherein the second entity data object identifier is associated with a data residency policy data object corresponding to the second geographic area.

W5. There is also provided apparatus of (W4), wherein to retrieve the second message data subset, apparatus is configured to transmit the residency token data set to the geographic data residency server located within the second geographic area, wherein the geographic data residency server within the second geographic area retrieves a second encrypted message data subset from a second geographic data residency local repository within the second geographic area based on the residency token data set; receive the second encrypted message data subset from the geographic data residency server within the second geographic area; and decrypt the second encrypted message data subset utilizing the at least one message decryption key.

W6. There is also provided the apparatus of (W1), the apparatus further configured to identify the geographic data residency server associated with the second geographic area based on one or more of a portion of the message metadata set or the residency token data set.

W7. There is also provided the apparatus of (W1), the apparatus further configured to cause the geographic data residency server associated with the second geographic boundary to copy the message metadata set.

X1. In addition, there is provided yet another computer-implemented method for generating a search index based on geographically distributed data storage in a group-based communication system, the computer-implemented method including retrieving, at an apparatus located within a first from a geographic area defined by a first geographic boundary and from a geographic data residency local repository associated with the first geographic boundary, a first message data subset and a message metadata set associated with a common group-based communication channel identifier; receiving, from a geographic data residency server located within a second geographic area defined by a second geographic boundary, a second message data subset based on at least a residency token data set of the message metadata set, the second message data subset associated with the common group-based communication channel identifier; generating a search index based on the first message data subset, the second message data subset, and the message metadata set; and storing the search index in the geographic data residency local repository associated with the first geographic boundary.

X2. There is also provided the computer-implemented method of (X1), wherein retrieving the second message data subset includes transmitting at least the residency token data set to the geographic data residency server located within the second geographic area, wherein the geographic data residency server within the second geographic area retrieves, based on the residency token data set, the second message data subset from a second geographic data residency local repository within the second geographic area; and receive the first message data subset from the geographic data residency server within the second geographic area in response to the transmission.

X3. There is also provided the computer-implemented method of (X1), the computer-implemented method further including identifying at least one message decryption key for a second entity data object identifier associated with the common group-based communication channel identifier.

X4. There is also provided the computer-implemented method of (X3), wherein the second entity data object identifier is associated with a data residency policy data object corresponding to the second geographic area.

X5. There is also provided the computer-implemented method of (X4), wherein retrieving the second message data subset includes transmitting the residency token data set to the geographic data residency server located within the second geographic area, wherein the geographic data residency server within the second geographic area retrieves a second encrypted message data subset from a second geographic data residency local repository within the second geographic area based on the residency token data set; receiving the second encrypted message data subset from the geographic data residency server within the second geographic area; and decrypting the second encrypted message data subset utilizing the at least one message decryption key.

X6. There is also provided the computer-implemented method of (X1), the computer-implemented method further including identifying the geographic data residency server associated with the second geographic area based on one or more of a portion of the message metadata set or the residency token data set.

X7. There is also provided the computer-implemented method of (X1), the computer-implemented method further including causing the geographic data residency server associated with the second geographic boundary to copy the message metadata set.

What is claimed is:

1. One or more non-transitory computer-readable media storing computer-executable instructions that, when executed by a processor, perform a method for deletion of geographically distributed data within a group-based communication system, the method comprising the steps of:
  receiving, from a client device, a message deletion request comprising a message identifier;
  locating a first repository row comprising message metadata and residency token data associated with the message identifier within a local repository physically located in a first geographic area;
  upon locating the first repository row, initiating a local repository row erasure operation by which contents of the first repository row are erased from the local repository; and
  upon completion of the local repository row erasure operation, transmitting a data residency deletion request to a geographic data residency server associated with the residency token data, the data residency deletion request comprising the residency token data and indicating an expiration window of a data residency repository row associated with the residency token data, and wherein, upon lapsing of the expiration window, the data residency deletion request is configured to initiate an erasure operation by which the contents of the data residency repository row are erased from a geographic data residency repository comprising the data residency repository row, the geographic data residency repository being physically located within a second geographic area distinct from the first geographic area.

2. The one or more non-transitory computer-readable media of claim 1, wherein the geographic data residency server is physically located within a third geographic area.

3. The one or more non-transitory computer-readable media of claim 1, wherein the first geographic area is subject to a first data storage policy and the second geographic area is subject to a second data storage policy different from the first data storage policy.

4. The one or more non-transitory computer-readable media of claim 1, wherein the residency token data comprises one or more of the message identifier, a storage location identifier, or a message encryption key.

5. The one or more non-transitory computer-readable media of claim 1, wherein the message deletion request comprises a plurality of message identifiers.

6. The one or more non-transitory computer-readable media of claim 5, wherein a first message identifier of the plurality of message identifiers is associated with a first data residency row stored in the geographic data residency repository in the second geographic area, and wherein a second message identifier of the plurality of message identifiers is associated with a second data residency row stored in another geographic data residency repository in a third geographic area distinct from the first geographic area and the second geographic area.

7. The one or more non-transitory computer-readable media of claim 1, wherein the method further comprises the step of:

in an instance where a data residency deletion confirmation is not received within a deletion confirmation window, enqueuing a subsequent data residency deletion request comprising the residency token data to be transmitted to the geographic data residency server.

8. A method for deletion of geographically distributed data within a group-based communication system, the method comprising the steps of:

receiving, from a client device, a message deletion request comprising a message identifier;

locating a first repository row comprising message metadata and residency token data associated with the message identifier within a local repository physically located in a first geographic area;

upon locating the first repository row, initiating a local repository row erasure operation by which contents of the first repository row are erased from the local repository; and upon completion of the local repository row erasure operation, transmitting a data residency deletion request to a geographic data residency server associated with the residency token data, the data residency deletion request comprising the residency token data and indicating an expiration window of a data residency repository row associated with the residency token data, and wherein, upon lapsing of the expiration window, the data residency deletion request is configured to initiate an erasure operation by which the contents of the data residency repository row are erased from a geographic data residency repository comprising the data residency repository row, the geographic data residency repository being physically located within a second geographic area distinct from the first geographic area.

9. The method of claim 8, wherein the geographic data residency server is physically located within a third geographic area.

10. The method of claim 8, wherein the first geographic area is subject to a first data storage policy and the second geographic area is subject to a second data storage policy different from the first data storage policy.

11. The method of claim 8, wherein the residency token data comprises one or more of the message identifier, a storage location identifier, or a message encryption key.

12. The method of claim 8, wherein the message deletion request comprises a plurality of message identifiers.

13. The method of claim 12, wherein a first message identifier of the plurality of message identifiers is associated with a first data residency row stored in the geographic data residency repository in the second geographic area, and wherein a second message identifier of the plurality of message identifiers is associated with a second data residency row stored in another geographic data residency repository in a third geographic area distinct from the first geographic area and the second geographic area.

14. The method of claim 8, further comprising the step of:

in an instance where a data residency deletion confirmation is not received within a deletion confirmation window, enqueuing a subsequent data residency deletion request comprising the residency token data to be transmitted to the geographic data residency server.

15. A system for performing deletion of geographically distributed data within a group-based communication system, the system comprising:

a client device;

a local repository physically located in a first geographic area;

a geographic data residency repository physically located in a second geographic area distinct from the first geographic area;

a processor programmed to perform a method for deletion of geographically distributed data, the method comprising the steps of:

receiving, from the client device, a message deletion request comprising a message identifier;

locating a first repository row comprising message metadata and residency token data associated with the message identifier within the local repository;

upon locating the first repository row, initiating a local repository row erasure operation by which contents of the first repository row are erased from the local repository; and upon completion of the local repository row erasure operation, transmitting a data residency deletion request to a geographic data residency server associated with the residency token data, the data residency deletion request comprising the residency token data and indicating an expiration window of a data residency repository row associated with the residency token data, and wherein, upon lapsing of the expiration window, the data residency deletion request is configured to initiate an erasure operation by which the contents of the data residency repository row are erased from the geographic data residency repository comprising the data residency repository row.

16. The system of claim 15, wherein the geographic data residency server is physically located within a third geographic area.

17. The system of claim 15, wherein the first geographic area is subject to a first data storage policy and the second geographic area is subject to a second data storage policy different from the first data storage policy.

18. The system of claim 15, wherein the residency token data comprises one or more of the message identifier, a storage location identifier, or a message encryption key.

19. The system of claim 15, wherein the message deletion request comprises a plurality of message identifiers, wherein a first message identifier of the plurality of message identifiers is associated with a first data residency row stored in the geographic data residency repository in the second geographic area, and wherein a second message identifier of the plurality of message identifiers is associated with a second data residency row stored in another geographic data residency repository in a third geographic area distinct from the first geographic area and the second geographic area.

20. The system of claim 15, wherein the method further comprises the step of:

in an instance where a data residency deletion confirmation is not received within a deletion confirmation window, enqueuing a subsequent data residency deletion request comprising the residency token data to be transmitted to the geographic data residency server.

* * * * *